United States Patent
Dietz et al.

(10) Patent No.: US 6,665,725 B1
(45) Date of Patent: Dec. 16, 2003

(54) PROCESSING PROTOCOL SPECIFIC INFORMATION IN PACKETS SPECIFIED BY A PROTOCOL DESCRIPTION LANGUAGE

(75) Inventors: Russell S. Dietz, San Jose, CA (US); Andrew A. Koppenhaver, Littleton, CO (US); James F. Torgerson, Andover, MN (US)

(73) Assignee: Hi/fn, Inc., Los Gatos, CA (US)

( * ) Notice: Subject to any disclaimer, the term of this patent is extended or adjusted under 35 U.S.C. 154(b) by 537 days.

(21) Appl. No.: 09/609,179

(22) Filed: Jun. 30, 2000

Related U.S. Application Data

(60) Provisional application No. 60/141,903, filed on Jun. 30, 1999.

(51) Int. Cl.$^7$ .............................................. G06F 13/00
(52) U.S. Cl. ...................... 709/230; 709/246; 709/228; 370/389
(58) Field of Search .................................. 709/203, 206, 709/216, 217, 222, 246, 225, 228, 230, 232; 703/26; 370/489, 13, 17

(56) References Cited

U.S. PATENT DOCUMENTS

| | | | |
|---|---|---|---|
| 4,736,320 A | 4/1988 | Bristol | 364/300 |
| 4,891,639 A | 1/1990 | Nakamura | 340/825.5 |
| 5,101,402 A | 3/1992 | Chui et al. | 370/17 |
| 5,247,517 A | 9/1993 | Ross et al. | 370/85.5 |
| 5,247,693 A | 9/1993 | Bristol | 709/203 |
| 5,315,580 A | 5/1994 | Phaal | 370/13 |
| 5,339,268 A | 8/1994 | Machida | 365/49 |
| 5,351,243 A | 9/1994 | Kalkunte et al. | 370/92 |
| 5,365,514 A | 11/1994 | Hershey et al. | 370/17 |
| 5,375,070 A | 12/1994 | Hershey et al. | 364/550 |
| 5,394,394 A | 2/1995 | Crowther et al. | 370/60 |
| 5,414,650 A | 5/1995 | Hekhuis | 364/715.02 |
| 5,414,704 A | 5/1995 | Spinney | 370/60 |

(List continued on next page.)

OTHER PUBLICATIONS

"Technical Note: the Narus System," Downloaded Apr. 29, 1999 from www.narus.com, Narus Corporation, Redwood City California.

*Primary Examiner*—Hosain T. Alam
*Assistant Examiner*—Khanh Quang Dinh
(74) *Attorney, Agent, or Firm*—Dov Rosenfeld; Inventek

(57) ABSTRACT

A method of performing protocol specific operations on a packet passing through a connection point on a computer network. The packet contents conform to protocols of a layered model wherein the protocol at a at a particular layer level may include one or a set of child protocols defined for that level. The method includes receiving the packet and receiving a set of protocol descriptions for protocols may be used in the packet. A protocol description for a particular protocol at a particular layer level includes any child protocols of the particular protocol, and for any child protocol, where in the packet information related to the particular child protocol may be found. A protocol description also includes any protocol specific operations to be performed on the packet for the particular protocol at the particular layer level. The method includes performing the protocol specific operations on the packet specified by the set of protocol descriptions based on the base protocol of the packet and the children of the protocols used in the packet. A particular embodiment includes providing the protocol descriptions in a high-level protocol description language, and compiling to the descriptions into a data structure. The compiling may further include compressing the data structure into a compressed data structure. The protocol specific operations may include parsing and extraction operations to extract identifying information. The protocol specific operations may also include state processing operations defined for a particular state of a conversational flow of the packet.

17 Claims, 20 Drawing Sheets

U.S. PATENT DOCUMENTS

| | | | | |
|---|---|---|---|---|
| 5,430,709 A | | 7/1995 | Galloway | 370/13 |
| 5,432,776 A | | 7/1995 | Harper | 370/17 |
| 5,493,689 A | | 2/1996 | Waclawsky et al. | 709/206 |
| 5,500,855 A | | 3/1996 | Hershey et al. | 370/17 |
| 5,511,215 A | | 4/1996 | Terasaka et al. | 709/246 |
| 5,568,471 A | | 10/1996 | Hershey et al. | 370/17 |
| 5,574,875 A | | 11/1996 | Stansfield et al. | 395/403 |
| 5,586,266 A | | 12/1996 | Hershey et al. | 709/216 |
| 5,606,668 A | | 2/1997 | Shwed | 709/216 |
| 5,608,662 A | | 3/1997 | Large et al. | 364/724.01 |
| 5,634,009 A | | 5/1997 | Iddon et al. | 709/206 |
| 5,651,002 A | | 7/1997 | Van Seters et al. | 370/392 |
| 5,680,585 A | * | 10/1997 | Bruell | 703/26 |
| 5,684,954 A | | 11/1997 | Kaiserswerth et al. | 709/203 |
| 5,703,877 A | | 12/1997 | Nuber et al. | 370/395 |
| 5,721,827 A | * | 2/1998 | Logan et al. | 709/217 |
| 5,732,213 A | | 3/1998 | Gessel et al. | 709/216 |
| 5,740,355 A | | 4/1998 | Watanabe et al. | 395/183.21 |
| 5,761,424 A | | 6/1998 | Adams et al. | 709/232 |
| 5,764,638 A | | 6/1998 | Ketchum | 370/401 |
| 5,781,735 A | | 7/1998 | Southard | 709/238 |
| 5,784,298 A | | 7/1998 | Hershey et al. | 364/557 |
| 5,787,253 A | | 7/1998 | McCreery et al. | 709/227 |
| 5,805,808 A | | 9/1998 | Hansani et al. | 709/203 |
| 5,812,529 A | | 9/1998 | Czarnik et al. | 370/245 |
| 5,819,028 A | | 10/1998 | Manghirmalani et al. | 709/203 |
| 5,825,774 A | | 10/1998 | Ready et al. | 370/401 |
| 5,826,017 A | | 10/1998 | Holzmann | 709/206 |
| 5,835,726 A | | 11/1998 | Shwed et al. | 709/228 |
| 5,838,919 A | | 11/1998 | Schwaller et al. | 709/208 |
| 5,841,895 A | | 11/1998 | Huffman | 382/155 |
| 5,850,386 A | | 12/1998 | Anderson et al. | 370/241 |
| 5,850,388 A | | 12/1998 | Anderson et al. | 370/252 |
| 5,862,335 A | | 1/1999 | Welch, Jr. et al. | 709/232 |
| 5,878,420 A | | 3/1999 | de la Salle | 707/10 |
| 5,893,155 A | | 4/1999 | Cheriton | 711/144 |
| 5,903,754 A | | 5/1999 | Pearson | 709/238 |
| 5,917,821 A | | 6/1999 | Gobuyan et al. | 370/392 |
| 6,014,380 A | | 1/2000 | Hendel et al. | 370/392 |
| 6,272,151 B1 | * | 8/2001 | Gupta et al. | 370/489 |
| 6,430,409 B1 | * | 8/2002 | Rossmann | 455/422.1 |
| 6,516,337 B1 | * | 2/2003 | Tripp et al. | 709/202 |
| 6,519,568 B1 | * | 2/2003 | Harvey et al. | 705/1 |

* cited by examiner

PROCESSING PROTOCOL SPECIFIC INFORMATION IN PACKETS SPECIFIED BY A PROTOCOL DESCRIPTION LANGUAGE

CROSS-REFERENCE TO RELATED APPLICATION

This application claims the benefit of U.S. Provisional Patent Application Serial No.: 60/141,903 for METHOD AND APPARATUS FOR MONITORING TRAFFIC IN A NETWORK to inventors Dietz, et al., filed Jun. 30, 1999, the contents of which are incorporated herein by reference.

This application is related to the following U.S. patent applications, each filed concurrently with the present application, and each assigned to Apptitude, Inc., the assignee of the present invention:

U.S. patent application Ser. No. 09/608,237 for METHOD AND APPARATUS FOR MONITORING TRAFFIC IN A NETWORK, to inventors Dietz, et al., filed Jun. 30, 2000, and incorporated herein by reference.

U.S. patent application Ser. No. 09/608,126 for RE-USING INFORMATION FROM DATA TRANSACTIONS FOR MAINTAINING STATISTICS IN NETWORK MONITORING, to inventors Dietz, et al., filed Jun. 30, 2000, and incorporated herein by reference.

U.S. patent application Ser. No. 09/608,266 for ASSOCIATIVE CACHE STRUCTURE FOR LOOKUPS AND UPDATES OF FLOW RECORDS IN A NETWORK MONITOR, to inventors Sarkissian, et al., filed Jun. 30, 2000, and incorporated herein by reference.

U.S. patent application Ser. No. 09/608,267 for STATE PROCESSOR FOR PATTERN MATCHING IN A NETWORK MONITOR DEVICE, to inventors Sarkissian, et al., filed Jun. 30, 2000, and incorporated herein by reference.

FIELD OF INVENTION

The present invention relates to computer networks, specifically to the real-time elucidation of packets communicated within a data network, including classification according to protocol and application program.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

There has long been a need for network activity monitors. This need has become especially acute, however, given the recent popularity of the Internet and other interconnected networks. In particular, there is a need for a real-time network monitor that can provide details as to the application programs being used. Such a monitor should enable non-intrusive, remote detection, characterization, analysis, and capture of all information passing through any point on the network (i.e., of all packets and packet streams passing through any location in the network). Not only should all the packets be detected and analyzed, but for each of these packets the network monitor should determine the protocol (e.g., http, ftp, H.323, VPN, etc.), the application/use within the protocol (e.g., voice, video, data, real-time data, etc.), and an end user's pattern of use within each application or the application context (e.g., options selected, service delivered, duration, time of day, data requested, etc.). Also, the network monitor should not be reliant upon server resident information such as log files. Rather, it should allow a user such as a network administrator or an Internet service provider (ISP) the means to measure and analyze network activity objectively; to customize the type of data that is collected and analyzed; to undertake real time analysis; and to receive timely notification of network problems.

The recognizing and classifying in such a network monitor should be at all protocol layer levels in conversational flows that pass in either direction at a point in a network. Furthermore, the monitor should provide for properly analyzing each of the packets exchanged between a client and a server, maintaining information relevant to the current state of each of these conversational flows.

Related and incorporated by reference U.S. patent application Ser. No. 09/608,237 for METHOD AND APPARATUS FOR MONITORING TRAFFIC IN A NETWORK, to inventors Dietz, et al, describes a network monitor that includes carrying out protocol specific operations on individual packets including extracting information from header fields in the packet to use for building a signature for identifying the conversational flow of the packet and for recognizing future packets as belonging to a previously encountered flow. A parser subsystem includes a parser for recognizing different patterns in the packet that identify the protocols used. For each protocol recognized, a slicer extracts important packet elements from the packet. These form a signature (i.e., key) for the packet. The slicer also preferably generates a hash for rapidly identifying a flow that may have this signature from a database of known flows.

The flow signature of the packet, the hash and at least some of the payload are passed to an analyzer subsystem. In a hardware embodiment, the analyzer subsystem includes a unified flow key buffer (UFKB) for receiving parts of packets from the parser subsystem and for storing signatures in process, a lookup/update engine (LUE) to lookup a database of flow records for previously encountered conversational flows to determine whether a signature is from an existing flow, a state processor (SP) for performing state processing, a flow insertion and deletion engine (FIDE) for inserting new flows into the database of flows, a memory for storing the database of flows, and a cache for speeding up access to the memory containing the flow database. The LUE, SP, and FIDE are all coupled to the UFKB, and to the cache.

Each flow-entry includes one or more statistical measures, e.g., the packet count related to the flow, the time of arrival of a packet, the time differential.

In the preferred hardware embodiment, each of the LUE, state processor, and FIDE operate independently from the other two engines. The state processor performs one or more operations specific to the state of the flow.

A network analyzer should be able to analyze many different protocols. At a base level, there are a number of standards used in digital telecommunications, including Ethernet, HDLC, ISDN, Lap B, ATM, X.25, Frame Relay, Digital Data Service, FDDI (Fiber Distributed Data Interface), T1, and others. Many of these standards employ different packet and/or frame formats. For example, data is transmitted in ATM and frame-relay systems in the form of fixed length packets (called "cells") that are 53 octets (i.e., bytes) long. Several such cells may be needed to make up the information that might be included in the packet employed by some other protocol for the same payload information— for example in a conversational flow that uses the frame-relay standard or the Ethernet protocol.

In order for a network monitor to be able to analyze different packet or frame formats, the monitor needs to be able to perform protocol specific operations on each packet with each packet carrying information conforming to different protocols and related to different applications. For example, the monitor needs to be able to parse packets of different formats into fields to understand the data encapsulated in the different fields. As the number of possible packet formats or types increases, the amount of logic required to parse these different packet formats also increases.

Prior art network monitors exist that parse individual packets and look for information at different fields to use for building a signature for identifying packets. Chiu, et al., describe a method for collecting information at the session level in a computer network in U.S. Pat. No. 5,101,402, titled "APPARATUS AND METHOD FOR REAL-TIME MONITORING OF NETWORK SESSIONS AND A LOCAL AREA NETWORK." In this patent, there are fixed locations specified for particular types of packets. For example, if a DECnet packet appears, the Chiu system looks at six specific fields (at 6 locations) in the packet in order to identify the session of the packet. If, on the other hand, an IP packet appears, a different set of six locations are examined. The system looks only at the lowest levels up to the protocol layer. There are fixed locations for each of the fields that specified the next level. With the proliferation of protocols, clearly the specifying of all the possible places to look to determine the session becomes more and more difficult. Likewise, adding a new protocol or application is difficult.

It is desirable to be able to adaptively determine the locations and the information extracted from any packet for the particular type of packet. In this way, an optimal signature may be defined using a protocol-dependent and packet-content-dependent definition of what to look for and where to look for it in order to form a signature.

There thus is also a need for a network monitor that can be tailored or adapted for different protocols and for different application programs. There thus is also a need for a network monitor that can accommodate new protocols and for new application programs. There also is a need for means for specifying new protocols and new levels, including new applications. There also is a need for a mechanism to describe protocol specific operations, including, for example, what information is relevant to packets and packets that need to be decoded, and to include specifying parsing operations and extraction operations. There also is a need for a mechanism to describe state operations to perform on packets that are at a particular state of recognition of a flow in order to further recognize the flow.

SUMMARY

One embodiment of the invention is a method of performing protocol specific operations on a packet passing through a connection point on a computer network. The packet contents conform to protocols of a layered model wherein the protocol at a particular layer level may include one or a set of child protocols defined for that level. The method includes receiving the packet and receiving a set of protocol descriptions for protocols may be used in the packet. A protocol description for a particular protocol at a particular layer level includes any child protocols of the particular protocol, and for any child protocol, where in the packet information related to the particular child protocol may be found. A protocol description also includes any protocol specific operations to be performed on the packet for the particular protocol at the particular layer level. The method includes performing the protocol specific operations on the packet specified by the set of protocol descriptions based on the base protocol of the packet and the children of the protocols used in the packet. A particular embodiment includes providing the protocol descriptions in a high-level protocol description language, and compiling to the descriptions into a data structure. The compiling may further include compressing the data structure into a compressed data structure. The protocol specific operations may include parsing and extraction operations to extract identifying information. The protocol specific operations may also include state processing operations defined for a particular state of a conversational flow of the packet.

BRIEF DESCRIPTION OF THE DRAWINGS

Although the present invention is better understood by referring to the detailed preferred embodiments, these should not be taken to limit the present invention to any specific embodiment because such embodiments are provided only for the purposes of explanation. The embodiments, in turn, are explained with the aid of the following figures.

DETAILED DESCRIPTION OF THE PREFERRED EMBODIMENTS

Note that this document includes hardware diagrams and descriptions that may include signal names. In most cases, the names are sufficiently descriptive, in other cases however the signal names are not needed to understand the operation and practice of the invention.

Operation in a Network

Figure 1:
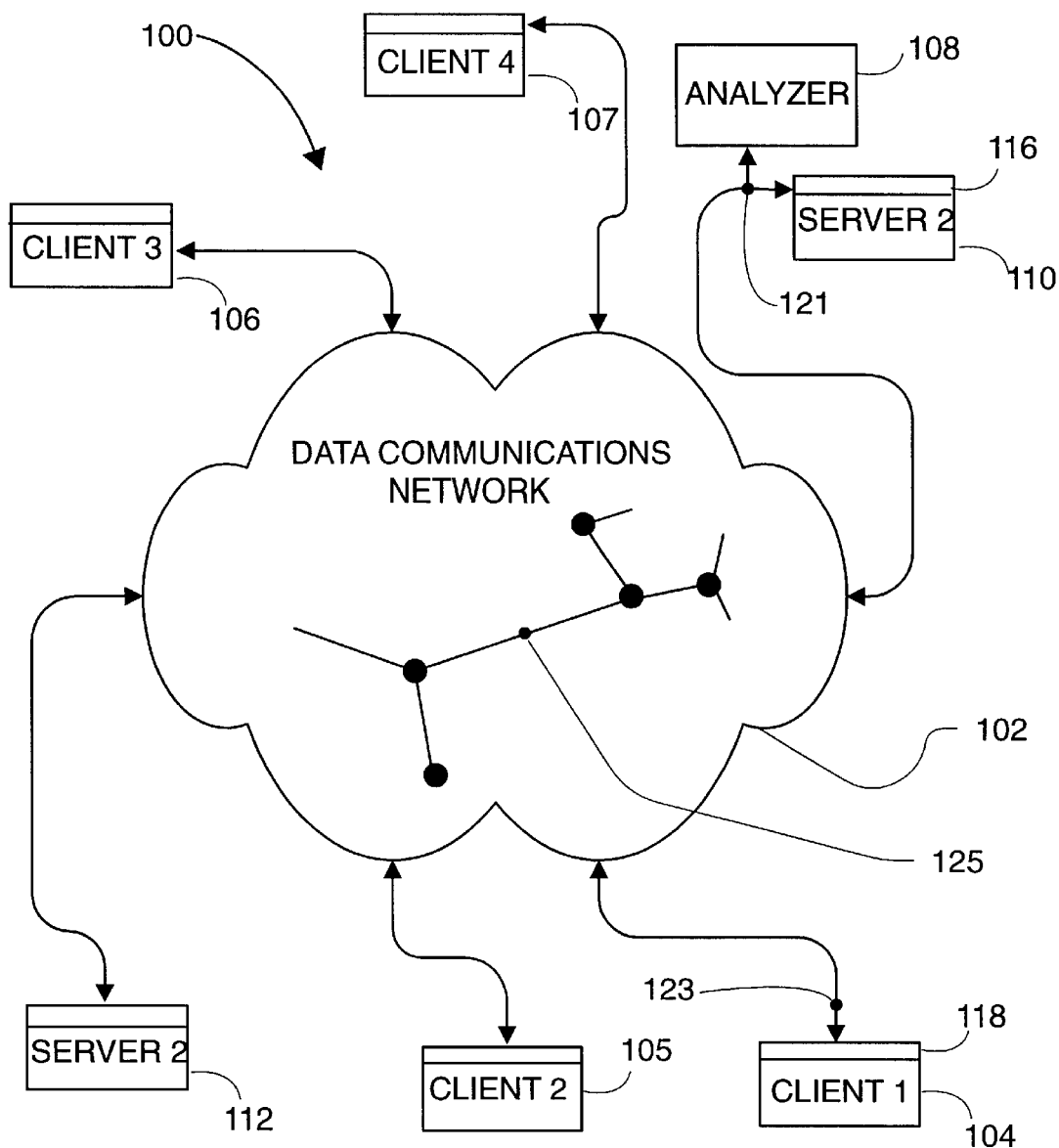
FIG. 1 is a functional block diagram of a network embodiment of the present invention in which a monitor is connected to analyze packets passing at a connection point.

FIG. 1 represents a system embodiment of the present invention that is referred to herein by the general reference numeral 100. The system 100 has a computer network 102 that communicates packets (e.g., IP datagrams) between various computers, for example between the clients 104–107 and servers 110 and 112. The network is shown schematically as a cloud with several network nodes and links shown in the interior of the cloud. A monitor 108 examines the packets passing in either direction past its connection point 121 and, according to one aspect of the invention, can elucidate what application programs are associated with each packet. The monitor 108 is shown examining packets (i.e., datagrams) between the network interface 116 of the server 110 and the network. The monitor can also be placed at other points in the network, such as connection point 123 between the network 102 and the interface 118 of the client 104, or some other location, as indicated schematically by connection point 125 somewhere in network 102. Not shown is a network packet acquisition device at the location 123 on the network for converting the physical information on the network into packets for input into monitor 108. Such packet acquisition devices are common.

Various protocols may be employed by the network to establish and maintain the required communication, e.g., TCP/IP, etc. Any network activity—for example an application program run by the client 104 (CLIENT 1) communicating with another running on the server 110 (SERVER 2)—will produce an exchange of a sequence of packets over network 102 that is characteristic of the respective programs and of the network protocols. Such characteristics may not be completely revealing at the individual packet level. It may require the analyzing of many packets by the monitor 108 to have enough information needed to recognize particular application programs. The packets may need to be parsed then analyzed in the context of various protocols, for example, the transport through the application session layer protocols for packets of a type conforming to the ISO layered network model.

Communication protocols are layered, which is also referred to as a protocol stack. The ISO (International Standardization Organization) has defined a general model that provides a framework for design of communication protocol layers. This model, shown in table from below, serves as a basic reference for understanding the functionality of existing communication protocols.

| | ISO MODEL | |
|---|---|---|
| Layer | Functionality | Example |
| 7 | Application | Telnet, NFS, Novell NCP, HTTP, H.323 |
| 6 | Presentation | XDR |
| 5 | Session | RPC, NBTBIOS, SNMP, etc. |
| 4 | Transport | TCP, Novel SPX, UDP, etc. |
| 3 | Network | IP, Novell IPX, VIP, AppleTalk, etc. |
| 2 | Data Link | Network Interface Card (Hardware Interface). MAC layer |
| 1 | Physical | Ethernet, Token Ring, Frame Relay, ATM, T1 (Hardware Connection) |

Diferent communications protocols employ different levels of the ISO model or may use a layered model that is similar to but which does not exactly conform to the ISO model. A protocol in a certain layer may not be visible to protocols employed at other layers. For example, an application (Level 7) may not be able to identify the source computer for a communication attempt (Levels 2–3).

In some communication arts, the term "frame" generally refers to encapsulated data at OSI layer 2, including a destination address, control bits for flow control, the data or payload, and CRC (cyclic redundancy check) data for error checking. The term "packet" generally refers to encapsulated data at OSI layer 3. In the TCP/IP world, the term "datagram" is also used. In this specification, the term "packet" is intended to encompass packets, datagrams, frames, and cells. In general, a packet format or frame format refers to how data is encapsulated with various fields and headers for transmission across a network. For example, a data packet typically includes an address destination field, a length field, an error correcting code (ECC) field, or cyclic redundancy check (CRC) field, as well as headers and footers to identify the beginning and end of the packet. The terms "packet format" and "frame format," also referred to as "cell format," are generally synonymous.

Monitor 108 looks at every packet passing the connection point 121 for analysis. However, not every packet carries the same information useful for recognizing all levels of the protocol. For example, in a conversational flow associated with a particular application, the application will cause the server to send a type-A packet, but so will another. If, though, the particular application program always follows a type-A packet with the sending of a type-B packet, and the other application program does not, then in order to recognize packets of that application's conversational flow, the monitor can be available to recognize packets that match the type-B packet to associate with the type-A packet. If such is recognized after a type-A packet, then the particular application program's conversational flow has started to reveal itself to the monitor 108.

Further packets may need to be examined before the conversational flow can be identified as being associated with the application program. Typically, monitor 108 is simultaneously also in partial completion of identifying other packet exchanges that are parts of conversational flows associated with other applications. One aspect of monitor 108 is its ability to maintain the state of a flow. The state of a flow is an indication of all previous events in the flow that lead to recognition of the content of all the protocol levels, e.g., the ISO model protocol levels. Another aspect of the invention is forming a signature of extracted characteristic portions of the packet that can be used to rapidly identify packets belonging to the same flow.

In real-world uses of the monitor 108, the number of packets on the network 102 passing by the monitor 108's connection point can exceed a million per second. Consequently, the monitor has very little time available to analyze and type each packet and identify and maintain the state of the flows passing through the connection point. The monitor 108 therefore masks out all the unimportant parts of each packet that will not contribute to its classification. However, the parts to mask-out will change with each packet depending on which flow it belongs to and depending on the state of the flow.

The recognition of the packet type, and ultimately of the associated application programs according to the packets that their executions produce, is a multi-step process within the monitor 108. At a first level, for example, several application programs will all produce a first kind of packet. A first "signature" is produced from selected parts of a packet that will allow monitor 108 to identify efficiently any packets that belong to the same flow. In some cases, that packet type may be sufficiently unique to enable the monitor to identify the application that generated such a packet in the conversational flow. The signature can then be used to efficiently identify all future packets generated in traffic related to that application.

In other cases, that first packet only starts the process of analyzing the conversational flow, and more packets are necessary to identify the associated application program. In such a case, a subsequent packet of a second type—but that potentially belongs to the same conversational flow—is recognized by using the signature. At such a second level, then, only a few of those application programs will have conversational flows that can produce such a second packet type. At this level in the process of classification, all application programs that are not in the set of those that lead to such a sequence of packet types may be excluded in the process of classifying the conversational flow that includes these two packets. Based on the known patterns for the protocol and for the possible applications, a signature is produced that allows recognition of any future packets that may follow in the conversational flow.

It may be that the application is now recognized, or recognition may need to proceed to a third level of analysis using the second level signature. For each packet, therefore, the monitor parses the packet and generates a signature to determine if this signature identified a previously encountered flow, or shall be used to recognize future packets belonging to the same conversational flow. In real time, the packet is further analyzed in the context of the sequence of previously encountered packets (the state), and of the possible future sequences such a past sequence may generate in conversational flows associated with different applications. A new signature for recognizing future packets may also be generated. This process of analysis continues until the applications are identified. The last generated signature may then be used to efficiently recognize future packets associated with the same conversational flow. Such an arrangement makes it possible for the monitor 108 to cope with millions of packets per second that must be inspected.

Another aspect of the invention is adding Eavesdropping. In alternative embodiments of the present invention capable of eavesdropping, once the monitor 108 has recognized the executing application programs passing through some point in the network 102 (for example, because of execution of the applications by the client 105 or server 110), the monitor sends a message to some general purpose processor on the network that can input the same packets from the same location on the network, and the processor then loads its own executable copy of the application program and uses it to read the content being exchanged over the network. In other words, once the monitor 108 has accomplished recognition of the application program, eavesdropping can commence.

The Network Monitor

Figure 3:
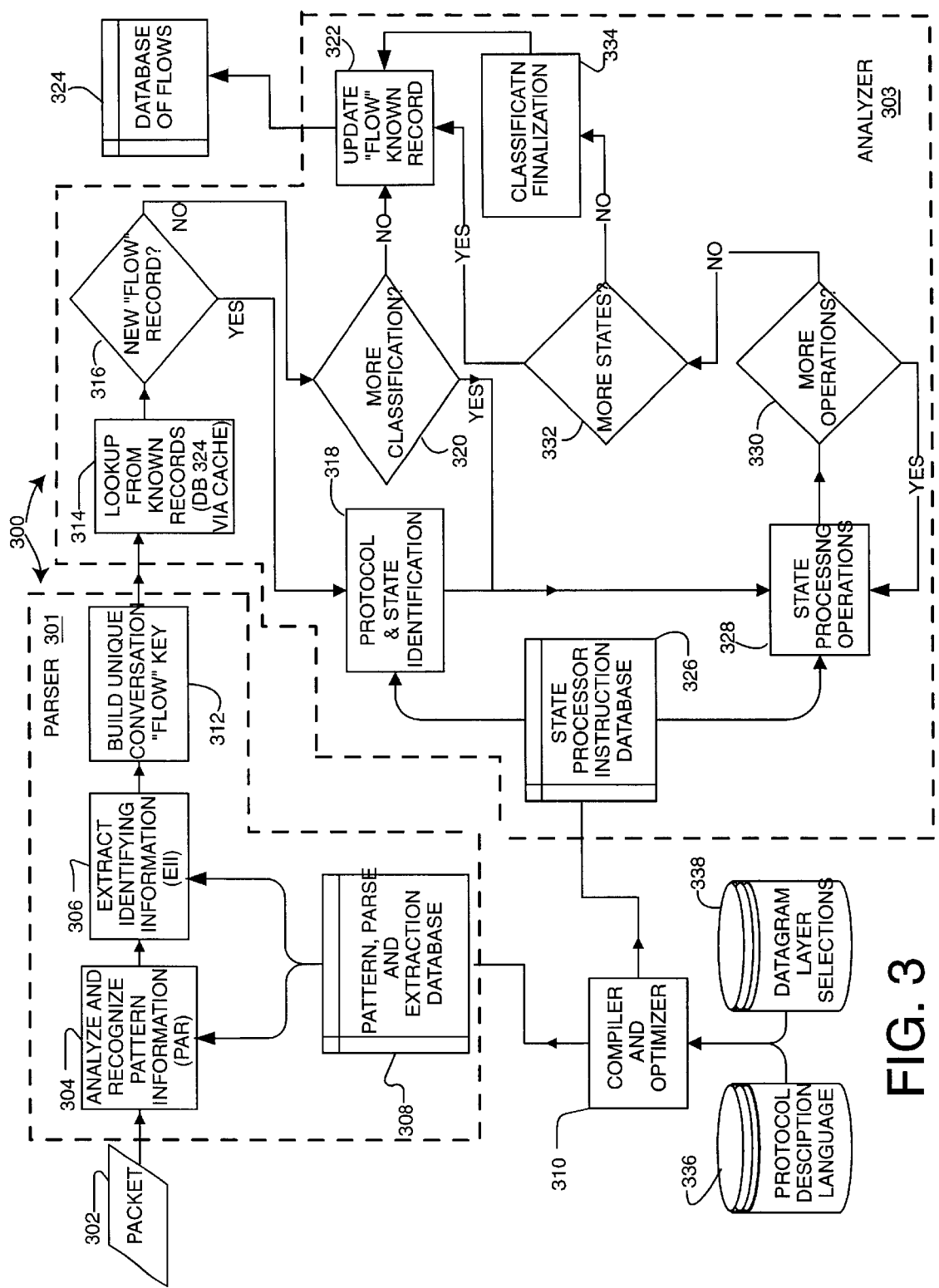
FIG. 3 is a functional block diagram of a process embodiment of the present invention that can operate as the packet monitor shown in FIG. 1. This process may be implemented in software or hardware.

FIG. 3 shows a network packet monitor 300, in an embodiment of the present invention that can be implemented with computer hardware and/or software. The system 300 is similar to monitor 108 in FIG. 1. A packet 302 is examined, e.g., from a packet acquisition device at the location 121 in network 102 (FIG. 1), and the packet evaluated, for example in an attempt to determine its characteristics, e.g., all the protocol information in a multi-level model, including what server application produced the packet.

The packet acquisition device is a common interface that converts the physical signals and then decodes them into bits, and into packets, in accordance with the particular network (Ethernet, frame relay, ATM, etc.). The acquisition device indicates to the monitor 108 the type of network of the acquired packet or packets.

Aspects shown here include: (1) the initialization of the monitor to generate what operations need to occur on packets of different types—accomplished by compiler and optimizer 310, (2) the processing—parsing and extraction of selected portions—of packets to generate an identifying signature—accomplished by parser subsystem 301, and (3) the analysis of the packets—accomplished by analyzer 303.

The purpose of compiler and optimizer 310 is to provide protocol specific information to parser subsystem 301 and to analyzer subsystem 303. The initialization occurs prior to operation of the monitor, and only needs to re-occur when new protocols are to be added.

A flow is a stream of packets being exchanged between any two addresses in the network. For each protocol there are known to be several fields, such as the destination (recipient), the source (the sender), and so forth, and these and other fields are used in monitor 300 to identify the flow. There are other fields not important for identifying the flow, such as checksums, and those parts are not used for identification.

Parser subsystem 301 examines the packets using pattern recognition process 304 that parses the packet and determines the protocol types and associated headers for each protocol layer that exists in the packet 302. An extraction process 306 in parser subsystem 301 extracts characteristic portions (signature information) from the packet 302. Both the pattern information for parsing and the related extraction operations, e.g., extraction masks, are supplied from a parsing-pattern-structures and extraction-operations database (parsing/extractions database) 308 filled by the compiler and optimizer 310.

The protocol description language (PDL) files 336 describes both patterns and states of all protocols that an occur at any layer, including how to interpret header information, how to determine from the packet header information the protocols at the next layer, and what information to extract for the purpose of identifying a flow, and ultimately, applications and services. The layer selections database 338 describes the particular layering handled by the monitor. That is, what protocols run on top of what protocols at any layer level. Thus 336 and 338 combined describe how one would decode, analyze, and understand the information in packets, and, furthermore, how the information is layered. This information is input into compiler and optimizer 310.

When compiler and optimizer 310 executes, it generates two sets of internal data structures. The first is the set of parsing/extraction operations 308. The pattern structures include parsing information and describe what will be recognized in the headers of packets; the extraction operations are what elements of a packet are to be extracted from the packets based on the patterns that get matched. Thus, database 308 of parsing/extraction operations includes information describing how to determine a set of one or more protocol dependent extraction operations from data in the packet that indicate a protocol used in the packet.

The other internal data structure that is built by compiler 310 is the set of state patterns and processes 326. These are the different states and state transitions that occur in different conversational flows, and the state operations that need to be performed (e.g., patterns that need to be examined and new signatures that need to be built) during any state of a conversational flow to further the task of analyzing the conversational flow.

Thus, compiling the PDL files and layer selections provides monitor 300 with the information it needs to begin processing packets. In an alternate embodiment, the contents of one or more of databases 308 and 326 may be manually or otherwise generated. Note that in some embodiments the layering selections information is inherent rather than explicitly described. For example, since a PDL file for a protocol includes the child protocols, the parent protocols also may be determined.

In the preferred embodiment, the packet 302 from the acquisition device is input into a packet buffer. The pattern recognition process 304 is carried out by a pattern analysis and recognition (PAR) engine that analyzes and recognizes patterns in the packets. In particular, the PAR locates the next protocol field in the header and determines the length of the header, and may perform certain other tasks for certain types of protocol headers. An example of this is type and length comparison to distinguish an IEEE 802.3 (Ethernet) packet from the older type 2 (or Version 2) Ethernet packet, also called a DIGITAL-Intel-Xerox (DIX) packet. The PAR also uses the pattern structures and extraction operations database 308 to identify the next protocol and parameters associated with that protocol that enables analysis of the next protocol layer. Once a pattern or a set of patterns has been identified, it/they will be associated with a set of none or more extraction operations. These extraction operations (in the form of commands and associated parameters) are passed to the extraction process 306 implemented by an extracting and information identifying (EII) engine that extracts selected parts of the packet, including identifying information from the packet as required for recognizing this packet as part of a flow. The extracted information is put in sequence and then processed in block 312 to build a unique flow signature (also called a "key") for this flow. A flow signature depends on the protocols used in the packet. For some protocols, the extracted components may include source and destination addresses. For example, Ethernet frames have end-point addresses that are useful in building a better flow signature. Thus, the signature typically includes the client and server address pairs. The signature is used to recognize further packets that are or may be part of this flow.

In the preferred embodiment, the building of the flow key includes generating a hash of the signature using a hash function. The purpose if using such a hash is conventional— to spread flow-entries identified by the signature across a database for efficient searching. The hash generated is preferably based on a hashing algorithm and such hash generation is known to those in the art.

In one embodiment, the parser passes data from the packet—a parser record—that includes the signature (i.e., selected portions of the packet), the hash, and the packet itself to allow for any state processing that requires further data from the packet. An improved embodiment of the parser subsystem might generate a parser record that has some predefined structure and that includes the signature, the hash, some flags related to some of the fields in the parser record, and parts of the packet's payload that the parser subsystem has determined might be required for further processing, e.g., for state processing.

Note that alternate embodiments may use some function other than concatenation of the selected portions of the packet to make the identifying signature. For example, some "digest function" of the concatenated selected portions may be used.

The parser record is passed onto lookup process 314 which looks in an internal data store of records of known flows that the system has already encountered, and decides (in 316) whether or not this particular packet belongs to a known flow as indicated by the presence of a flow-entry matching this flow in a database of known flows 324. A record in database 324 is associated with each encountered flow.

The parser record enters a buffer called the unified flow key buffer (UFKB). The UFKB stores the data on flows in a data structure that is similar to the parser record, but that includes a field that can be modified. In particular, one or the UFKB record fields stores the packet sequence number, and another is filled with state information in the form of a program counter for a state processor that implements state processing 328.

The determination (316) of whether a record with the same signature already exists is carried out by a lookup engine (LUE) that obtains new UFKB records and uses the hash in the UFKB record to lookup if there is a matching known flow. In the particular embodiment, the database of known flows 324 is in an external memory. A cache is associated with the database 324. A lookup by the LUE for a known record is carried out by accessing the cache using the hash, and if the entry is not already present in the cache, the entry is looked up (again using the hash) in the external memory.

The flow-entry database 324 stores flow-entries that include the unique flow-signature, state information, and extracted information from the packet for updating flows, and one or more statistical about the flow. Each entry completely describes a flow. Database 324 is organized into bins that contain a number, denoted N, of flow-entries (also called flow-entries, each a bucket), with N being 4 in the preferred embodiment. Buckets (i.e., flow-entries) are accessed via the hash of the packet from the parser subsystem 301 (i.e., the hash in the UFKB record). The hash spreads the flows across the database to allow for fast lookups of entries, allowing shallower buckets. The designer selects the bucket depth N based on the amount of memory attached to the monitor, and the number of bits of the hash data value used. For example, in one embodiment, each flow-entry is 128 bytes long, so for 128K flow-entries, 16 Mbytes are required. Using a 16-bit hash gives two flow-entries per bucket. Empirically, this has been shown to be more than adequate for the vast majority of cases. Note that another embodiment uses flow-entries that are 256 bytes long.

Herein, whenever an access to database 324 is described, it is to be understood that the access is via the cache, unless otherwise stated or clear from the context.

If there is no flow-entry found matching the signature, i.e., the signature is for a new flow, then a protocol and state identification process 318 further determines the state and protocol. That is, process 318 determines the protocols and where in the state sequence for a flow for this protocol's this packet belongs. Identification process 318 uses the extracted information and makes reference to the database 326 of state patterns and processes. Process 318 is then followed by any state operations that need to be executed on this packet by a state processor 328.

If the packet is found to have a matching flow-entry in the database 324 (e.g., in the cache), then a process 320 determines, from the looked-up flow-entry, if more classification by state processing of the flow signature is necessary. If not, a process 322 updates the flow-entry in the flow-entry database 324 (e.g., via the cache). Updating includes updating one or more statistical measures stored in the flow-entry. In our embodiment, the statistical measures are stored in counters in the flow-entry.

If state processing is required, state process 328 is commenced. State processor 328 carries out any state operations specified for the state of the flow and updates the state to the next state according to a set of state instructions obtained form the state pattern and processes database 326.

The state processor 328 analyzes both new and existing flows in order to analyze all levels of the protocol stack, ultimately classifying the flows by application (level 7 in the ISO model). It does this by proceeding from state-to-state based on predefined state transition rules and state operations as specified in state processor instruction database 326. A state transition rule is a rule typically containing a test followed by the next-state to proceed to if the test result is true. An operation is an operation to be performed while the state processor is in a particular state—for example, in order to evaluate a quantity needed to apply the state transition rule. The state processor goes through each rule and each state process until the test is true, or there are no more tests to perform.

In general, the set of state operations may be none or more operations on a packet, and carrying out the operation or operations may leave one in a state that causes exiting the system prior to completing the identification, but possibly knowing more about what state and state processes are needed to execute next, i.e., when a next packet of this flow is encountered. As an example, a state process (set of state operations) at a particular state may build a new signature for future recognition packets of the next state.

By maintaining the state of the flows and knowing that new flows may be set up using the information from previously encountered flows, the network traffic monitor 300 provides for (a) single-packet protocol recognition of flows, and (b) multiple-packet protocol recognition of flows. Monitor 300 can even recognize the application program from one or more disjointed sub-flows that occur in server announcement type flows. What may seem to prior art monitors to be some unassociated flow, may be recognized by the inventive monitor using the flow signature to be a sub-flow associated with a previously encountered sub-flow.

Thus, state processor 328 applies the first state operation to the packet for this particular flow-entry. A process 330 decides if more operations need to be performed for this state. If so, the analyzer continues looping between block 330 and 328 applying additional state operations to this particular packet until all those operations are completed—that is, there are no more operations for this packet in this state. A process 332 decides if there are further states to be analyzed for this type of flow according to the state of the flow and the protocol, in order to fully characterize the flow. If not, the conversational flow has now been fully characterized and a process 334 finalizes the classification of the conversational flow for the flow.

In the particular embodiment, the state processor 328 starts the state processing by using the last protocol recognized by the parser as an offset into a jump table (jump vector). The jump table finds the state processor instructions to use for that protocol in the state patterns and processes database 326. Most instructions test something in the unified flow key buffer, or the flow-entry in the database of known flows 324, if the entry exists. The state processor may have to test bits, do comparisons, add, or subtract to perform the test. For example, a common operation carried out by the state processor is searching for one or more patterns in the payload part of the UFKB.

Thus, in 332 in the classification, the analyzer decides whether the flow is at an end state. If not at an end state, the flow-entry is updated (or created if a new flow) for this flow-entry in process 322.

Furthermore, if the flow is known and if in 332 it is determined that there are further states to be processed using later packets, the flow-entry is updated in process 322.

The flow-entry also is updated after classification finalization so that any further packets belonging to this flow will be readily identified from their signature as belonging to this fully analyzed conversational flow.

After updating, database 324 therefore includes the set of all the conversational flows that have occurred.

Thus, the embodiment of present invention shown in FIG. 3 automatically maintains flow-entries, which in one aspect includes storing states. The monitor of FIG. 3 also generates characteristic parts of packets—the signatures—that can be used to recognize flows. The flow-entries may be identified and accessed by their signatures. Once a packet is identified to be from a known flow, the state of the flow is known and this knowledge enables state transition analysis to be performed in real time for each different protocol and application. In a complex analysis, state transitions are traversed as more and more packets are examined. Future packets that are part of the same conversational flow have their state analysis continued from a previously achieved state. When enough packets related to an application of interest have been processed, a final recognition state is ultimately reached, i.e., a set of states has been traversed by state analysis to completely characterize the conversational flow. The signature for that final state enables each new incoming packet of the same conversational flow to be individually recognized in real time.

In this manner, one of the great advantages of the present invention is realized. Once a particular set of state transitions has been traversed for the first time and ends in a final state, a short-cut recognition pattern—a signature—can be generated that will key on every new incoming packet that relates to the conversational flow. Checking a signature involves a simple operation, allowing high packet rates to be successfully monitored on the network.

In improved embodiments, several state analyzers are run in parallel so that a large number of protocols and applications may be checked for. Every known protocol and application will have at least one unique set of state transitions, and can therefore be uniquely identified by watching such transitions.

When each new conversational flow starts, signatures that recognize the flow are automatically generated on-the-fly, and as further packets in the conversational flow are encountered, signatures are updated and the states of the set of state transitions for any potential application are further traversed according to the state transition rules for the flow. The new states for the flow—those associated with a set of state transitions for one or more potential applications—are added to the records of previously encountered states for easy recognition and retrieval when a new packet in the flow is encountered.

Detailed Operation

Figure 4:
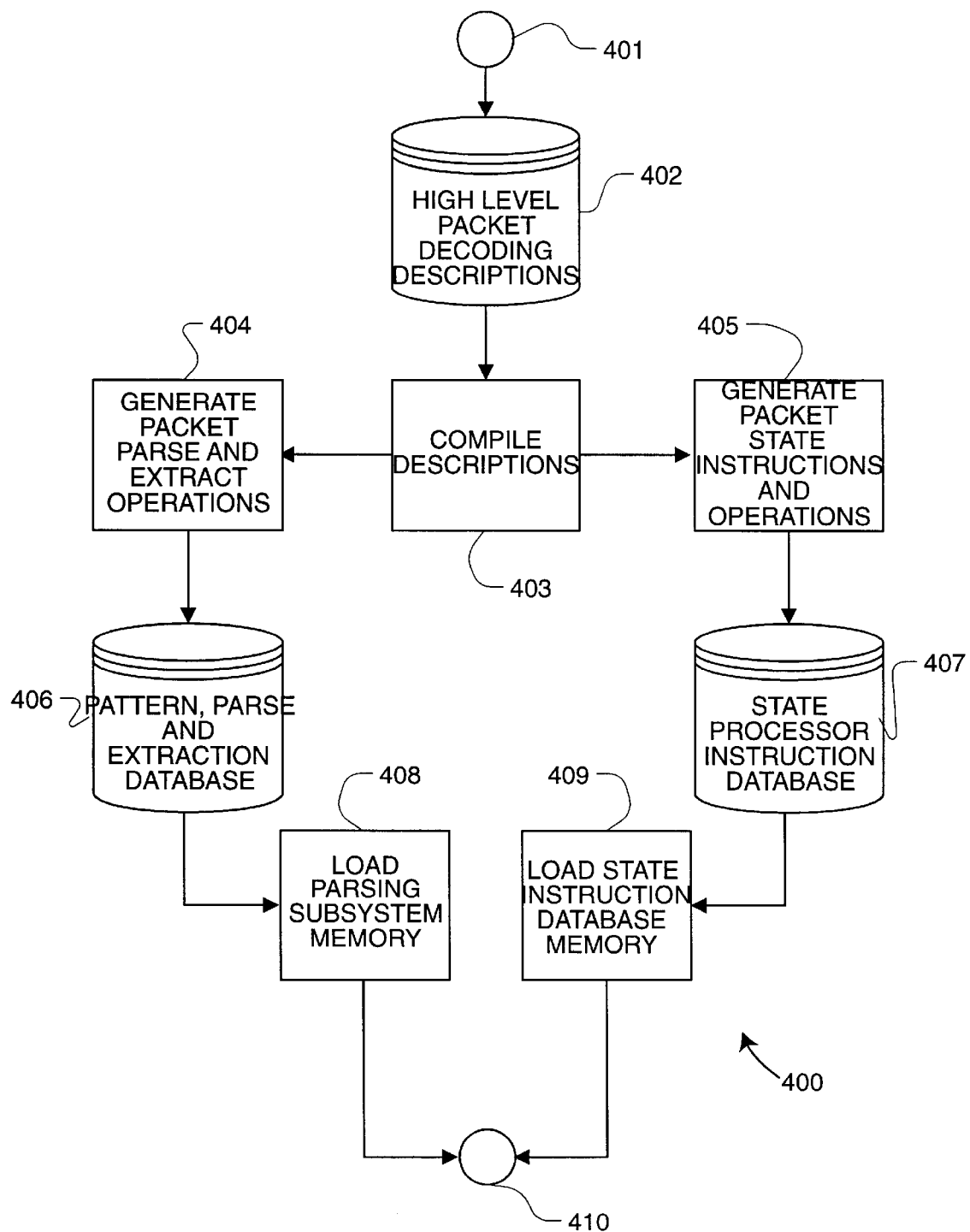
FIG. 4 is a flowchart of a high-level protocol language compiling and optimization process, which in one embodiment may be used to generate data for monitoring packets according to versions of the present invention.

FIG. 4 diagrams an initialization system 400 that includes the compilation process. That is, part of the initialization generates the pattern structures and extraction operations database 308 and the state instruction database 328. Such initialization can occur off-line or from a central location.

The different protocols that can exist in different layers may be thought of as nodes of one or more trees of linked nodes. The packet type is the root of a tree (called level 0). Each protocol is either a parent node or a terminal node. A parent node links a protocol to other protocols (child protocols) that can be at higher layer levels. Thus a protocol may have zero or more children. Ethernet packets, for example, have several variants, each having a basic format that remains substantially the same. An Ethernet packet (the root or level 0 node) may be an Ethertype packet—also called an Ethernet Type/Version 2 and a DIX (DIGITAL-Intel-Xerox packet)—or an IEEE 803.2 packet. Continuing with the IEEE 802.3 packet, one of the children nodes may be the IP protocol, and one of the children of the IP protocol may be the TCP protocol.

Figure 16:
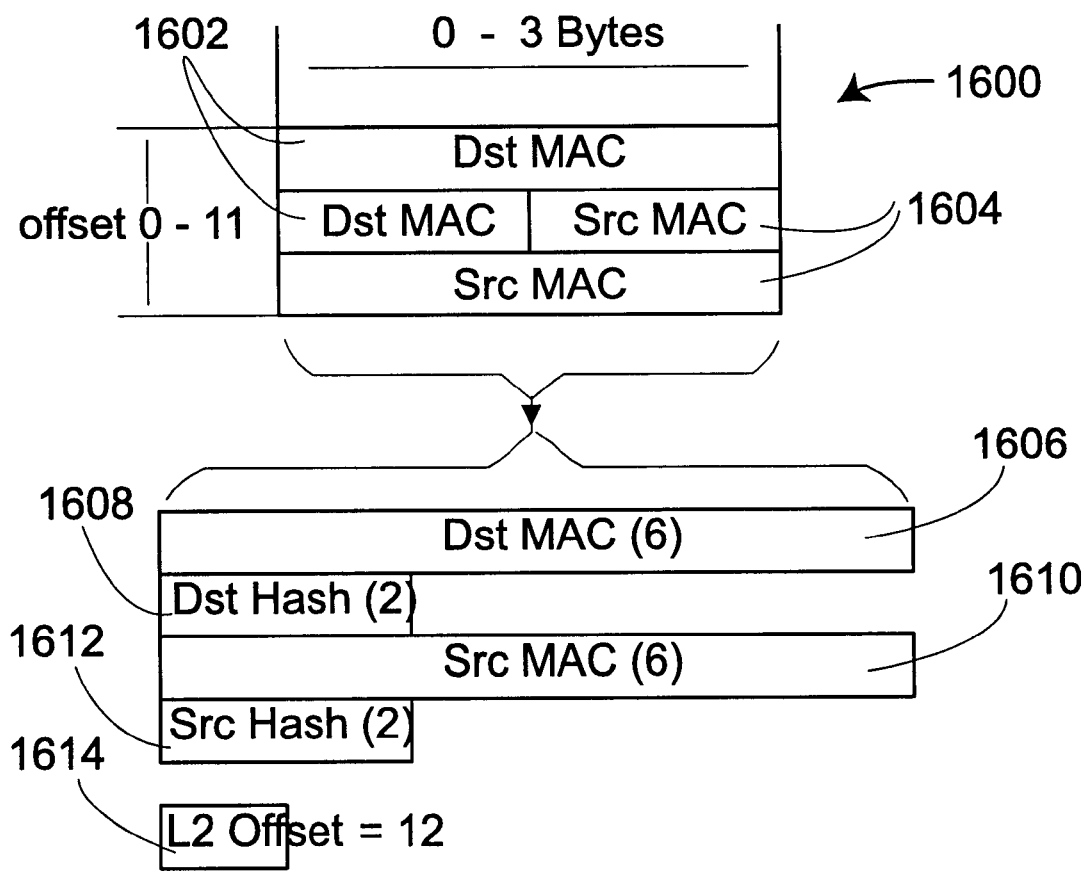
FIG. 16 is an example of the top (MAC) layer of an Ethernet packet and some of the elements that may be extracted to form a signature according to one aspect of the invention.

FIG. 16 shows the header 1600 (base level 1) of a complete Ethernet frame (i.e., packet) of information and includes information on the destination media access control address (Dst MAC 1602) and the source media access control address (Src MAC 1604). Also shown in FIG. 16 is some (but not all) of the information specified in the PDL files for extraction the signature.

Figure 17A:
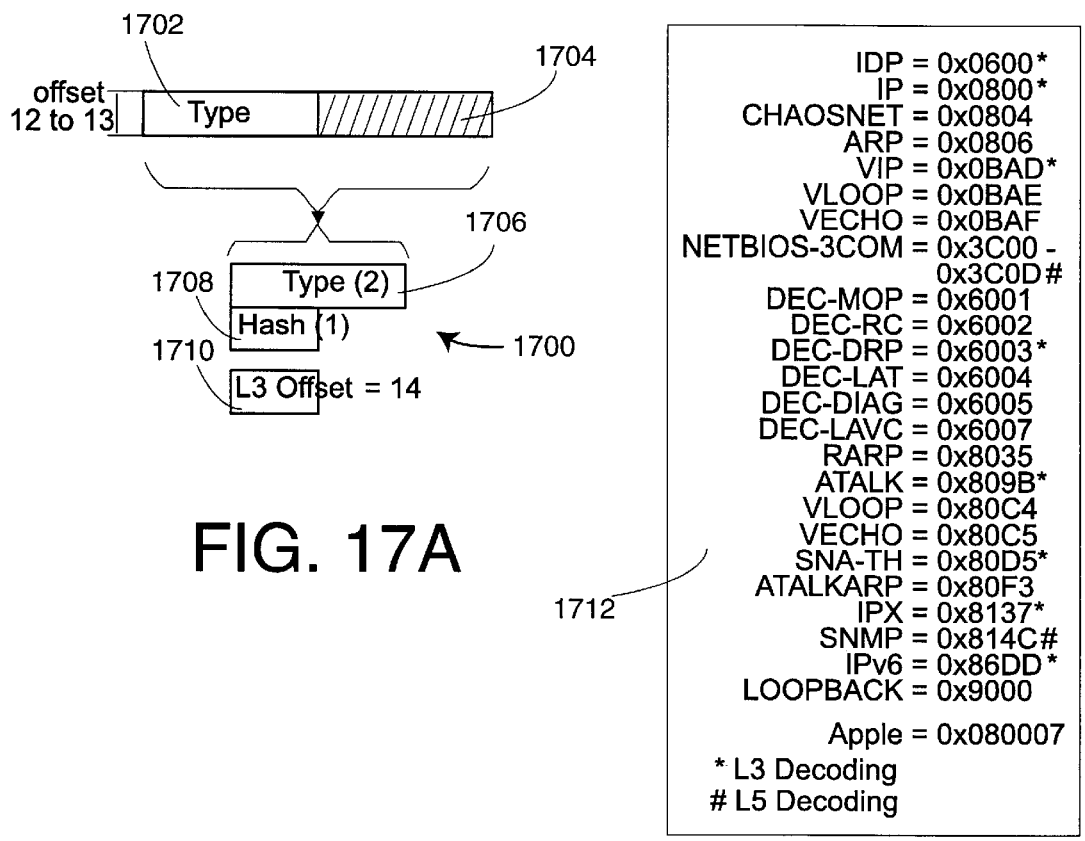
FIG. 17A is an example of the header of an Ethertype type of Ethernet packet of FIG. 16 and some of the elements that may be extracted to form a signature according to one aspect of the invention.
Figure 17B:
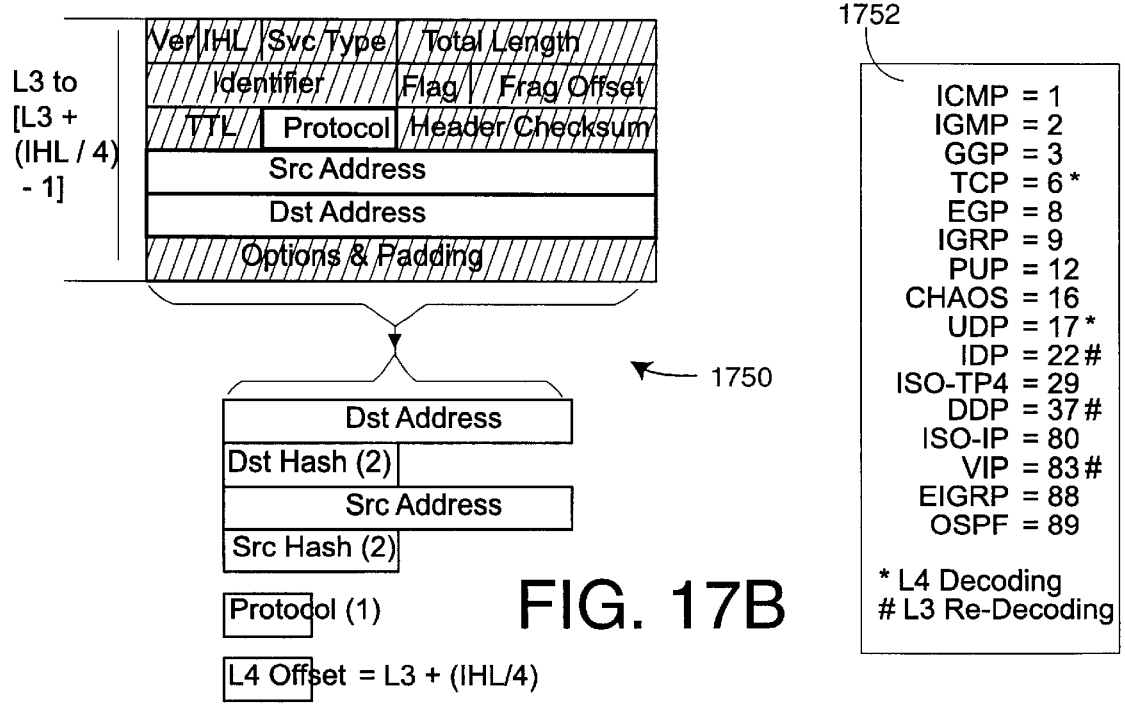
FIG. 17B is an example of an IP packet, for example, of the Ethertype packet shown in FIGS. 16 and 17A, and some of the elements that may be extracted to form a signature according to one aspect of the invention.

FIG. 17A now shows the header information for the next level (level-2) for an Ethertype packet 1700. For an Ethertype packet 1700, the relevant information from the packet that indicates the next layer level is a two-byte type field 1702 containing the child recognition pattern for the next level. The remaining information 1704 is shown hatched because it not relevant for this level. The list 1712 shows the possible children for an Ethertype packet as indicated by what child recognition pattern is found offset 12. FIG. 17B shows the structure of the header of one of the possible next levels, that of the IP protocol. The possible children of the IP protocol are shown in table 1752.

Figure 18A:
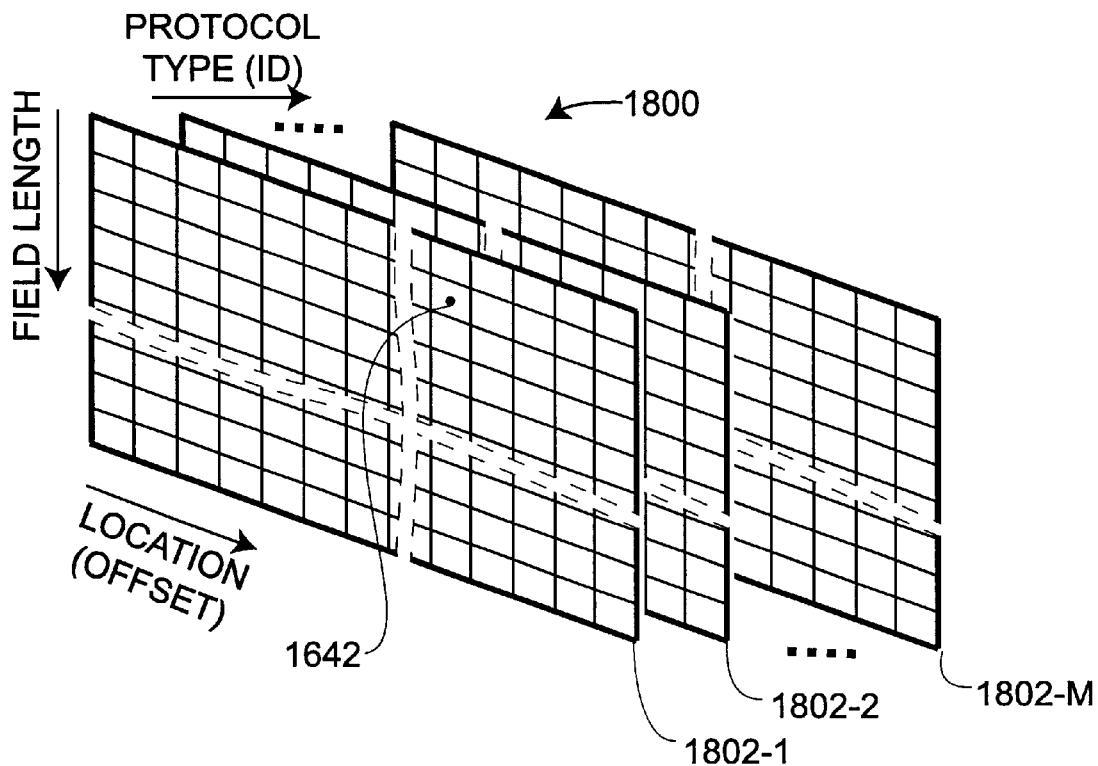
FIG. 18A is a three dimensional structure that can be used to store elements of the pattern, parse and extraction database used by the parser subsystem in accordance to one embodiment of the invention.

The pattern, parse, and extraction database (pattern recognition database, or PRD) 308 generated by compilation process 310, in one embodiment, is in the form of a three dimensional structure that provides for rapidly searching packet headers for the next protocol. FIG. 18A shows such a 3-D representation 1800 (which may be considered as an indexed set of 2-D representations). A compressed form of the 3-D structure is preferred.

Figure 18B:
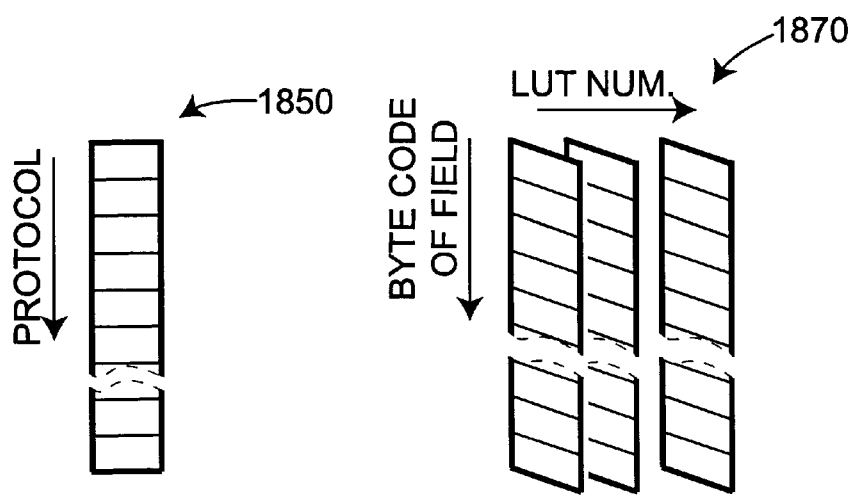
FIG. 18B is an alternate form of storing elements of the pattern, parse and extraction database used by the parser subsystem in accordance to another embodiment of the invention.

An alternate embodiment of the data structure used in database 308 is illustrated in FIG. 18B. Thus, like the 3-D structure of FIG. 18A, the data structure permits rapid searches to be performed by the pattern recognition process 304 by indexing locations in a memory rather than performing address link computations. In this alternate embodiment, the PRD 308 includes two parts, a single protocol table 1850 (PT) which has an entry for each protocol known for the monitor, and a series of Look Up Tables 1870 (LUT's) that are used to identify known protocols and their children. The protocol table includes the parameters needed by the pattern analysis and recognition process 304 (implemented by PRE 1006) to evaluate the header information in the packet that is associated with that protocol, and parameters needed by extraction process 306 (implemented by slicer 1007) to process the packet header. When there are children, the PT describes which bytes in the header to evaluate to determine the child protocol. In particular, each PT entry contains the header length, an offset to the child, a slicer command, and some flags.

The pattern matching is carried out by finding particular "child recognition codes" in the header fields, and using these codes to index one or more of the LUT's. Each LUT entry has a node code that can have one of four values, indicating the protocol that has been recognized, a code to indicate that the protocol has been partially recognized (more LUT lookups are needed), a code to indicate that this is a terminal node, and a null node to indicate a null entry. The next LUT to lookup is also returned from a LUT lookup.

Compilation process is described in FIG. 4. The source-code information in the form of protocol description files is shown as 402. In the particular embodiment, the high level decoding descriptions includes a set of protocol description files 336, one for each protocol, and a set of packet layer selections 338, which describes the particular layering (sets of trees of protocols) that the monitor is to be able to handle.

A compiler 403 compiles the descriptions. The set of packet parse-and-extract operations 406 is generated (404), and a set of packet state instructions and operations 407 is generated (405) in the form of instructions for the state processor that implements state processing process 328. Data files for each type of application and protocol to be recognized by the analyzer are downloaded from the pattern, parse, and extraction database 406 into the memory systems of the parser and extraction engines. (See the parsing process 500 description and FIG. 5; the extraction process 600 description and FIG. 6; and the parsing subsystem hardware description and FIG. 10). Data files for each type of application and protocol to be recognized by the analyzer are also downloaded from the state-processor instruction database 407 into the state processor. (see the state processor 1108 description and FIG. 11.).

Note that generating the packet parse and extraction operations builds and links the three dimensional structure (one embodiment) or the or all the lookup tables for the PRD.

Because of the large number of possible protocol trees and subtrees, the compiler process 400 includes optimization that compares the trees and subtrees to see which children share common parents. When implemented in the form of the LUT's, this process can generate a single LUT from a plurality of LUT's. The optimization process further includes a compaction process that reduces the space needed to store the data of the PRD.

As an example of compaction, consider the 3-D structure of FIG. 18A that can be thought of as a set of 2-D structures each representing a protocol. To enable saving space by using only one array per protocol which may have several parents, in one embodiment, the pattern analysis subprocess keeps a "current header" pointer. Each location (offset) index for each protocol 2-D array in the 3-D structure is a relative location starting with the start of header for the particular protocol. Furthermore, each of the two-dimensional arrays is sparse. The next step of the optimization, is checking all the 2-D arrays against all the other 2-D arrays to find out which ones can share memory. Many of these 2-D arrays are often sparsely populated in that they each have only a small number of valid entries. So, a process of "folding" is next used to combine two or more 2-D arrays together into one physical 2-D array without losing the identity of any of the original 2-D arrays (i.e., all the 2-D arrays continue to exist logically). Folding can occur between any 2-D arrays irrespective of their location in the tree as long as certain conditions are met. Multiple arrays may be combined into a single array as long as the individual entries do not conflict with each other. A fold number is then used to associate each element with its original array. A similar folding process is used for the set of LUTs 1850 in the alternate embodiment of FIG. 18B.

In 410, the analyzer has been initialized and is ready to perform recognition.

Figure 5:
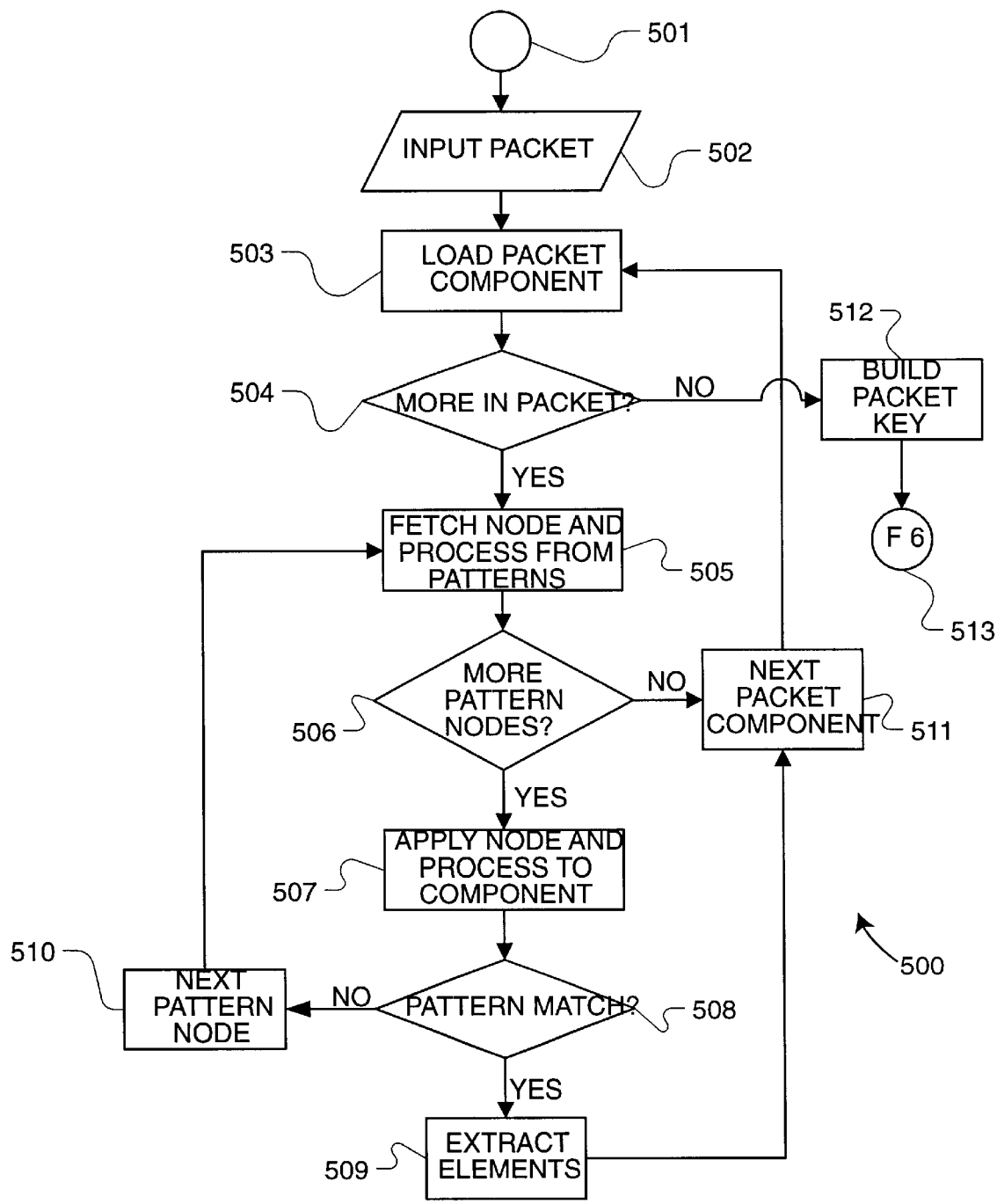
FIG. 5 is a flowchart of a packet parsing process used as part of the parser in an embodiment of the inventive packet monitor.

FIG. 5 shows a flowchart of how actual parser subsystem 301 functions. Starting at 501, the packet 302 is input to the packet buffer in step 502. Step 503 loads the next (initially the first) packet component from the packet 302. The packet components are extracted from each packet 302 one element at a time. A check is made (504) to determine if the load-packet-component operation 503 succeeded, indicating that there was more in the packet to process. If not, indicating all components have been loaded, the parser subsystem 301 builds the packet signature (512)—the next stage (FIG. 6).

If a component is successfully loaded in 503, the node and processes are fetched (505) from the pattern, parse and extraction database 308 to provide a set of patterns and processes for that node to apply to the loaded packet component. The parser subsystem 301 checks (506) to determine if the fetch pattern node operation 505 completed successfully, indicating there was a pattern node that loaded in 505. If not, step 511 moves to the next packet component. If yes, then the node and pattern matching process are applied in 507 to the component extracted in 503. A pattern match obtained in 507 (as indicated by test 508) means the parser subsystem 301 has found a node in the parsing elements; the parser subsystem 301 proceeds to step 509 to extract the elements.

If applying the node process to the component does not produce a match (test 508), the parser subsystem 301 moves (510) to the next pattern node from the pattern database 308 and to step 505 to fetch the next node and process. Thus, there is an "applying patterns" loop between 508 and 505. Once the parser subsystem 301 completes all the patterns and has either matched or not, the parser subsystem 301 moves to the next packet component (511).

Figure 6:
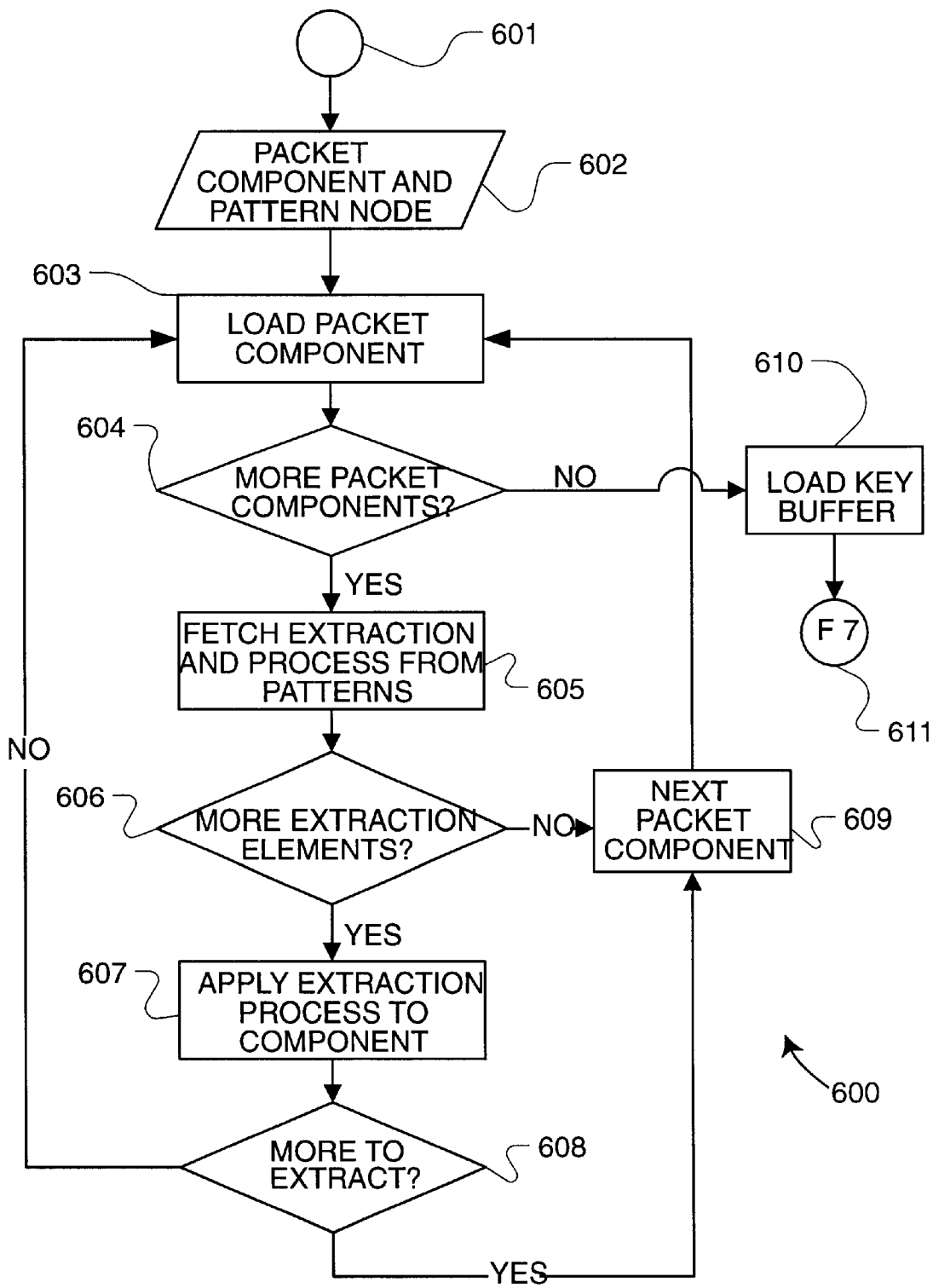
FIG. 6 is a flowchart of a packet element extraction process that is used as part of the parser in an embodiment of the inventive packet monitor.

Once all the packet components have been the loaded and processed from the input packet 302, then the load packet will fail (indicated by test 504), and the parser subsystem 301 moves to build a packet signature which is described in FIG. 6 FIG. 6 is a flow chart for extracting the information from which to build the packet signature. The flow starts at 601, which is the exit point 513 of FIG. 5. At this point parser subsystem 301 has a completed packet component and a pattern node available in a buffer (602). Step 603 loads the packet component available from the pattern analysis process of FIG. 5. If the load completed (test 604), indicating that there was indeed another packet component, the parser subsystem 301 fetches in 605 the extraction and process elements received from the pattern node component in 602. If the fetch was successful (test 606), indicating that there are extraction elements to apply, the parser subsystem 301 in step 607 applies that extraction process to the packet component based on an extraction instruction received from that pattern node. This removes and saves an element from the packet component.

In step 608, the parser subsystem 301 checks if there is more to extract from this component, and if not, the parser subsystem 301 moves back to 603 to load the next packet component at hand and repeats the process. If the answer is yes, then the parser subsystem 301 moves to the next packet component ratchet. That new packet component is then loaded in step 603. As the parser subsystem 301 moved through the loop between 608 and 603, extra extraction processes are applied either to the same packet component if there is more to extract, or to a different packet component if there is no more to extract.

The extraction process thus builds the signature, extracting more and more components according to the information in the patterns and extraction database 308 for the particular packet. Once loading the next packet component operation 603 fails (test 604), all the components have been extracted. The built signature is loaded into the signature buffer (610) and the parser subsystem 301 proceeds to FIG. 7 to complete the signature generation process.

Figure 7:
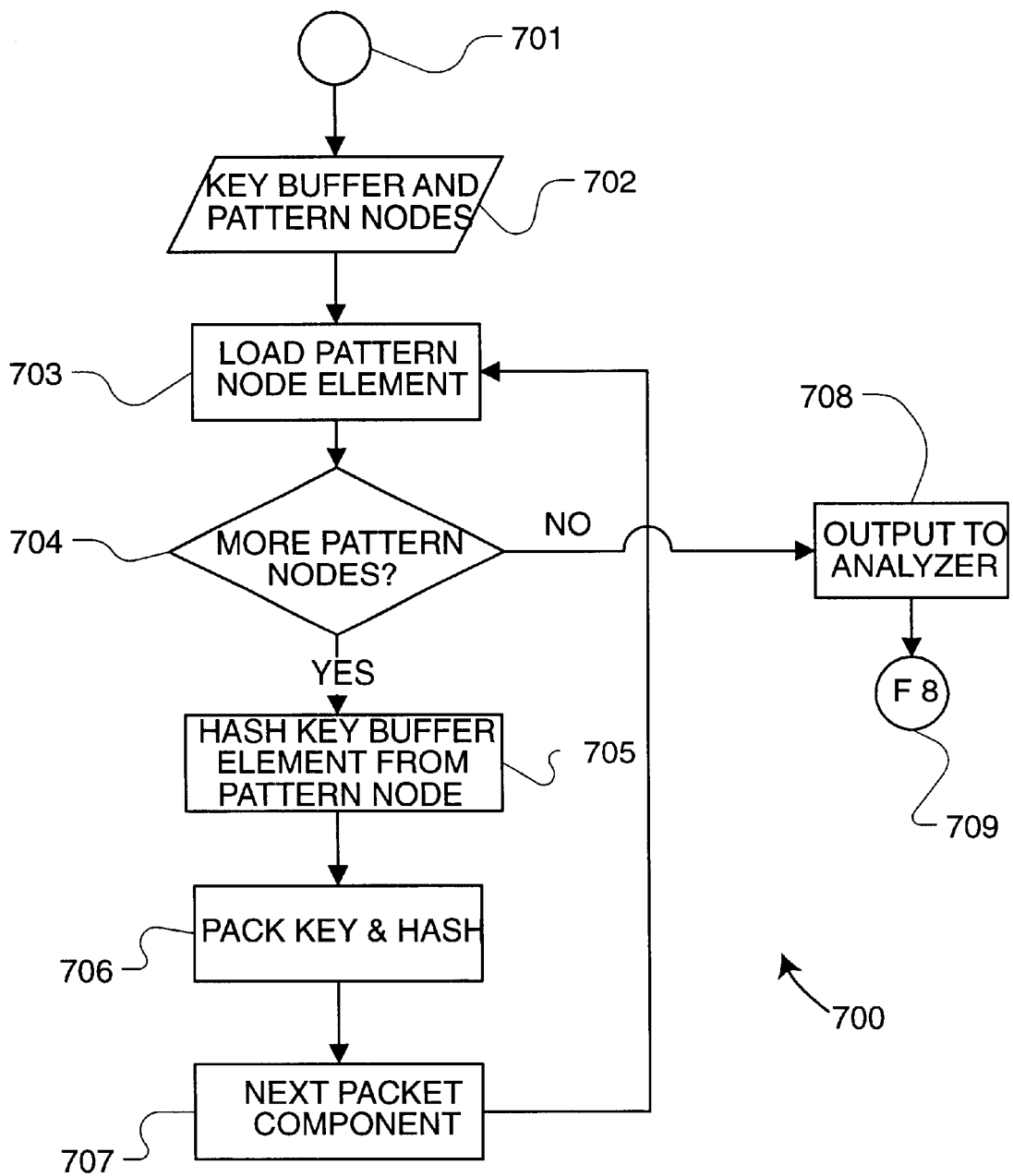
FIG. 7 is a flowchart of a flow-signature building process that is used as part of the parser in the inventive packet monitor.

Referring now to FIG. 7, the process continues at 701. The signature buffer and the pattern node elements are available (702). The parser subsystem 301 loads the next pattern node element. If the load was successful (test 704) indicating there are more nodes, the parser subsystem 301 in 705 hashes the signature buffer element based on the hash elements that are found in the pattern node that is in the element database. In 706 the resulting signature and the hash are packed. In 707 the parser subsystem 301 moves on to the next packet component which is loaded in 703.

The 703 to 707 loop continues until there are no more patterns of elements left (test 704). Once all the patterns of elements have been hashed, processes 304, 306 and 312 of parser subsystem 301 are complete. Parser subsystem 301 has generated the signature used by the analyzer subsystem 303.

A parser record is loaded into the analyzer, in particular, into the UFKB in the form of a UFKB record which is similar to a parser record, but with one or more different fields.

Figure 8:
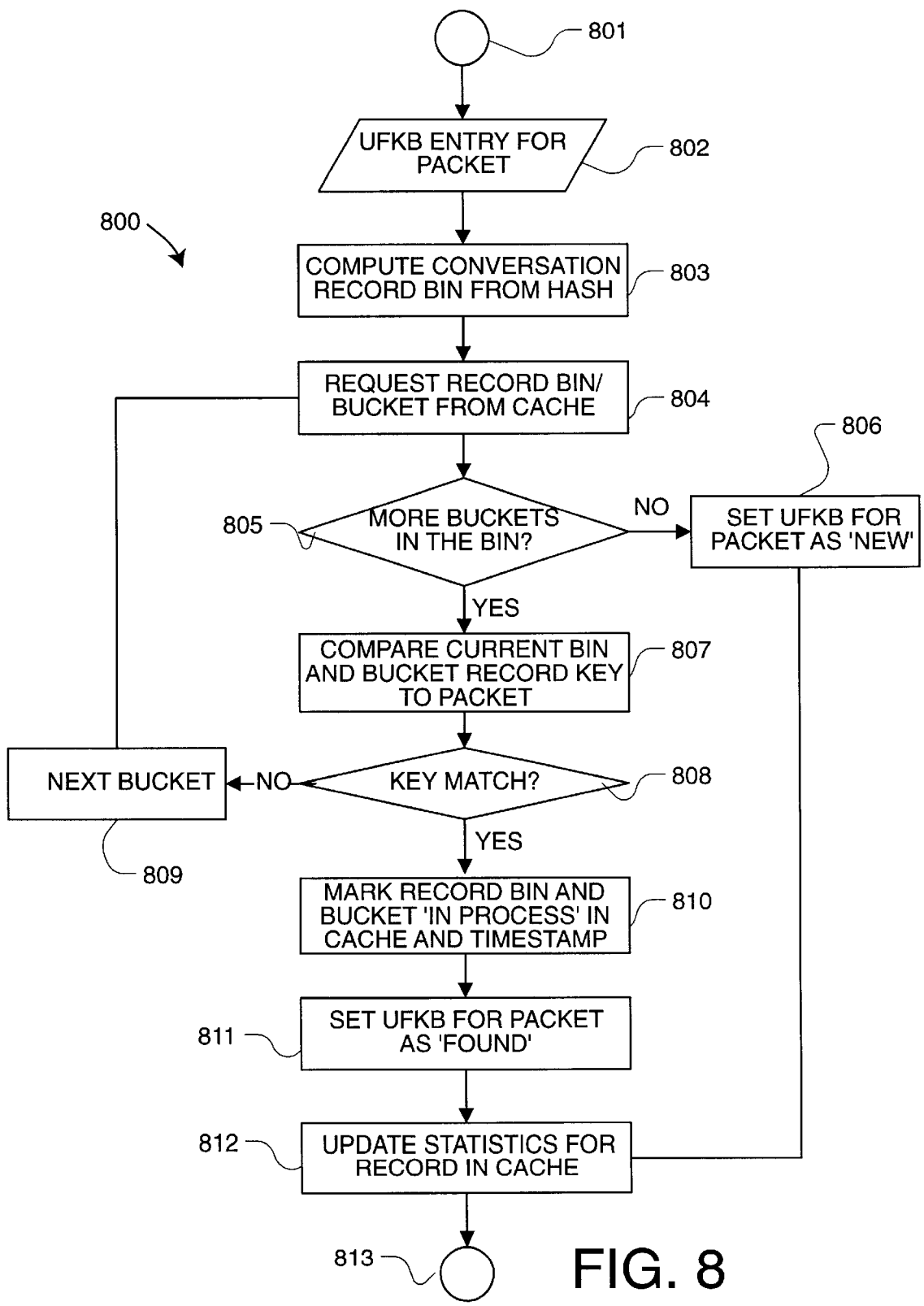
FIG. 8 is a flowchart of a monitor lookup and update process that is used as part of the analyzer in an embodiment of the inventive packet monitor.

FIG. 8 is a flow diagram describing the operation of the lookup/update engine (LUE) that implements lookup operation 314. The process starts at 801 from FIG. 7 with the parser record that includes a signature, the hash and at least parts of the payload. In 802 those elements are shown in the form of a UFKB-entry in the buffer. The LUE, the lookup engine 314 computes a "record bin number" from the hash for a flow-entry. A bin herein may have one or more "buckets" each containing a flow-entry. The preferred embodiment has four buckets per bin.

Since preferred hardware embodiment includes the cache, all data accesses to records in the flowchart of FIG. 8 are stated as being to or from the cache.

Thus, in 804, the system looks up the cache for a bucket from that bin using the hash. If the cache successfully returns with a bucket from the bin number, indicating there are more buckets in the bin, the lookup/update engine compares (807) the current signature (the UFKB-entry's signature) from that in the bucket (i.e., the flow-entry signature). If the signatures match (test 808), that record (in the cache) is marked in step 810 as "in process" and a timestamp added. Step 811 indicates to the UFKB that the UFKB-entry in 802 has a status of "found." The "found" indication allows the state processing 328 to begin processing this UFKB element. The preferred hardware embodiment includes one or more state processors, and these can operate in parallel with the lookup/update engine.

In the preferred embodiment, a set of statistical operations is performed by a calculator for every packet analyzed. The statistical operations may include one or more of counting the packets associated with the flow; determining statistics related to the size of packets of the flow; compiling statistics on differences between packets in each direction, for example using timestamps; and determining statistical relationships of timestamps of packets in the same direction. The statistical measures are kept in the flow-entries. Other statistical measures also may be compiled. These statistics may be used singly or in combination by a statistical processor component to analyze many different aspects of the flow. This may include determining network usage metrics from the statistical measures, for example to ascertain the network's ability to transfer information for this application. Such analysis provides for measuring the quality of service of a conversation, measuring how well an application is performing in the network, measuring network resources consumed by an application, and so forth.

To provide for such analyses, the lookup/update engine updates one or more counters that are part of the flow-entry (in the cache) in step 812. The process exits at 813. In our embodiment, the counters include the total packets of the flow, the time, and a differential time from the last timestamp to the present timestamp.

It may be that the bucket of the bin did not lead to a signature match (test 808). In such a case, the analyzer in 809 moves to the next bucket for this bin. Step 804 again looks up the cache for another bucket from that bin. The lookup/update engine thus continues lookup up buckets of the bin until there is either a match in 808 or operation 804 is not successful (test 805), indicating that there are no more buckets in the bin and no match was found.

If no match was found, the packet belongs to a new (not previously encountered) flow. In 806 the system indicates that the record in the unified flow key buffer for this packet is new, and in 812, any statistical updating operations are performed for this packet by updating the flow-entry in the cache. The update operation exits at 813. A flow insertion/deletion engine (FIDE) creates a new record for this flow (again via the cache).

Thus, the updatelookup engine ends with a UFKB-entry for the packet with a "new" status or a "found" status.

Note that the above system uses a hash to which more than one flow-entry can match. A longer hash may be used that corresponds to a single flow-entry. In such an embodiment, the flow chart of FIG. 8 is simplified as would be clear to those in the art.

The Hardware System

Figure 14:
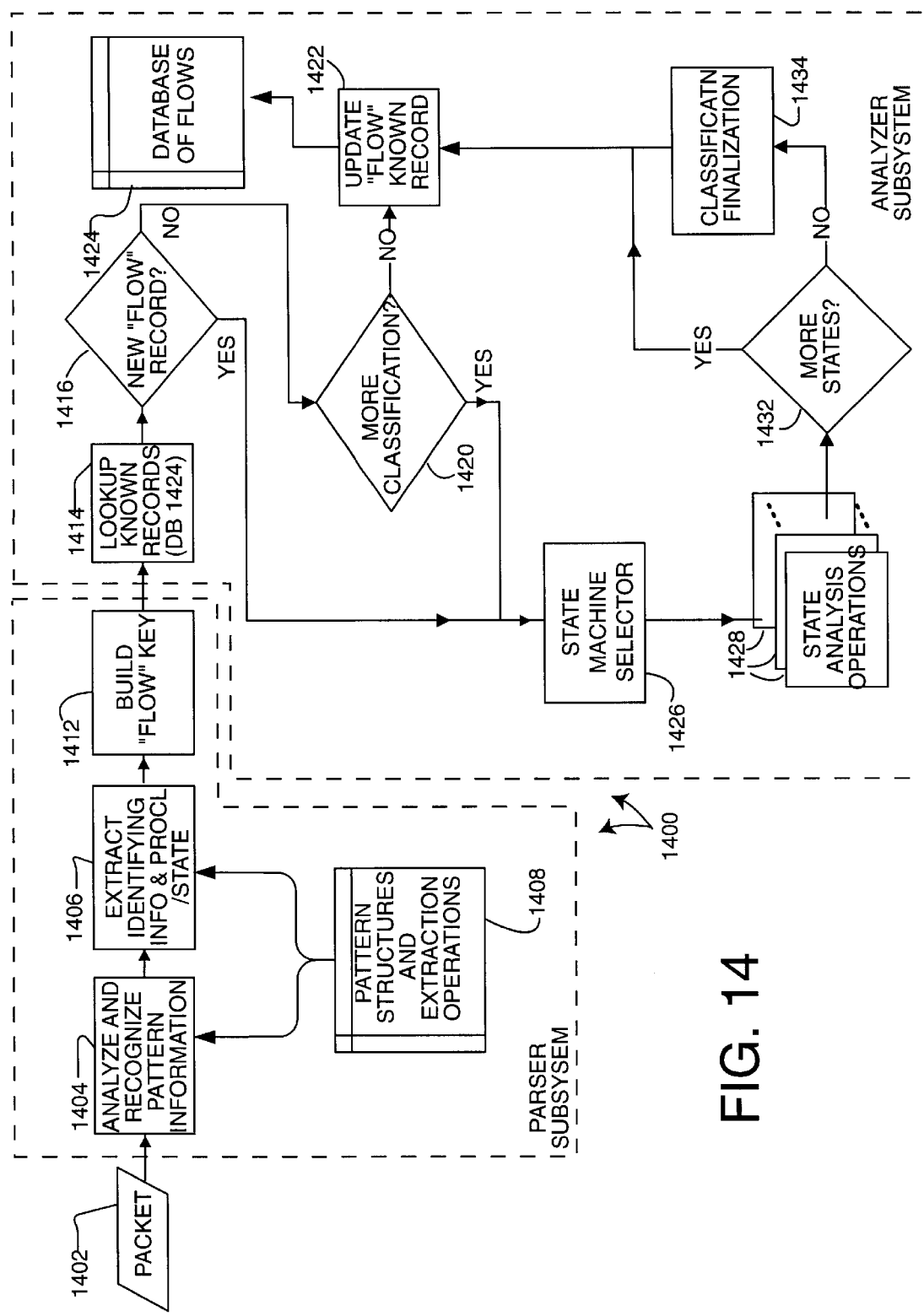
FIG. 14 is a simple functional block diagram of a process embodiment of the present invention that can operate as the packet monitor shown in FIG. 1. This process may be implemented in software.

Each of the individual hardware elements through which the data flows in the system are now described with reference to FIGS. 10 and 11. Note that while we are describing a particular hardware implementation of the invention embodiment of FIG. 3, it would be clear to one skilled in the art that the flow of FIG. 3 may alternatively be implemented in software running on one or more general-purpose processors, or only partly implemented in hardware. An implementation of the invention that can operate in software is shown in FIG. 14. The hardware embodiment (FIGS. 10 and 11) can operate at over a million packets per second, while the software system of FIG. 14 may be suitable for slower networks. To one skilled in the art it would be clear that more and more of the system may be implemented in software as processors become faster.

Figure 10:
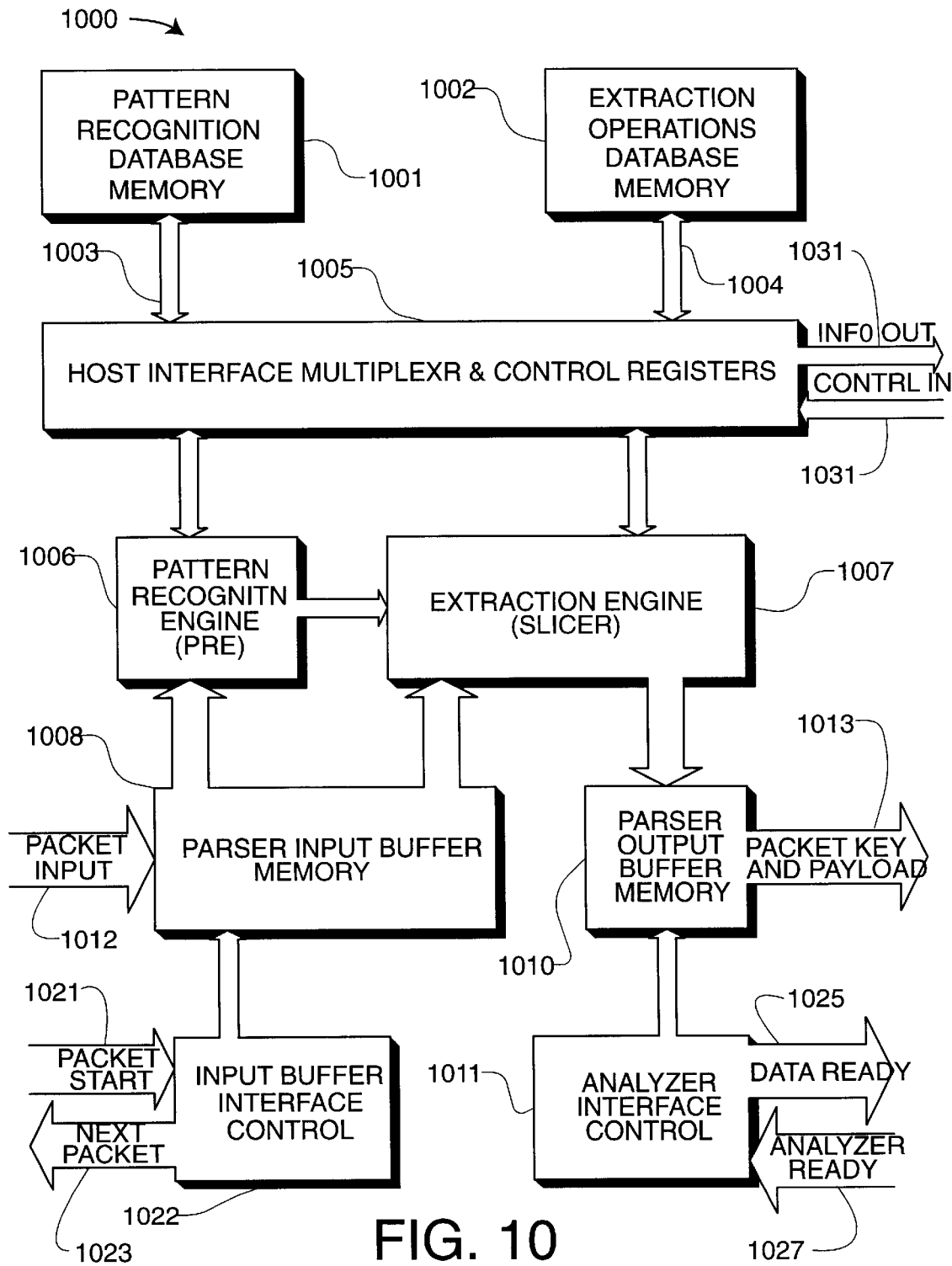
FIG. 10 is a functional block diagram of a hardware parser subsystem including the pattern recognizer and extractor that can form part of the parser module in an embodiment of the inventive packet monitor.

FIG. 10 is a description of the parsing subsystem (301, shown here as subsystem 1000) as implemented in hardware. Memory 1001 is the pattern recognition database memory, in which the patterns that are going to be analyzed are stored. Memory 1002 is the extraction-operation database memory, in which the extraction instructions are stored. Both 1001 and 1002 correspond to internal data structure 308 of FIG. 3. Typically, the system is initialized from a microprocessor (not shown) at which time these memories are loaded through a host interface multiplexor and control register 1005 via the internal buses 1003 and 1004. Note that the contents of 1001 and 1002 are preferably obtained by compiling process 310 of FIG. 3.

A packet enters the parsing system via 1012 into a parser input buffer memory 1008 using control signals 1021 and 1023, which control an input buffer interface controller 1022. The buffer 1008 and interface control 1022 connect to a packet acquisition device (not shown). The buffer acquisition device generates a packet start signal 1021 and the interface control 1022 generates a next packet (i.e., ready to receive data) signal 1023 to control the data flow into parser input buffer memory 1008. Once a packet starts loading into the buffer memory 1008, pattern recognition engine (PRE) 1006 carries out the operations on the input buffer memory described in block 304 of FIG. 3. That is, protocol types and associated headers for each protocol layer that exist in the packet are determined.

The PRE searches database 1001 and the packet in buffer 1008 in order to recognize the protocols the packet contains. In one implementation, the database 1001 includes a series of linked lookup tables. Each lookup table uses eight bits of addressing. The first lookup table is always at address zero. The Pattern Recognition Engine uses a base packet offset from a control register to start the comparison. It loads this value into a current offset pointer (COP). It then reads the byte at base packet offset from the parser input buffer and uses it as an address into the first lookup table.

Each lookup table returns a word that links to another lookup table or it returns a terminal flag. If the lookup produces a recognition event the database also returns a command for the slicer. Finally it returns the value to add to the COP.

The PRE 1006 includes of a comparison engine. The comparison engine has a first stage that checks the protocol type field to determine if it is an 802.3 packet and the field should be treated as a length. If it is not a length, the protocol is checked in a second stage. The first stage is the only protocol level that is not programmable. The second stage has two full sixteen bit content addressable memories (CAMs) defined for future protocol additions.

Thus, whenever the PRE recognizes a pattern, it also generates a command for the extraction engine (also called a "slicer") 1007. The recognized patterns and the commands are sent to the extraction engine 1007 that extracts information from the packet to build the parser record. Thus, the operations of the extraction engine are those carried out in blocks 306 and 312 of FIG. 3. The commands are sent from PRE 1006 to slicer 1007 in the form of extraction instruction pointers which tell the extraction engine 1007 where to a find the instructions in the extraction operations database memory (i.e., slicer instruction database) 1002.

Thus, when the PRE 1006 recognizes a protocol it outputs both the protocol identifier and a process code to the extractor. The protocol identifier is added to the flow signature and the process code is used to fetch the first instruction from the instruction database 1002. Instructions include an operation code and usually source and destination offsets as well as a length. The offsets and length are in bytes. A typical operation is the MOVE instruction. This instruction tells the slicer 1007 to copy n bytes of data unmodified from the input buffer 1008 to the output buffer 1010. The extractor contains a byte-wise barrel shifter so that the bytes moved can be packed into the flow signature. The extractor contains another instruction called HASH. This instruction tells the extractor to copy from the input buffer 1008 to the HASH generator.

Thus these instructions are for extracting selected element (s) of the packet in the input buffer memory and transferring the data to a parser output buffer memory 1010. Some instructions also generate a hash.

The extraction engine 1007 and the PRE operate as a pipeline. That is, extraction engine 1007 performs extraction operations on data in input buffer 1008 already processed by PRE 1006 while more (i.e., later arriving) packet information is being simultaneously parsed by PRE 1006. This provides high processing speed sufficient to accommodate the high arrival rate speed of packets.

Once all the selected parts of the packet used to form the signature are extracted, the hash is loaded into parser output buffer memory 1010. Any additional payload from the packet that is required for further analysis is also included. The parser output memory 1010 is interfaced with the analyzer subsystem by analyzer interface control 1011. Once all the information of a packet is in the parser output buffer memory 1010, a data ready signal 1025 is asserted by analyzer interface control. The data from the parser subsystem 1000 is moved to the analyzer subsystem via 1013 when an analyzer ready signal 1027 is asserted.

Figure 11:
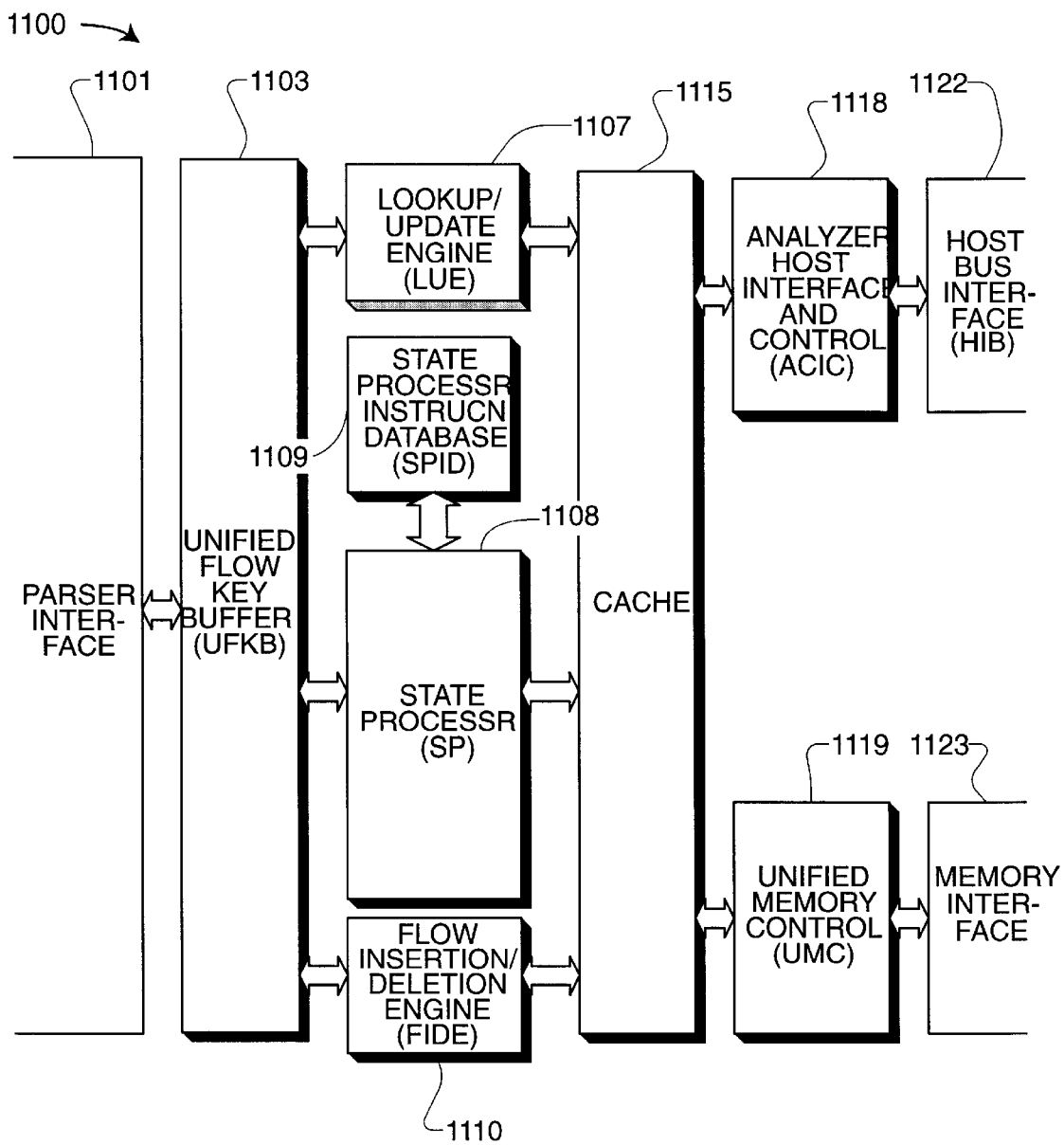
FIG. 11 is a functional block diagram of a hardware analyzer including a state processor that can form part of an embodiment of the inventive packet monitor.

FIG. 11 shows the hardware components and dataflow for the analyzer subsystem that performs the functions of the analyzer subsystem 303 of FIG. 3. The analyzer is initialized prior to operation, and initialization includes loading the state processing information generated by the compilation process 310 into a database memory for the state processing, called state processor instruction database (SPID) memory 1109.

The analyzer subsystem 1100 includes a host bus interface 1122 using an analyzer host interface controller 1118, which in turn has access to a cache system 1115. The cache system has bi-directional access to and from the state processor of the system 1108. State processor 1108 is responsible for initializing the state processor instruction database memory 1109 from information given over the host bus interface 1122.

With the SPID 1109 loaded, the analyzer subsystem 1100 receives parser records comprising packet signatures and payloads that come from the parser into the unified flow key buffer (UFKB) 1103. UFKB is comprised of memory set up to maintain UFKB records. A UFKB record is essentially a parser record; the UFKB holds records of packets that are to be processed or that are in process. Furthermore, the UFKB provides for one or more fields to act as modifiable status flags to allow different processes to run concurrently.

Three processing engines run concurrently and access records in the UFKB 1103: the lookup/update engine (LUE) 1107, the state processor (SP) 1108, and the flow insertion and deletion engine (FIDE) 1110. Each of these is implemented by one or more finite state machines (FSM's). There is bi-directional access between each of the finite state machines and the unified flow key buffer 1103. The UFKB record includes a field that stores the packet sequence number, and another that is filled with state information in the form of a program counter for the state processor 1108 that implements state processing 328. The status flags of the UFKB for any entry includes that the LUE is done and that the LUE is transferring processing of the entry to the state processor. The LUE done indicator is also used to indicate what the next entry is for the LUE. There also is provided a flag to indicate that the state processor is done with the current flow and to indicate what the next entry is for the state processor. There also is provided a flag to indicate the state processor is transferring processing of the UFKB-entry to the flow insertion and deletion engine.

A new UFKB record is first processed by the LUE 1107. A record that has been processed by the LUE 1107 may be processed by the state processor 1108, and a UFKB record data may be processed by the flow insertion/deletion engine 110 after being processed by the state processor 1108 or only by the LUE. Whether or not a particular engine has been applied to any unified flow key buffer entry is determined by status fields set by the engines upon completion. In one embodiment, a status flag in the UFKB-entry indicates whether an entry is new or found. In other embodiments, the LUE issues a flag to pass the entry to the state processor for processing, and the required operations for a new record are included in the SP instructions.

Note that each UFKB-entry may not need to be processed by all three engines. Furthermore, some UFKB entries may need to be processed more than once by a particular engine.

Each of these three engines also has bi-directional access to a cache subsystem 1115 that includes a caching engine. Cache 1115 is designed to have information flowing in and out of it from five different points within the system: the three engines, external memory via a unified memory controller (UMC) 1119 and a memory interface 1123, and a microprocessor via analyzer host interface and control unit (ACIC) 1118 and host interface bus (HIB) 1122. The analyzer microprocessor (or dedicated logic processor) can thus directly insert or modify data in the cache.

The cache subsystem 1115 is an associative cache that includes a set of content addressable memory cells (CAMs) each including an address portion and a pointer portion pointing to the cache memory (e.g., RAM) containing the cached flow-entries. The CAMs are arranged as a stack ordered from a top CAM to a bottom CAM. The bottom CAM's pointer points to the least recently used (LRU) cache memory entry. Whenever there is a cache miss, the contents of cache memory pointed to by the bottom CAM are replaced by the flow-entry from the flow-entry database 324. This now becomes the most recently used entry, so the contents of the bottom CAM are moved to the top CAM and all CAM contents are shifted down. Thus, the cache is an associative cache with a true LRU replacement policy.

The LUE 1107 first processes a UFKB-entry, and basically performs the operation of blocks 314 and 316 in FIG. 3. A signal is provided to the LUE to indicate that a "new" UFKB-entry is available. The LUE uses the hash in the UFKB-entry to read a matching bin of up to four buckets from the cache. The cache system attempts to obtain the matching bin. If a matching bin is not in the cache, the cache 1115 makes the request to the UMC 1119 to bring in a matching bin from the external memory.

When a flow-entry is found using the hash, the LUE 1107 looks at each bucket and compares it using the signature to the signature of the UFKB-entry until there is a match or there are no more buckets.

If there is no match, or if the cache failed to provide a bin of flow-entries from the cache, a time stamp in set in the flow key of the UFKB record, a protocol identification and state determination is made using a table that was loaded by compilation process 310 during initialization, the status for the record is set to indicate the LUE has processed the record, and an indication is made that the UFKB-entry is ready to start state processing. The identification and state determination generates a protocol identifier which in the preferred embodiment is a "jump vector" for the state processor which is kept by the UFKB for this UFKB-entry and used by the state processor to start state processing for the particular protocol. For example, the jump vector jumps to the subroutine for processing the state.

If there was a match, indicating that the packet of the UFKB-entry is for a previously encountered flow, then a calculator component enters one or more statistical measures stored in the flow-entry, including the timestamp. In addition, a time difference from the last stored timestamp may be stored, and a packet count may be updated. The state of the flow is obtained from the flow-entry is examined by looking at the protocol identifier stored in the flow-entry of database 324. If that value indicates that no more classification is required, then the status for the record is set to indicate the LUE has processed the record. In the preferred embodiment, the protocol identifier is a jump vector for the state processor to a subroutine to state processing the protocol, and no more classification is indicated in the preferred embodiment by the jump vector being zero. If the protocol identifier indicates more processing, then an indication is made that the UFKB-entry is ready to start state processing and the status for the record is set to indicate the LUE has processed the record.

The state processor 1108 processes information in the cache system according to a UFKB-entry after the LUE has completed. State processor 1108 includes a state processor program counter SPPC that generates the address in the state processor instruction database 1109 loaded by compiler process 310 during initialization. It contains an Instruction Pointer (SPIP) which generates the SPID address. The instruction pointer can be incremented or loaded from a Jump Vector Multiplexor which facilitates conditional branching. The SPIP can be loaded from one of three sources: (1) A protocol identifier from the UFKB, (2) an immediate jump vector form the currently decoded instruction, or (3) a value provided by the arithmetic logic unit (SPALU) included in the state processor.

Thus, after a Flow Key is placed in the UFKB by the LUE with a known protocol identifier, the Program Counter is initialized with the last protocol recognized by the Parser. This first instruction is a jump to the subroutine which analyzes the protocol that was decoded.

The State Processor ALU (SPALU) contains all the Arithmetic, Logical and String Compare functions necessary to implement the State Processor instructions. The main blocks of the SPALU are: The A and B Registers, the Instruction Decode & State Machines, the String Reference Memory the Search Engine, an Output Data Register and an Output Control Register The Search Engine in turn contains the Target Search Register set, the Reference Search Register set, and a Compare block which compares two operands by exclusive-or-ing them together.

Thus, after the UFKB sets the program counter, a sequence of one or more state operations are be executed in state processor 1108 to further analyze the packet that is in the flow key buffer entry for this particular packet.

Figure 13:
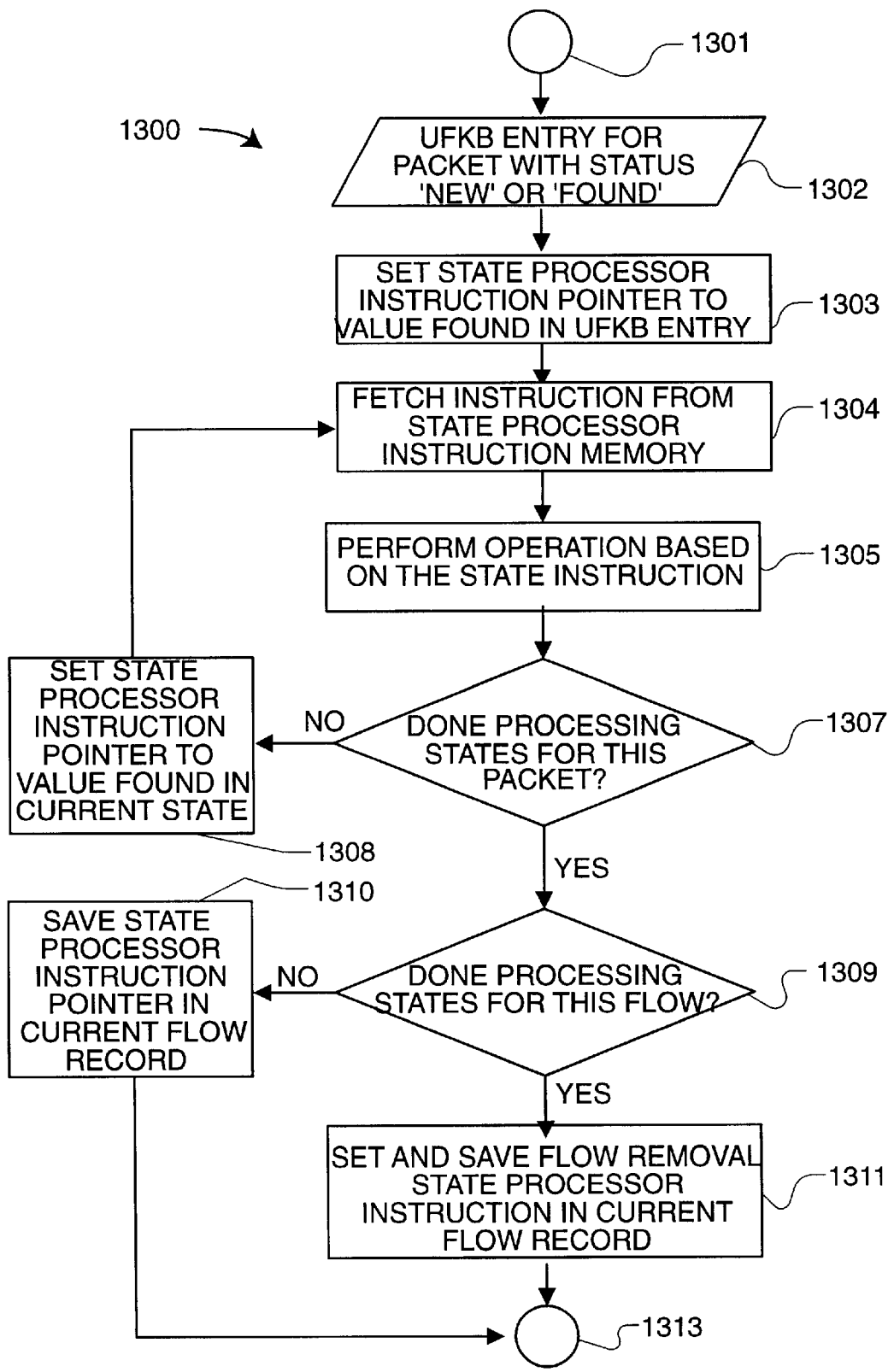
FIG. 13 is a flowchart of a state processing process that can form part of the analyzer in an embodiment of the inventive packet monitor.

FIG. 13 describes the operation of the state processor 1108. The state processor is entered at 1301 with a unified flow key buffer entry to be processed. The UFKB-entry is new or corresponding to a found flow-entry. This UFKB-entry is retrieved from unified flow key buffer 1103 in 1301. In 1303, the protocol identifier for the UFKB-entry is used to set the state processor's instruction counter. The state processor 1108 starts the process by using the last protocol recognized by the parser subsystem 301 as an offset into a jump table. The jump table takes us to the instructions to use for that protocol. Most instructions test something in the unified flow key buffer or the flow-entry if it exists. The state processor 1108 may have to test bits, do comparisons, add or subtract to perform the test.

The first state processor instruction is fetched in 1304 from the state processor instruction database memory 1109. The state processor performs the one or more fetched operations (1304). In our implementation, each single state processor instruction is very primitive (e.g., a move, a compare, etc.), so that many such instructions need to be performed on each unified flow key buffer entry. One aspect of the state processor is its ability to search for one or more (up to four) reference strings in the payload part of the UFKB entry. This is implemented by a search engine component of the state processor responsive to special searching instructions.

In 1307, a check is made to determine if there are any more instructions to be performed for the packet. If yes, then in 1308 the system sets the state processor instruction pointer (SPIP) to obtain the next instruction. The SPIP may be set by an immediate jump vector in the currently decoded instruction, or by a value provided by the SPALU during processing.

The next instruction to be performed is now fetched (1304) for execution. This state processing loop between 1304 and 1307 continues until there are no more instructions to be performed.

At this stage, a check is made in 1309 if the processing on this particular packet has resulted in a final state. That is, is the analyzer is done processing not only for this particular packet, but for the whole flow to which the packet belongs, and the flow is fully determined. If indeed there are no more states to process for this flow, then in 1311 the processor finalizes the processing. Some final states may need to put a state in place that tells the system to remove a flow—for example, if a connection disappears from a lower level connection identifier. In that case, in 1311, a flow removal state is set and saved in the flow-entry. The flow removal state may be a NOP (no-op) instruction which means there are no removal instructions.

Once the appropriate flow removal instruction as specified for this flow (a NOP or otherwise) is set and saved, the process is exited at 1313. The state processor 1108 can now obtain another unified flow key buffer entry to process.

If at 1309 it is determined that processing for this flow is not completed, then in 1310 the system saves the state processor instruction pointer in the current flow-entry in the current flow-entry. That will be the next operation that will be performed the next time the LRE 1107 finds packet in the UFKB that matches this flow. The processor now exits processing this particular unified flow key buffer entry at 1313.

Note that state processing updates information in the unified flow key buffer 1103 and the flow-entry in the cache. Once the state processor is done, a flag is set in the UFKB for the entry that the state processor is done. Furthermore, If the flow needs to be inserted or deleted from the database of flows, control is then passed on to the flow insertion/deletion engine 1110 for that flow signature and packet entry. This is done by the state processor setting another flag in the UFKB for this UFKB-entry indicating that the state processor is passing processing of this entry to the flow insertion and deletion engine.

The flow insertion and deletion engine 1110 is responsible for maintaining the flow-entry database. In particular, for creating new flows in the flow database, and deleting flows from the database so that they can be reused.

Figure 12:
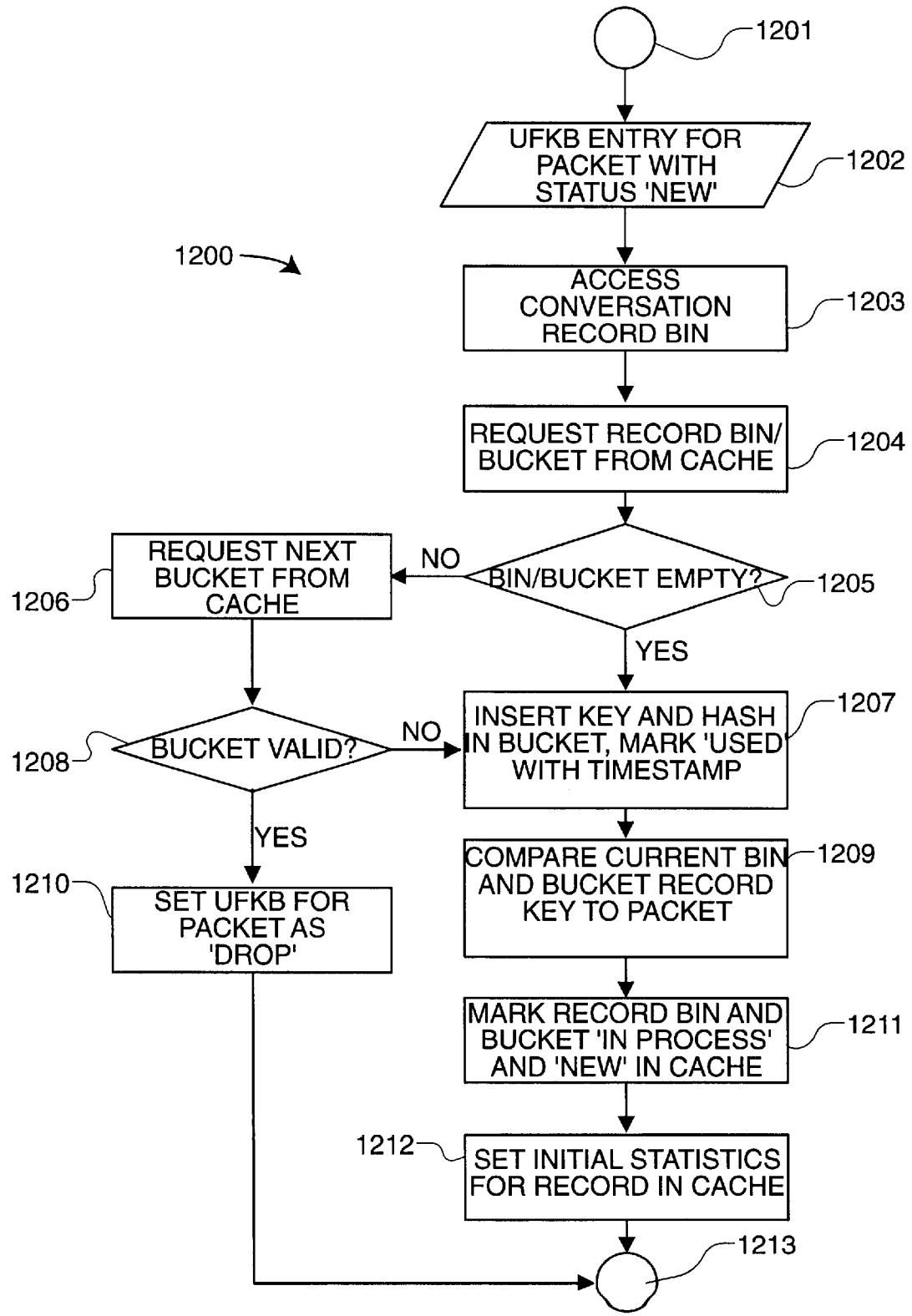
FIG. 12 is a functional block diagram of a flow insertion and deletion engine process that can form part of the analyzer in an embodiment of the inventive packet monitor.

The process of flow insertion is now described with the aid of FIG. 12. Flows are grouped into bins of buckets by the hash value. The engine processes a UFKB-entry that may be new or that the state processor otherwise has indicated needs to be created. FIG. 12 shows the case of a new entry being created. A conversation record bin (preferably containing 4 buckets for four records) is obtained in 1203. This is a bin that matches the hash of the UFKB, so this bin may already have been sought for the UFKB-entry by the LUE. In 1204 the FIDE 1110 requests that the record bin/bucket be maintained in the cache system 1115. If in 1205 the cache system 1115 indicates that the bin/bucket is empty, step 1207 inserts the flow signature (with the hash) into the bucket and the bucket is marked "used" in the cache engine of cache 1115 using a timestamp that is maintained throughout the process. In 1209, the FIDE 1110 compares the bin and bucket record flow signature to the packet to verify that all the elements are in place to complete the record. In 1211 the system marks the record bin and bucket as "in process" and as "new" in the cache system (and hence in the external memory). In 1212, the initial statistical measures for the flow-record are set in the cache system. This in the preferred embodiment clears the set of counters used to maintain statistics, and may perform other procedures for statistical operations requires by the analyzer for the first packet seen for a particular flow.

Back in step 1205, if the bucket is not empty, the FIDE 1110 requests the next bucket for this particular bin in the cache system. If this succeeds, the processes of 1207, 1209, 1211 and 1212 are repeated for this next bucket. If at 1208, there is no valid bucket, the unified flow key buffer entry for the packet is set as "drop," indicating that the system cannot process the particular packet because there are no buckets left in the system. The process exits at 1213. The FIDE 1110 indicates to the UFKB that the flow insertion and deletion operations are completed for this UFKB-entry. This also lets the UFKB provide the FIDE with the next UFKB record.

Once a set of operations is performed on a unified flow key buffer entry by all of the engines required to access and manage a particular packet and its flow signature, the unified flow key buffer entry is marked as "completed." That element will then be used by the parser interface for the next packet and flow signature coming in from the parsing and extracting system.

All flow-entries are maintained in the external memory and some are maintained in the cache 1115. The cache system 1115 is intelligent enough to access the flow database and to understand the data structures that exists on the other side of memory interface 1123. The lookup/update engine 1107 is able to request that the cache system pull a particular flow or "buckets" of flows from the unified memory controller 1119 into the cache system for further processing. The state processor 1108 can operate on information found in the cache system once it is looked up by means of the lookup/update engine request, and the flow insertion/deletion engine 1110 can create new entries in the cache system if required based on information in the unified flow key buffer 1103. The cache retrieves information as required from the memory through the memory interface 1123 and the unified memory controller 1119, and updates information as required in the memory through the memory controller 1119.

There are several interfaces to components of the system external to the module of FIG. 11 for the particular hardware implementation. These include host bus interface 1122, which is designed as a generic interface that can operate with any kind of external processing system such as a microprocessor or a multiplexor (MUX) system. Consequently, one can connect the overall traffic classification system of FIGS. 11 and 12 into some other processing system to manage the classification system and to extract data gathered by the system.

The memory interface 1123 is designed to interface to any of a variety of memory systems that one may want to use to store the flow-entries. One can use different types of memory systems like regular dynamic random access memory (DRAM), synchronous DRAM, synchronous graphic memory (SGRAM), static random access memory (SRAM), and so forth.

FIG. 10 also includes some "generic" interfaces. There is a packet input interface 1012—a general interface that works in tandem with the signals of the input buffer interface control 1022. These are designed so that they can be used with any kind of generic systems that can then feed packet information into the parser. Another generic interface is the interface of pipes 1031 and 1033 respectively out of and into host interface multiplexor and control registers 1005. This enables the parsing system to be managed by an external system, for example a microprocessor or another kind of external logic, and enables the external system to program and otherwise control the parser.

The preferred embodiment of this aspect of the invention is described in a hardware description language (HDL) such as VHDL or Verilog. It is designed and created in an HDL so that it may be used as a single chip system or, for instance, integrated into another general-purpose system that is being designed for purposes related to creating and analyzing traffic within a network. Verilog or other HDL implementation is only one method of describing the hardware.

In accordance with one hardware implementation, the elements shown in FIGS. 10 and 11 are implemented in a set of six field programmable logic arrays (FPGA's). The boundaries of these FPGA's are as follows. The parsing subsystem of FIG. 10 is implemented as two FPGAS; one FPGA, and includes blocks 1006, 1008 and 1012, parts of 1005, and memory 1001. The second FPGA includes 1002, 1007, 1013, 1011 parts of 1005. Referring to FIG. 11, the unified look-up buffer 1103 is implemented as a single FPGA. State processor 1108 and part of state processor instruction database memory 1109 is another FPGA. Portions of the state processor instruction database memory 1109 are maintained in external SRAM's. The lookup/update engine 1107 and the flow insertion/deletion engine 1110 are in another FPGA. The sixth FPGA includes the cache system 1115, the unified memory control 1119, and the analyzer host interface and control 1118.

Note that one can implement the system as one or more VSLI devices, rather than as a set of application specific integrated circuits (ASIC's) such as FPGA's. It is anticipated that in the future device densities will continue to increase, so that the complete system may eventually form a sub-unit (a "core") of a larger single chip unit.

Operation of the Invention

Figure 15:
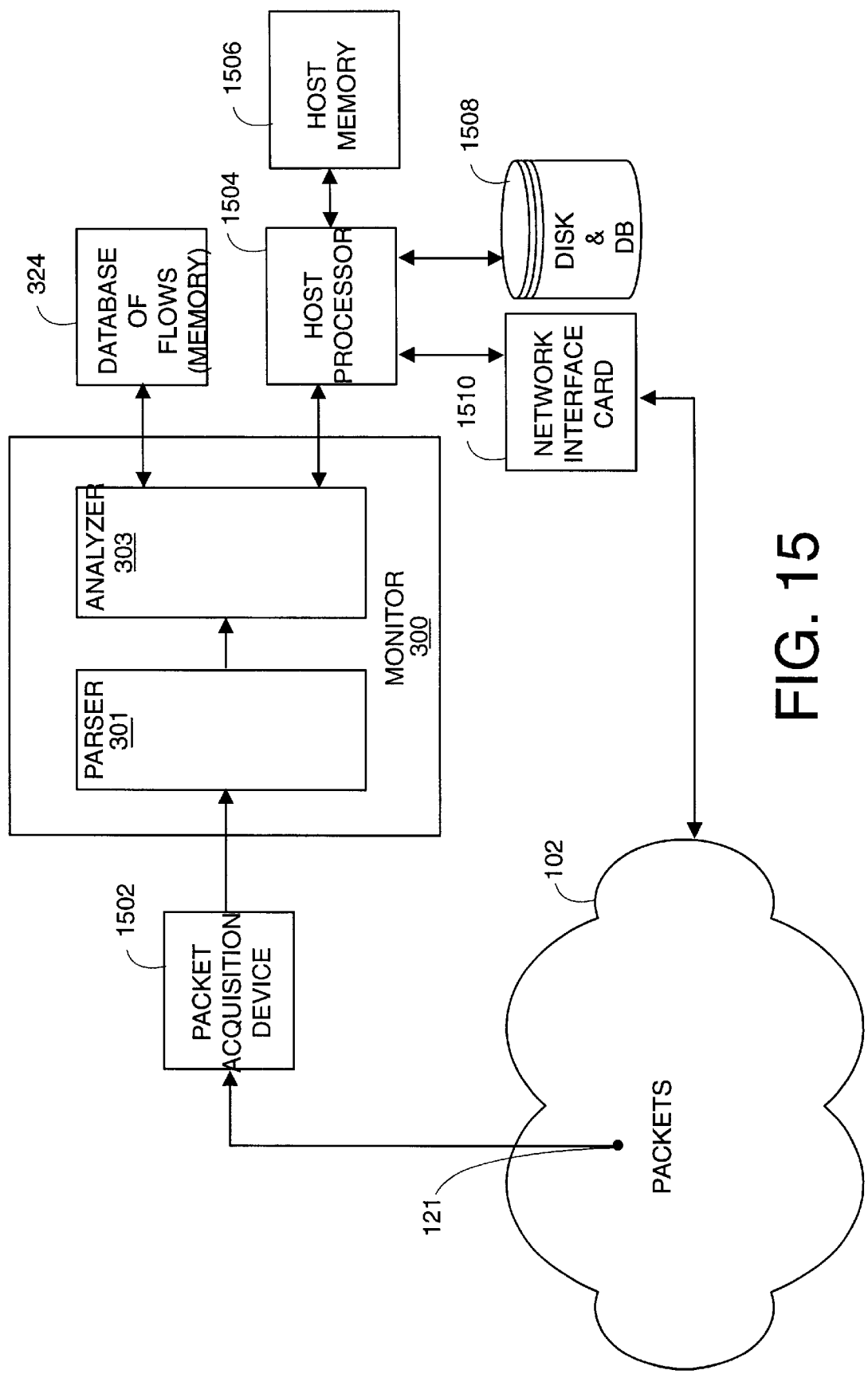
FIG. 15 is a functional block diagram of how the packet monitor of FIG. 3 (and FIGS. 10 and 11) may operate on a network with a processor such as a microprocessor.

FIG. 15 shows how an embodiment of the network monitor 300 might be used to analyze traffic in a network 102. Packet acquisition device 1502 acquires all the packets from a connection point 121 on network 102 so that all packets passing point 121 in either direction are supplied to monitor 300. Monitor 300 comprises the parser sub-system 301, which determines flow signatures, and analyzer subsystem 303 that analyzes the flow signature of each packet. A memory 324 is used to store the database of flows that are determined and updated by monitor 300. A host computer 1504, which might be any processor, for example, a general-purpose computer, is used to analyze the flows in memory 324. As is conventional, host computer 1504 includes a memory, say RAM, shown as host memory 1506. In addition, the host might contain a disk. In one application, the system can operate as an RMON probe, in which case the host computer is coupled to a network interface card 1510 that is connected to the network 102.

The preferred embodiment of the invention is supported by an optional Simple Network Management Protocol (SNMP) implementation. FIG. 15 describes how one would, for example, implement an RMON probe, where a network interface card is used to send RMON information to the network. Commercial SNMP implementations also are available, and using such an implementation can simplify the process of porting the preferred embodiment of the invention to any platform.

In addition, MIB Compilers are available. An MIB Compiler is a tool that greatly simplifies the creation and maintenance of proprietary MIB extensions.

Examples of Packet Elucidation

Monitor 300, and in particular, analyzer 303 is capable of carrying out state analysis for packet exchanges that are commonly referred to as "server announcement" type exchanges. Server announcement is a process used to ease communications between a server with multiple applications that can all be simultaneously accessed from multiple clients. Many applications use a server announcement process as a means of multiplexing a single port or socket into many applications and services. With this type of exchange, messages are sent on the network, in either a broadcast or multicast approach, to announce a server and application, and all stations in the network may receive and decode these messages. The messages enable the stations to derive the appropriate connection point for communicating that particular application with the particular server. Using the server announcement method, a particular application communicates using a service channel, in the form of a TCP or UDP socket or port as in the IP protocol suite, or using a SAP as in the Novell IPX protocol suite.

The analyzer 303 is also capable of carrying out "in-stream analysis" of packet exchanges. The "in-stream analysis" method is used either as a primary or secondary recognition process. As a primary process, in-stream analysis assists in extracting detailed information which will be used to further recognize both the specific application and application component. A good example of in-stream analysis is any Web-based application. For example, the commonly used PointCast Web information application can be recognized using this process; during the initial connection between a PointCast server and client, specific key tokens exist in the data exchange that will result in a signature being generated to recognize PointCast.

The in-stream analysis process may also be combined with the server announcement process. In many cases in-stream analysis will augment other recognition processes. An example of combining in-stream analysis with server announcement can be found in business applications such as SAP and BAAN.

"Session tracking" also is known as one of the primary processes for tracking applications in client/server packet exchanges. The process of tracking sessions requires an initial connection to a predefined socket or port number. This method of communication is used in a variety of transport layer protocols. It is most commonly seen in the TCP and UDP transport protocols of the IP protocol.

During the session tracking, a client makes a request to a server using a specific port or socket number. This initial request will cause the server to create a TCP or UDP port to exchange the remainder of the data between the client and the server. The server then replies to the request of the client using this newly created port. The original port used by the client to connect to the server will never be used again during this data exchange.

One example of session tracking is TFTP (Trivial File Transfer Protocol), a version of the TCP/IP FTP protocol that has no directory or password capability. During the client/server exchange process of TFTP, a specific port (port number 69) is always used to initiate the packet exchange. Thus, when the client begins the process of communicating, a request is made to UDP port 69. Once the server receives this request, a new port number is created on the server. The server then replies to the client using the new port. In this example, it is clear that in order to recognize TFTP; network monitor 300 analyzes the initial request from the client and generates a signature for it. Monitor 300 uses that signature to recognize the reply. Monitor 300 also analyzes the reply from the server with the key port information, and uses this to create a signature for monitoring the remaining packets of this data exchange.

Network monitor 300 can also understand the current state of particular connections in the network. Connection-oriented exchanges often benefit from state tracking to correctly identify the application. An example is the common TCP transport protocol that provides a reliable means of sending information between a client and a server. When a data exchange is initiated, a TCP request for synchronization message is sent. This message contains a specific sequence number that is used to track an acknowledgement from the server. Once the server has acknowledged the synchronization request, data may be exchanged between the client and the server. When communication is no longer required, the client sends a finish or complete message to the server, and the server acknowledges this finish request with a reply containing the sequence numbers from the request. The states of such a connection-oriented exchange relate to the various types of connection and maintenance messages.

Server Announcement Example

The individual methods of server announcement protocols vary. However, the basic underlying process remains similar. A typical server announcement message is sent to one or more clients in a network. This type of announcement message has specific content, which, in another aspect of the invention, is salvaged and maintained in the database of flow-entries in the system. Because the announcement is sent to one or more stations, the client involved in a future packet exchange with the server will make an assumption that the information announced is known, and an aspect of the inventive monitor is that it too can make the same assumption.

Sun-RPC is the implementation by Sun Microsystems, Inc. (Palo Alto, Calif.) of the Remote Procedure Call (RPC), a programming interface that allows one program to use the services of another on a remote machine. A Sun-RPC example is now used to explain how monitor 300 can capture server announcements.

A remote program or client that wishes to use a server or procedure must establish a connection, for which the RPC protocol can be used.

Each server running the Sun-RPC protocol must maintain a process and database called the port Mapper. The port Mapper creates a direct association between a Sun-RPC program or application and a TCP or UDP socket or port (for TCP or UDP implementations). An application or program number is a 32-bit unique identifier assigned by ICANN (the Internet Corporation for Assigned Names and Numbers, www.icann.org), which manages the huge number of parameters associated with Internet protocols (port numbers, router protocols, multicast addresses, etc.) Each port Mapper on a Sun-RPC server can present the mappings between a unique program number and a specific transport socket through the use of specific request or a directed announcement. According to ICANN, port number 111 is associated with Sun RPC.

As an example, consider a client (e.g., CLIENT 3 shown as 106 in FIG. 1) making a specific request to the server (e.g., SERVER 2 of FIG. 1, shown as 110) on a predefined UDP or TCP socket. Once the port Mapper process on the sun RPC server receives the request, the specific mapping is returned in a directed reply to the client.

1. A client (CLIENT 3, 106 in FIG. 1) sends a TCP packet to SERVER 2 (110 in FIG. 1) on port 111, with an RPC Bind Lookup Request (rpcBindLookup). TCP or UDP port 111 is always associated Sun RPC. This request specifies the program (as a program identifier), version, and might specify the protocol (UDP or TCP).

2. The server SERVER 2 (110 in FIG. 1) extracts the program identifier and version identifier from the request. The server also uses the fact that this packet came in using the TCP transport and that no protocol was specified, and thus will use the TCP protocol for its reply.

3. The server 110 sends a TCP packet to port number 111, with an RPC Bind Lookup Reply. The reply contains the specific port number (e.g., port number 'port') on which future transactions will be accepted for the specific RPC program identifier (e.g., Program 'program') and the protocol (UDP or TCP) for use.

It is desired that from now on every time that port number 'port' is used, the packet is associated with the application program 'program' until the number 'port' no longer is to be associated with the program 'program'. Network monitor 300 by creating a flow-entry and a signature includes a mechanism for remembering the exchange so that future packets that use the port number 'port' will be associated by the network monitor with the application program 'program'.

In addition to the Sun RPC Bind Lookup request and reply, there are other ways that a particular program—say 'program'—might be associated with a particular port number, for example number 'port'. One is by a broadcast announcement of a particular association between an application service and a port number, called a Sun RPC port-Mapper Announcement. Another, is when some server-say the same SERVER 2—replies to some client—say CLIENT 1—requesting some portMapper assignment with a RPC portMapper Reply. Some other client—say CLIENT 2—might inadvertently see this request, and thus know that for this particular server, SERVER 2, port number 'port' is associated with the application service 'program'. It is desirable for the network monitor 300 to be able to associate any packets to SERVER 2 using port number 'port' with the application program 'program'.

Figure 9:
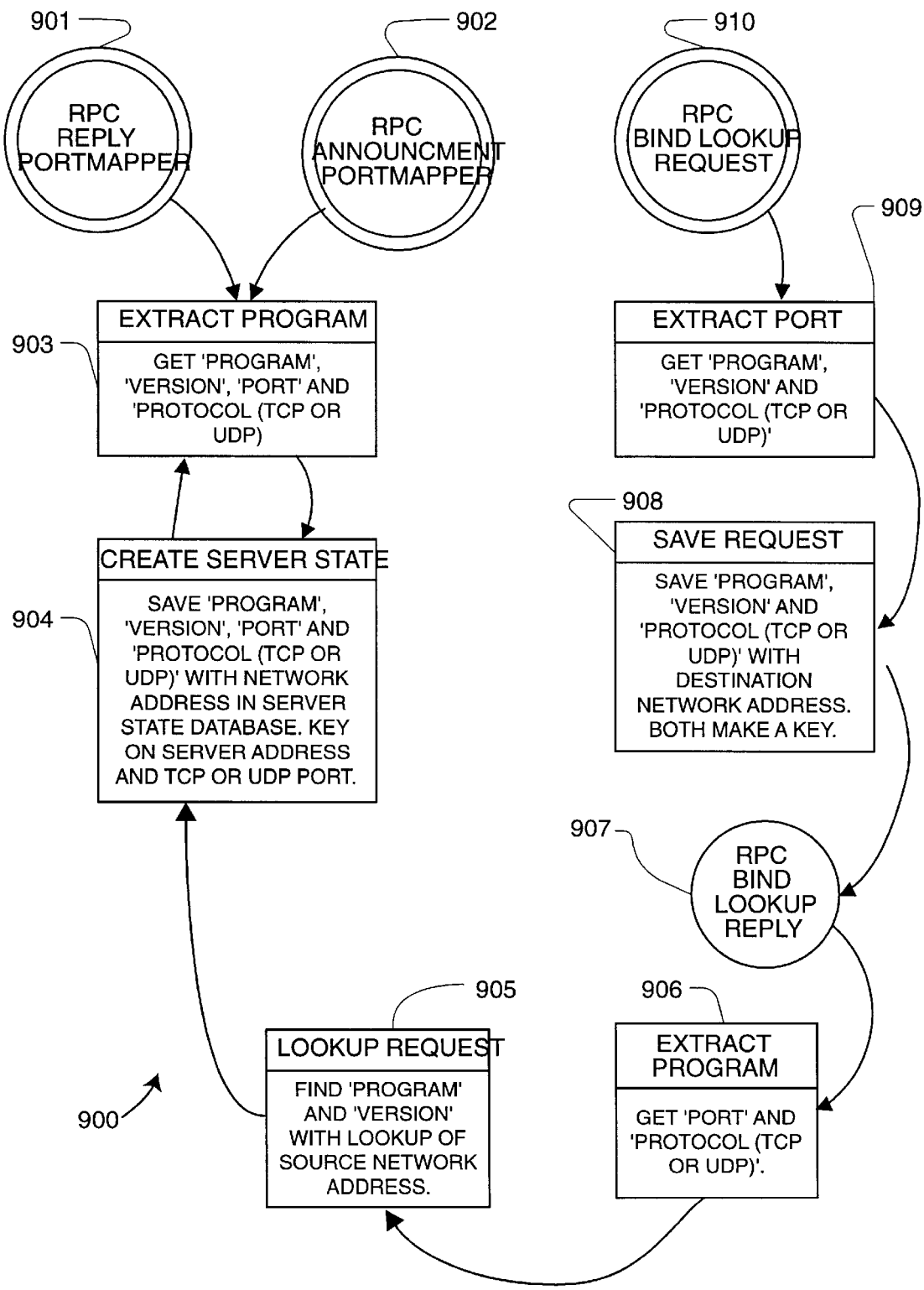
FIG. 9 is a flowchart of an exemplary Sun Microsystems Remote Procedure Call application than may be recognized by the inventive packet monitor.

FIG. 9 represents a dataflow 900 of some operations in the monitor 300 of FIG. 3 for Sun Remote Procedure Call. Suppose a client 106 (e.g., CLIENT 3 in FIG. 1) is communicating via its interface to the network 118 to a server 110 (e.g., SERVER 2 in FIG. 1) via the server's interface to the network 116. Further assume that Remote Procedure Call is used to communicate with the server 110. One path in the data flow 900 starts with a step 910 that a Remote Procedure Call bind lookup request is issued by client 106 and ends with the server state creation step 904. Such RPC bind lookup request includes values for the 'program,' 'version,' and 'protocol' to use, e.g., TCP or UDP. The process for Sun RPC analysis in the network monitor 300 includes the following aspects.:

Process 909: Extract the 'program,' 'version,' and 'protocol' (UDP or TCP). Extract the TCP or UDP port (process 909) which is 111 indicating Sun RPC.

Process 908: Decode the Sun RPC packet. Check RPC type field for ID. If value is portMapper, save paired socket (i.e., dest for destination address, src for source address). Decode ports and mapping, save ports with socket/addr key. There may be more than one pairing per mapper packet. Form a signature (e.g., a key). A flow-entry is created in database 324. The saving of the request is now complete.

At some later time, the server (process 907) issues a RPC bind lookup reply. The packet monitor 300 will extract a signature from the packet and recognize it from the previously stored flow. The monitor will get the protocol port number (906) and lookup the request (905). A new signature (i.e., a key) will be created and the creation of the server state (904) will be stored as an entry identified by the new signature in the flow-entry database. That signature now may be used to identify packets associated with the server.

The server state creation step 904 can be reached not only from a Bind Lookup Request/Reply pair, but also from a RPC Reply portMapper packet shown as 901 or an RPC Announcement portMapper shown as 902. The Remote Procedure Call protocol can announce that it is able to provide a particular application service. Embodiments of the present invention preferably can analyze when an exchange occurs between a client and a server, and also can track those stations that have received the announcement of a service in the network.

The RPC Announcement portMapper announcement 902 is a broadcast. Such causes various clients to execute a similar set of operations, for example, saving the information obtained from the announcement. The RPC Reply portMapper step 901 could be in reply to a portMapper request, and is also broadcast. It includes all the service parameters.

Thus monitor 300 creates and saves all such states for later classification of flows that relate to the particular service 'program'.

Figure 2:
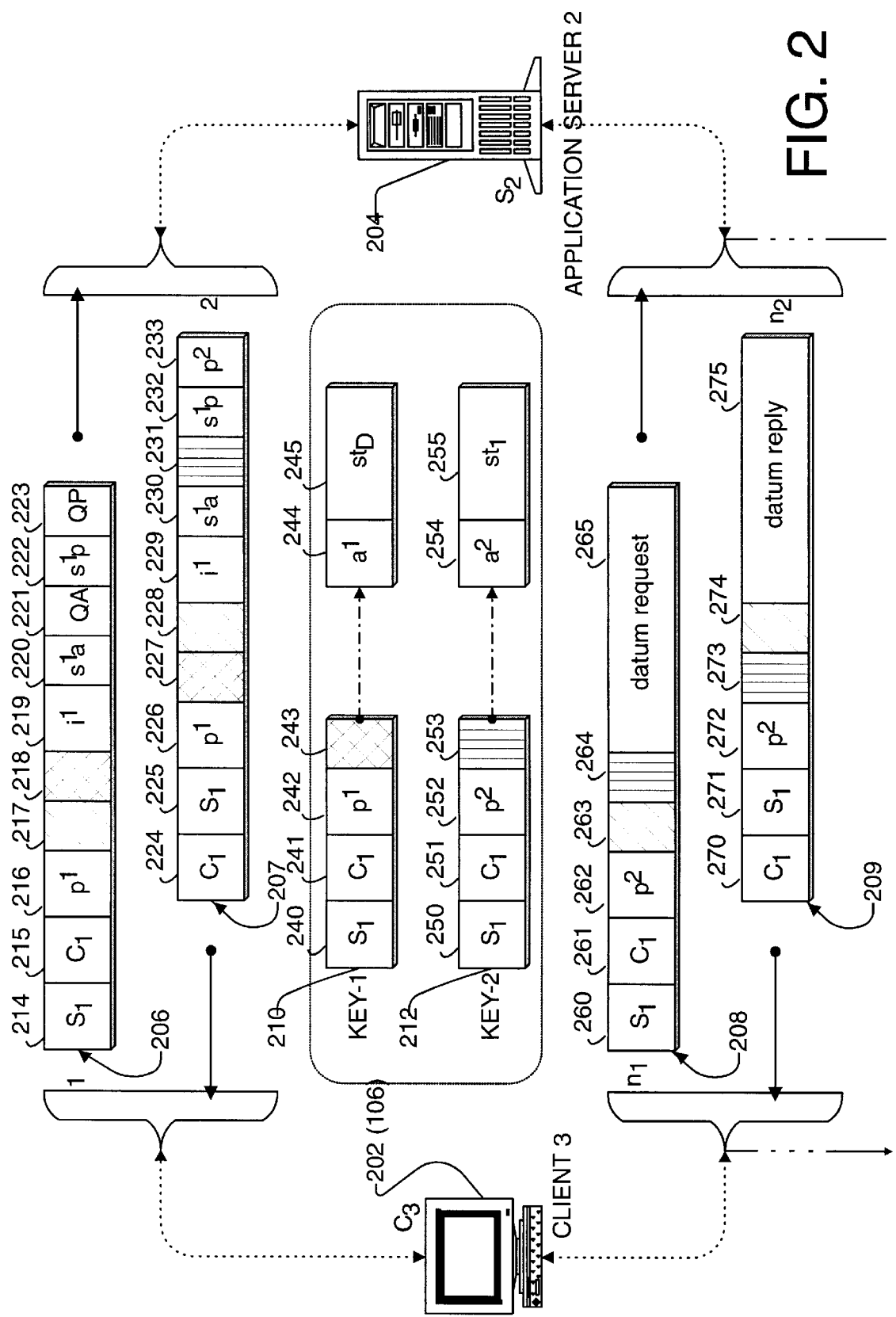
FIG. 2 is a diagram representing an example of some of the packets and their formats that might be exchanged in starting, as an illustrative example, a conversational flow between a client and server on a network being monitored and analyzed. A pair of flow signatures particular to this example and to embodiments of the present invention is also illustrated. This represents some of the possible flow signatures that can be generated and used in the process of analyzing packets and of recognizing the particular server applications that produce the discrete application packet exchanges.

FIG. 2 shows how the monitor 300 in the example of Sun RPC builds a signature and flow states. A plurality of packets 206–209 are exchanged, e.g., in an exemplary Sun Microsystems Remote Procedure Call protocol. A method embodiment of the present invention might generate a pair of flow signatures, "signature-1" 210 and "signature-2" 212, from information found in the packets 206 and 207 which, in the example, correspond to a Sun RPC Bind Lookup request and reply, respectively.

Consider first the Sun RPC Bind Lookup request. Suppose packet 206 corresponds to such a request sent from CLIENT 3 to SERVER 2. This packet contains important information that is used in building a signature according to an aspect of the invention. A source and destination network address occupy the first two fields of each packet, and according to the patterns in pattern database 308, the flow signature (shown as KEY1 230 in FIG. 2) will also contain these two fields, so the parser subsystem 301 will include these two fields in signature KEY 1 (230). Note that in FIG. 2, if an address identifies the client 106 (shown also as 202), the label used in the drawing is "$C_1$". If such address identifies the server 110 (shown also as server 204), the label used in the drawing is "$S_1$". The first two fields 214 and 215 in packet 206 are "$S_1$" and $C_1$" because packet 206 is provided from the server 110 and is destined for the client 106. Suppose for this example, "$S_1$" is an address numerically less than address "$C_1$". A third field "$p^1$" 216 identifies the particular protocol being used, e.g., TCP, UDP, etc.

In packet 206, a fourth field 217 and a fifth field 218 are used to communicate port numbers that are used. The conversation direction determines where the port number field is. The diagonal pattern in field 217 is used to identify a source-port pattern, and the hash pattern in field 218 is used to identify the destination-port pattern. The order indicates the client-server message direction. A sixth field denoted "$i^1$" 219 is an element that is being requested by the client from the server. A seventh field denoted "$s_1a$" 220 is the service requested by the client from server 110. The following eighth field "QA" 221 (for question mark) indicates that the client 106 wants to know what to use to access application "$s_1a$". A tenth field "QP" 223 is used to indicate that the client wants the server to indicate what protocol to use for the particular application.

Packet 206 initiates the sequence of packet exchanges, e.g., a RPC Bind Lookup Request to SERVER 2. It follows a well-defined format, as do all the packets, and is transmitted to the server 110 on a well-known service connection identifier (port 111 indicating Sun RPC).

Packet 207 is the first sent in reply to the client 106 from the server. It is the RPC Bind Lookup Reply as a result of the request packet 206.

Packet 207 includes ten fields 224–233. The destination and source addresses are carried in fields 224 and 225, e.g., indicated "$C_1$" and "$S_1$", respectively. Notice the order is now reversed, since the client-server message direction is from the server 110 to the client 106. The protocol "$p^1$" is used as indicated in field 226. The request "$i^1$" is in field 229. Values have been filled in for the application port number, e.g., in field 233 and protocol ""$p^2$"" in field 233.

The flow signature and flow states built up as a result of this exchange are now described. When the packet monitor 300 sees the request packet 206 from the client, a first flow signature 210 is built in the parser subsystem 301 according to the pattern and extraction operations database 308. This signature 210 includes a destination and a source address 240 and 241. One aspect of the invention is that the flow keys are built consistently in a particular order no matter what the direction of conversation. Several mechanisms may be used to achieve this. In the particular embodiment, the numerically lower address is always placed before the numerically higher address. Such least to highest order is used to get the best spread of signatures and hashes for the lookup operations. In this case, therefore, since we assume "$S_1$"<"$C_1$", the order is address "$S_1$" followed by client address "$C_1$". The next field used to build the signature is a protocol field 242 extracted from packet 206's field 216, and thus is the protocol "$p^1$". The next field used for the signature is field 243, which contains the destination source port number shown as a crosshatched pattern from the field 218 of the packet 206. This pattern will be recognized in the payload of packets to derive how this packet or sequence of packets exists as a flow. In practice, these may be TCP port numbers, or a combination of TCP port numbers. In the case of the Sun RPC example, the crosshatch represents a set of port numbers of UDS for $p^1$ that will be used to recognize this flow (e.g., port 111). Port 111 indicates this is Sun RPC. Some applications, such as the Sun RPC Bind Lookups, are directly determinable ("known") at the parser level. So in this case, the signature KEY-1 points to a known application denoted "$a^1$" (Sun RPC Bind Lookup), and a next-state that the state processor should proceed to for more complex recognition jobs, denoted as state "$st_D$" is placed in the field 245 of the flow-entry.

When the Sun RPC Bind Lookup reply is acquired, a flow signature is again built by the parser. This flow signature is identical to KEY-1. Hence, when the signature enters the analyzer subsystem 303 from the parser subsystem 301, the complete flow-entry is obtained, and in this flow-entry indicates state "$st_D$". The operations for state "$st_D$" in the state processor instruction database 326 instructs the state processor to build and store a new flow signature, shown as KEY-2 (212) in FIG. 2. This flow signature built by the state processor also includes the destination and a source addresses 250 and 251, respectively, for server "$S_1$" followed by (the numerically higher address) client "$C_1$". A protocol field 252 defines the protocol to be used, e.g., "$p^2$", which is obtained from the reply packet. A field 253 contains a recognition pattern also obtained from the reply packet. In this case, the application is Sun RPC, and field 254 indicates this application "$a^2$". A next-state field 255 defines the next state that the state processor should proceed to for more complex recognition jobs, e.g., a state "$st^1$". In this particular example, this is a final state. Thus, KEY-2 may now be used to recognize packets that are in any way associated with the application "$a^2$". Two such packets 208 and 209 are shown, one in each direction. They use the particular application service requested in the original Bind Lookup Request, and each will be recognized because the signature KEY-2 will be built in each case.

The two flow signatures 210 and 212 always order the destination and source address fields with server "$S_1$" followed by client "$C_1$". Such values are automatically filled in when the addresses are first created in a particular flow signature. Preferably, large collections of flow signatures are kept in a lookup table in a least-to-highest order for the best spread of flow signatures and hashes.

Thereafter, the client and server exchange a number of packets, e.g., represented by request packet 208 and response packet 209. The client 106 sends packets 208 that have a destination and source address $S_1$ and $C_1$, in a pair of fields 260 and 261. A field 262 defines the protocol as "$p^2$", and a field 263 defines the destination port number.

Some network-server application recognition jobs are so simple that only a single state transition has to occur to be able to pinpoint the application that produced the packet. Others require a sequence of state transitions to occur in order to match a known and predefined climb from state-to-state.

Thus the flow signature for the recognition of application "$a^2$" is automatically set up by predefining what packet-exchange sequences occur for this example when a relatively simple Sun Microsystems Remote Procedure Call bind lookup request instruction executes. More complicated exchanges than this may generate more than two flow signatures and their corresponding states. Each recognition may involve setting up a complex state transition diagram to be traversed before a "final" resting state such as "$st_1$" in field 255 is reached. All these are used to build the final set of flow signatures for recognizing a particular application in the future.

Embodiments of the present invention automatically generate flow signatures with the necessary recognition patterns and state transition climb procedure. Such comes from analyzing packets according to parsing rules, and also generating state transitions to search for. Applications and protocols, at any level, are recognized through state analysis of sequences of packets.

Note that one in the art will understand that computer networks are used to connect many different types of devices, including network appliances such as telephones, "Internet" radios, pagers, and so forth. The term computer as used herein encompasses all such devices and a computer network as used herein includes networks of such computers.

Although the present invention has been described in terms of the presently preferred embodiments, it is to be understood that the disclosure is not to be interpreted as limiting. Various alterations and modifications will no doubt become apparent to those or ordinary skill in the art after having read the above disclosure. Accordingly, it is intended that the claims be interpreted as covering all alterations and modifications as fall within the true spirit and scope of the present invention.

The Pattern Parse and Extraction Database Format

The different protocols that can exist in different layers may be thought of as nodes of one or more trees of linked nodes. The packet type is the root of a tree (called base level). Each protocol is either a parent node of some other protocol at the next later or a terminal node. A parent node links a protocol to other protocols (child protocols) that can be at higher layer levels. Thus a protocol may have zero or more children.

As an example of the tree structure, consider an Ethernet packet. One of the children nodes may be the IP protocol, and one of the children of the IP protocol may be the TCP protocol. Another child of the IP may be the UDP protocol.

A packet includes at least one header for each protocol used. The child protocol of a particular protocol used in a packet is indicated by the contents at a location within the header of the particular protocol. The contents of the packet that specify the child are in the form of a child recognition pattern.

A network analyzer preferably can analyze many different protocols. At a base level, there are a number of packet types used in digital telecommunications, including Ethernet, HDLC, ISDN, Lap B, ATM, X.25, Frame Relay, Digital Data Service, FDDI (Fiber Distributed Data Interface), and T1, among others. Many of these packet types use different packet and/or frame formats. For example, data is transmitted in ATM and frame-relay systems in the form of fixed length packets (called "cells") that are 53 octets (i.e., bytes) long; several such cells may be needed to make up the information that might be included in a single packet of some other type.

Note that the term packet herein is intended to encompass packets, datagrams, frames and cells. In general, a packet format or frame format refers to how data is encapsulated with various fields and headers for transmission across a network. For example, a data packet typically includes an address destination field, a length field, an error correcting code (ECC) field or cyclic redundancy check (CRC) field, as well as headers and footers to identify the beginning and end of the packet. The terms "packet format," "frame format" and "cell format" are generally synonymous.

The packet monitor 300 can analyze different protocols, and thus can perform different protocol specific operations on a packet wherein the protocol headers of any protocol are located at different locations depending on the parent protocol or protocols used in the packet. Thus, the packet monitor adapts to different protocols according to the contents of the packet. The locations and the information extracted from any packet are adaptively determined for the particular type of packet. For example, there is no fixed definition of what to look for or where to look in order to form the flow signature. In some prior art systems, such as that described in U.S. Pat. No. 5,101,402 to Chiu, et al., there are fixed locations specified for particular types of packets. With the proliferation of protocols, the specifying of all the possible places to look to determine the session becomes more and more difficult. Likewise, adding a new protocol or application is difficult. In the present invention, the number of levels is variable for any protocol and is whatever number is sufficient to uniquely identify as high up the level system as we wish to go, all the way to the application level (in the OSI model).

Even the same protocol may have different variants. Ethernet packets for example, have several known variants, each having a basic format that remains substantially the same. An Ethernet packet (the root node) may be an Ethertype packet—also called an Ethernet Type/Version 2 and a DIX (DIGITAL-Intel-Xerox packet)—or an IEEE Ethernet (IEEE 803.x) packet. A monitor should be able to handle all types of Ethernet protocols. With the Ethertype protocol, the contents that indicate the child protocol is in one location, while with an IEEE type, the child protocol is specified in a different location. The child protocol is indicated by a child recognition pattern.

FIG. 16 shows the header 1600 (base level 1) of a complete Ethernet frame (i.e., packet) of information and includes information on the destination media access control address (Dst MAC 1602) and the source media access control address (Src MAC 1604). Also shown in FIG. 16 is some (but not all) of the information specified in the PDL files for extraction the signature. Such information is also to be specified in the parsing structures and extraction operations database 308. This includes all of the header information at this level in the form of 6 bytes of Dst MAC information 1606 and 6 bytes of Src MAC information 1610. Also specified are the source and destination address components, respectively, of the hash. These are shown as 2 byte Dst Hash 1608 from the Dst MAC address and the 2 byte Src Hash 1612 from the Src MAC address. Finally, information is included (1614) on where to the header starts for information related to the next layer level. In this case the next layer level (level 2) information starts at packet offset 12.

FIG. 17A now shows the header information for the next level (level-2) for an Ethertype packet 1700.

For an Ethertype packet 1700, the relevant information from the packet that indicates the next layer level is a two-byte type field 1702 containing the child recognition pattern for the next level. The remaining information 1704 is shown hatched because it not relevant for this level. The list 1712 shows the possible children for an Ethertype packet as indicated by what child recognition pattern is found offset 12.

Also shown is some of the extracted part used for the parser record and to locate the next header information. The signature part of the parser record includes extracted part 1702. Also included is the 1-byte Hash component 1710 from this information.

An offset field 1710 provides the offset to go to the next level information, i.e., to locate the start of the next layer level header. For the Ethertype packet, the start of the next layer header 14 bytes from the start of the frame.

Other packet types are arranged differently. For example, in an ATM system, each ATM packet comprises a five-octet "header" segment followed by a forty-eight octet "payload" segment. The header segment of an ATM cell contains information relating to the routing of the data contained in the payload segment. The header segment also contains traffic control information. Eight or twelve bits of the header segment contain the Virtual Path Identifier (VPI), and sixteen bits of the header segment contain the Virtual Channel Identifier (VCI). Each ATM exchange translates the abstract routing information represented by the VPI and VCI bits into the addresses of physical or logical network links and routes each ATM cell appropriately.

FIG. 17B shows the structure of the header of one of the possible next levels, that of the IP protocol. The possible children of the IP protocol are shown in table 1752. The header starts at a different location (L3) depending on the parent protocol. Also included in FIG. 17B are some of the fields to be extracted for the signature, and an indication of where the next level's header would start in the packet.

Note that the information shown in FIGS. 16, 17A, and 17B would be specified to the monitor in the form of PDL files and compiled into the database 308 of pattern structures and extraction operations.

The parsing subsystem 301 performs operations on the packet header data based on information stored in the database 308. Because data related to protocols can be considered as organized in the form of a tree, it is required in the parsing subsystem to search through data that is originally organized in the form of a tree. Since real time operation is preferable, it is required to carry out such searches rapidly.

Data structures are known for efficiently storing information organized as trees. Such storage-efficient means typically require arithmetic computations to determine pointers to the data nodes. Searching using such storage-efficient data structures may therefore be too time consuming for the present application. It is therefore desirable to store the protocol data in some form that enables rapid searches.

In accordance with another aspect of the invention, the database 308 is stored in a memory and includes a data structure used to store the protocol specific operations that are to be performed on a packet. In particular, a compressed representation is used to store information in the pattern parse and extraction database 308 used by the pattern recognition process 304 and the extraction process 306 in the parser subsystem 301. The data structure is organized for rapidly locating the child protocol related information by using a set of one or more indices to index the contents of the data structure. A data structure entry includes an indication of validity. Locating and identifying the child protocol includes indexing the data structure until a valid entry is found. Using the data structure to store the protocol information used by the pattern recognition engine (PRE) 1006 enables the parser subsystem 301 to perform rapid searches.

In one embodiment, the data structure is in the form of a three-dimensional structure. Note that this three dimensional structure in turn is typically stored in memory as a set of two-dimensional structures whereby one of the three dimensions of the 3-D structure is used as an index to a particular 2-D array. This forms a first index to the data structure.

FIG. 18A shows such a 3-D representation 1800 (which may be considered as an indexed set of 2-D representations). The three dimensions of this data structure are:

1. Type identifier [1:M]. This is the identifier that identifies a type of protocol at a particular level. For example, 01 indicates an Ethernet frame. 64 indicates IP, 16 indicates an IEEE type Ethernet packet, etc. Depending on how many protocols the packet parser can handle, M may be a large number; M may grow over time as the capability of analyzing more protocols is added to monitor 300. When the 3-D structure is considered a set of 2-D structures, the type ID is an index to a particular 2-D structure.

2. Size [1:64]. The size of the field of interest within the packet.

3. Location [1:512]. This is the offset location within the packet, expressed as a number of octets (bytes).

At any one of these locations there may or may not be valid data. Typically, there will not be valid data in most locations. The size of the 3-D array is M by 64 by 512, which can be large; M for example may be 10,000. This is a sparse 3-D matrix with most entries empty (i.e., invalid).

Each array entry includes a "node code" that indicates the nature of the contents. This node code has one of four values: (1) a "protocol" node code indicating to the pattern recognition process 304 that a known protocol has been recognized as the next (i.e., child) protocol; (2) a "terminal" node code indicating that there are no children for the protocol presently being searched, i.e., the node is a final node in the protocol tree; (3) a "null" (also called "flush") node code indicating that there is no valid entry.

In the preferred embodiment, the possible children and other information are loaded into the data structure by an initialization that includes compilation process 310 based on the PDL files 336 and the layering selections 338. The following information is included for any entry in the data structure that represents a protocol.

(a) A list of children (as type IDs) to search next. For example, for an Ethernet type 2, the children are Ethertype (IP, IPX, etc, as shown in 1712 of FIG. 17). These children are compiled into the type codes. The code for IP is 64, that for IPX is 83, etc.
  (b) For each of the IDs in the list, a list of the child recognition patterns that need to be compared. For example, 64:0800$_{16}$ in the list indicates that the value to look for is 0800 (hex) for the child to be type ID 64 (which is the IP protocol). 83:8137$_{16}$ in the list indicates that the value to look for is 8137 (hex) for the child to be type ID 83 (which is the IPX protocol), etc.
  (c) The extraction operations to perform to build the identifying signature for the flow. The format used is (offset, length, flow_signature_value_identifier), the flow_signature_value_identifier indicating where the extracted entry goes in the signature, including what operations (AND, ORs, etc.) may need to be carried out. If there is also a hash key component, for instance, then information on that is included. For example, for an Ethertype packet, the 2-byte type (1706 in FIG. 17) is used in the signature. Furthermore, a 1-byte hash (1708 in FIG. 17A) of the type is included. . Note furthermore, the child protocol starts at offset 14.

An additional item may be the "fold." Folding is used to reduce the storage requirements for the 3-D structure. Since each 2-D array for each protocol ID may be sparsely populated, multiple arrays may be combined into a single 2-D array as long as the individual entries do not conflict with each other. A fold number is then used to associate each element. For a given lookup, the fold number of the lookup must match the fold number entry. Folding is described in more detail below.

In the case of the Ethernet, the next protocol field may indicate a length, which tells the parser that this is a IEEE type packet, and that the next protocol is elsewhere. Normally, the next protocol field contains a value which identifies the next, i.e., child protocol.

The entry point for the parser subsystem is called the virtual base layer and contains the possible first children, i.e., the packet types. An example set of protocols written in a high level protocol description language (PDL) is included herein. The set includes PDL files, and the file describing all the possible entry points (i.e., the virtual base) is called virtual.pdl. There is only one child, 01, indicating the Ethernet, in this file. Thus, the particular example can only handle Ethernet packets. In practice, there can be multiple entry points.

In one embodiment, the packet acquisition device provides a header for every packet acquired and input into monitor 300 indicating the type of packet. This header is used to determine the virtual base layer entry point to the parser subsystem. Thus, even at the base layer, the parser subsystem can identify the type of packet.

Initially, the search starts at the child of the virtual base, as obtained in the header supplied by the acquisition device. In the case of the example, this has ID value 01, which is the 2-D array in the overall 3-D structure for Ethernet packets.

Thus hardware implementing pattern analysis process 304 (e.g., pattern recognition engine (PRE) 1006 of FIG. 10) searches to determine the children (if any) for the 2-D array that has protocol ID 01. In the preferred embodiment that uses the 3-D data structure, the hardware PRE 1006 searches up to four lengths (i.e., sizes) simultaneously. Thus, the process 304 searches in groups of four lengths. Starting at protocol ID 01, the first two sets of 3-D locations searched are

| | | |
|---|---|---|
| (1, 1, 1) | (1, 1, 2) | . . . |
| (1, 2, 1) | (1, 2, 2) | |
| (1, 3, 1) | (1, 3, 2) | |
| (1, 4, 1) | (1, 4, 2) | |

At each stage of a search, the analysis process 304 examines the packet and the 3-D data structure to see if there is a match (by looking at the node code). If no valid data is found, e.g., using the node code, the size is incremented (to maximum of 4) and the offset is then incremented as well.

Continuing with the example, suppose the pattern analysis process 304 finds something at 1, 2, 12. By this, we mean that the process 304 has found that for protocol ID value 01 (Ethernet) at packet offset 12, there is information in the packet having a length of 2 bytes (octets) that may relate to the next (child) protocol. The information, for example, may be about a child for this protocol expressed as a child recognition pattern. The list of possible child recognition patterns that may be in that part of the packet is obtained from the data structure.

The Ethernet packet structure comes in two flavors, the Ethertype packet and newer IEEE types, and the packet location that indicates the child is different for both. The location that for the Ethertype packet indicates the child is a "length" for the IEEE type, so a determination is made for the Ethernet packet whether the "next protocol" location contains a value or a length (this is called a "LENGTH" operation). A successful LENGTH operation is indicated by contents less than or equal to 05DC$_{16}$, then this is an IEEE type Ethernet frame. In such a case, the child recognition pattern is looked for elsewhere. Otherwise, the location contains a value that indicates the child.

Note that while this capability of the entry being a value (e.g., for a child protocol ID) or a length (indicating further analysis to determine the child protocol) is only used for Ethernet packets, in the future, other packets may end up being modified. Accordingly, this capability in the form of a macro in the PDL files still enables such future packets to be decoded.

Continuing with the example, suppose that the LENGTH operation fails. In that case, we have an Ethertype packet, and the next protocol field (containing the child recognition pattern) is 2 bytes long starting at offset 12 as shown as packet field 1702 in FIG. 17A. This will be one of the children of the Ethertype shown in table 1712 in FIG. 17A. The PRE uses the information in the data structure to check what the ID code is for the found 2-byte child recognition pattern. For example, if the child recognition pattern is 0800

(Hex), then the protocol is IP. If the child recognition pattern is 0BAD (Hex) the protocol is VIP (VINES).

Note that an alternate embodiment may keep a separate table that includes all the child recognition patterns and their corresponding protocol ID's To follow the example, suppose the child recognition pattern at 1, 2, 12 is $0800_{16}$, indicating IP. The ID code for the IP protocol is $64_{10}$). To continue with the Ethertype example, once the parser matches one of the possible children for the protocl—in the example, the protocol type is IP with an ID of 64—then the parser continues the search for the next level. The ID is 64, the length is unknown, and offset is known to be equal or larger than 14 bytes (12 offset for type, plus 2, the length of type), so the search of the 3-D structure commences from location (64, 1) at packet offset 14. A populated node is found at (64, 2) at packet offset 14. Heading details are shown as 1750 in FIG. 17B. The possible children are shown in table 1752.

Alternatively, suppose that at (1, 2, 12) there was a length $1211_{10}$. This indicates that this is an IEEE type Ethernet frame, which stores its type elsewhere. The PRE now continues its search at the same level, but for a new ID, that of an IEEE type Ethernet frame. An IEEE Ethernet packet has protocol ID 16, so the PRE continues its search of the three-dimensional space with ID 16starting at packet offset 14.

In our example, suppose there is a "protocol" node code found at (16, 2) at packet offset 14, and the next protocol is specified by child recognition pattern $0800_{16}$. This indicates that the child is the IP protocol, which has type ID 64. Thus the search continues, starting at (64, 1) at packet offset 16.
Compression.

As noted above, the 3-D data structure is very large, and sparsely populated. For example, if 32 bytes are stored at each location, then the length is M by 64 by 512 by 32 bytes, which is M megabytes. If M=10,000, then this is about 10 gigabytes. It is not practical to include 10 Gbyte of memory in the parser subsystem for storing the database 308. Thus a compressed form of storing the data is used in the preferred embodiment. The compression is preferably carried out by an optimizer component of the compilation process 310.

Recall that the data structure is sparse. Different embodiments may use different compression schemes that take advantage of the sparseness of the data structure. One embodiment uses a modification of multi-dimensional run length encoding.

Another embodiment uses a smaller number two-dimensional structures to store the information that otherwise would be in one large three-dimensional structure. The second scheme is used in the preferred embodiment.

FIG. 18A illustrated how the 3-D array 1800 can be considered a set of 2-D arrays, one 2-D array for each protocol (i.e., each value of the protocol ID). The 2-D structures are shown as 1802-1, 1802-2, . . . , 1802-M for up to M protocol ID's. One table entry is shown as 1804. Note that the gaps in table are used to illustrate that each 2-D structure table is typically large.

Consider the set of trees that represent the possible protocols. Each node represents a protocol, and a protocol may have a child or be a terminal protocol. The base (root) of the tree has all packet types as children. The other nodes form the nodes in the tree at various levels from level 1 to the final terminal nodes of the tree. Thus, one element in the base node may reference node ID 1, another element in the base node may reference node ID 2 and so on. As the tree is traversed from the root, there may be points in the tree where the same node is referenced next. This would occur, for example, when an application protocol like Telnet can run on several transport connections like TCP or UDP. Rather than repeating the Telnet node, only one node is represented in the patterns database 308 which can have several parents. This eliminates considerable space explosion.

Each 2-D structure in FIG. 18A represents a protocol. To enable saving space by using only one array per protocol which may have several parents, in one embodiment, the pattern analysis subprocess keeps a "current header" pointer. Each location (offset) index for each protocol 2-D array in the 3-D structure is a relative location starting with the start of header for the particular protocol.

Each of the two-dimensional arrays is sparse. The next step of the optimization, is checking all the 2-D arrays against all the other 2-D arrays to find out which ones can share memory. Many of these 2-D arrays are often sparsely populated in that they each have only a small number of valid entries. So, a process of "folding" is next used to combine two or more 2-D arrays together into one physical 2-D array without losing the identity of any of the original 2-D arrays (i.e., all the 2-D arrays continue to exist logically). Folding can occur between any 2-D arrays irrespective of their location in the tree as long as certain conditions are met.

Assume two 2-D arrays are being considered for folding. Call the first 2-D arrays A and the second 2-D array B. Since both 2-D arrays are partially populated, 2-D array B can be combined with 2-D arrays A if and only if none of the individual elements of these two 2-D arrays that have the same 2-D location conflict. If the result is foldable, then the valid entries of 2-D array B are combined with the valid entries of 2-D array A yielding one physical 2-D array. However, it is necessary to be able to distinguish the original 2-D array A entries from those of 2-D array B. For example, if a parent protocol of the protocol represented by 2-D array B wants to reference the protocol ID of 2-D array B, it must now reference 2-D array A instead. However, only the entries that were in the original 2-D array B are valid entries for that lookup. To accomplish this, each element in any given 2-D array is tagged with a fold number. When the original tree is created, all elements in all the 2-D arrays are initialized with a fold value of zero. Subsequently, if 2-D array B is folded into 2-D array A, all valid elements of 2-D array B are copied to the corresponding locations in 2-D array A and are given different fold numbers than any of the elements in 2-D array A. For example, if both 2-D array A and 2-D array B were original 2-D arrays in the tree (i.e., not previously folded) then, after folding, all the 2-D array A entries would still have fold 0 and the 2-D array B entries would now all have a fold value of 1. After 2-D array B is folded into 2-D array A, the parents of 2-D array B need to be notified of the change in the 2-D array physical location of their children and the associated change in the expected fold value.

This folding process can also occur between two 2-D arrays that have already been folded, as long as none of the individual elements of the two 2-D arrays conflict for the same 2-D array location. As before, each of the valid elements in 2-D array B must have fold numbers assigned to them that are unique from those of 2-D array A. This is accomplished by adding a fixed value to all the 2-D array B fold numbers as they are merged into 2-D array A. This fixed value is one larger than the largest fold value in the original 2-D array A. It is important to note that the fold number for any given 2-D array is relative to that 2-D array only and does not span across the entire tree of 2-D arrays.

This process of folding can now be attempted between all combinations of two 2-D arrays until there are no more candidates that qualify for folding. By doing this, the total number of 2-D arrays can be significantly reduced.

Whenever a fold occurs, the 3-D structure (i.e., all 2-D arrays) must be searched for the parents of the 2-D array being folded into another array. The matching pattern which previously was mapped to a protocol ID identifying a single 2-D array must now be replaced with the 2-D array ID and the next fold number (i.e., expected fold).

Thus, in the compressed data structure, each entry valid entry includes the fold number for that entry, and additionally, the expected fold for the child.

An alternate embodiment of the data structure used in database 308 is illustrated in FIG. 18B. Thus, like the 3-D structure described above, it permits rapid searches to be performed by the pattern recognition process 304 by indexing locations in a memory rather than performing address link computations. The structure, like that of FIG. 18A, is suitable for implementation in hardware, for example, for implementation to work with the pattern recognition engine (PRE) 1006 of FIG. 10.

A table 1850, called the protocol table (PT) has an entry for each protocol known by the monitor 300, and includes some of the characteristics of each protocol, including a description of where the field that specifies next protocol (the child recognition pattern) can be found in the header, the length of the next protocol field, flags to indicate the header length and type, and one or more slicer commands, the slicer can build the key components and hash components for the packet at this protocol at this layer level.

For any protocol, there also are one or more lookup tables (LUTs). Thus database 308 for this embodiment also includes a set of LUTs 1870. Each LUT has 256 entries indexed by one byte of the child recognition pattern that is extracted from the next protocol field in the packet. Such a protocol specification may be several bytes long, and so several of LUTs 1870 may need to be looked up for any protocol.

Each LUT's entry includes a 2-bit "node code" that indicates the nature of the contents, including its validity. This node code has one of four values: (1) a "protocol" node code indicating to the pattern recognition engine 1006 that a known protocol has been recognized; (2) an "intermediate" node code, indicating that a multi-byte protocol code has been partially recognized, thus permitting chaining a series of LUTs together before; (3) a "terminal" node code indicating that there are no children for the protocol presently being searched, i.e., the node is a final node in the protocol tree; (4) a "null" (also called "flush" and "invalid") node code indicating that there is no valid entry.

In addition to the node code, each LUT entry may include the next LUT number, the next protocol number (for looking up the protocol table 1850), the fold of the LUT entry, and the next fold to expect. Like in the embodiment implementing a compressed form of the 3-D representation, folding is used to reduce the storage requirements for the set of LUTs. Since the LUTs 1870 may be sparsely populated, multiple LUTs may be combined into a single LUT as long as the individual entries do not conflict with each other. A fold number is then used to associate each element with its original LUT.

For a given lookup, the fold number of the lookup must match the fold number in the lookup table. The expected fold is obtained from the previous table lookup (the "next fold to expect" field). The present implementation uses 5-bits to describe the fold and thus allows up to 32 tables to be folded into one table.

When using the data structure of FIG. 18B, when a packet arrives at the parser, the virtual base has been pre-pended or is known. The virtual base entry tells the packet recognition engine where to find the first child recognition pattern in the packet. The pattern recognition engine then extracts the child recognition pattern bytes from the packet and uses them as an address into the virtual base table (the first LUT). If the entry looked up in the specified next LUT by this method matches the expected next fold value specified in the virtual base entry, the lookup is deemed valid. The node code is then examined. If it is an intermediate node then the next table field obtained from the LUT lookup is used as the most significant bits of the address. The next expected fold is also extracted from the entry. The pattern recognition engine 1006 then uses the next byte from the child recognition pattern as the for the next LUT lookup.

Thus, the operation of the PRE continues until a terminal code is found. The next (initially base layer) protocol is looked up in the protocol table 1850 to provide the PRE 1006 with information on what field in the packet (in input buffer memory 1008 of parser subsystem 1000) to use for obtaining the child recognition pattern of the next protocol, including the size of the field. The child recognition pattern bytes are fetched from the input buffer memory 1008. The number of bytes making up the child recognition pattern is also now known.

The first byte of the protocol code bytes is used as the lookup in the next LUT. If a LUT lookup results in a node code indicating a protocol node or a terminal node, the Next LUT and next expected fold is set, and the "next protocol" from LUT lookup is used as an index into the protocol table 1850. This provides the instructions to the slicer 1007, and where in the packet to obtain the field for the next protocol. Thus, the PRE 1006 continues until it is done processing all the fields (i.e., the protocols), as indicated by the terminal node code reached.

Note that when a child recognition pattern is checked against a table there is always an expected fold. If the expected fold matches the fold information in the table, it is used to decide what to do next. If the fold does not match, the optimizer is finished.

Note also that an alternate embodiment may use different size LUTs, and then index a LUT by a different amount of the child recognition pattern.

The present implementation of this embodiment allows for child recognition patterns of up to four bytes. Child recognition patterns of more than 4 bytes are regarded as special cases.

In the preferred embodiment, the database is generated by the compiler process 310. The compiler process first builds a single protocol table of all the links between protocols. Links consist of the connection between parent and child protocols. Each protocol can have zero or more children. If a protocol has children, a link is created that consists of the parent protocol, the child protocol, the child recognition pattern, and the child recognition pattern size. The compiler first extracts child recognition patterns that are greater than two bytes long. Since there are only a few of these, they are handled separately. Next sub links are created for each link that has a child recognition pattern size of two.

All the links are then formed into the LUTs of 256 entries.

Optimization is then carried out. The first step in the optimization is checking all the tables against all the other tables to find out which ones can share a table. This process proceeds the same way as described above for two-dimensional arrays, but now for the sparse lookup tables.

Part of the initialization process (e.g., compiler process 310) loads a slicer instruction database with data items including of instruction, source address, destination address, and length. The PRE 1006 when it sends a slicer instruction sends this instruction as an offset into the slicer instruction database. The instruction or Op code tells the slicer what to extract from the incoming packet and where to put it in the flow signature. Writing into certain fields of the flow signature automatically generates a hash. The instruction can also tell the slicer how to determine the connection status of certain protocols.

Note that alternate embodiments may generate the pattern, parse and extraction database other than by compiling PDL files.

The Compilation Process

The compilation process 310 is now described in more detail. This process 310 includes creating the parsing patterns and extractions database 308 that provides the parsing subsystem 301 with the information needed to parse packets and extract identifying information, and the state processing instructions database 326 that provides the state processes that need to be performed in the state processing operation 328.

Input to the compiler includes a set of files that describe each of the protocols that can occur. These files are in a convenient protocol description language (PDL) which is a high level language. PDL is used for specifying new protocols and new levels, including new applications. The PDL is independent of the different types of packets and protocols that may be used in the computer network. A set of PDL files is used to describe what information is relevant to packets and packets that need to be decoded. The PDL is further used to specify state analysis operations. Thus, the parser subsystem and the analyzer subsystems can adapt and be adapted to a variety of different kinds of headers, layers, and components and need to be extracted or evaluated, for example, in order to build up a unique signature.

There is one file for each packet type and each protocol. Thus there is a PDL file for Ethernet packets and there is a PDL file for frame relay packets. The PDL files are compiled to form one or more databases that enable monitor 300 to perform different protocol specific operations on a packet wherein the protocol headers of any protocol are located at different locations depending on the parent protocol or protocols used in the packet. Thus, the packet monitor adapts to different protocols according to the contents of the packet. In particular, the parser subsystem 301 is able to extract different types of data for different types of packets. For example, the monitor can know how to interpret a Ethernet packet, including decoding the header information, and also how to interpret an frame relay packet, including decoding the header information.

The set of PDL files, for example, may include a generic Ethernet packet file. There also is included a PDL file for each variation Ethernet file, for example, an EEE Ethernet file.

The PDL file for a protocol provides the information needed by compilation process 310 to generate the database 308. That database in turn tells the parser subsystem how to parse and/or extract information, including one or more of what protocol-specific components of the packet to extract for the flow signature, how to use the components to build the flow signature, where in the packet to look for these components, where to look for any child protocols, and what child recognition patterns to look for. For some protocols, the extracted components may include source and destination addresses, and the PDL file may include the order to use these addresses to build the key. For example, Ethernet frames have end-point addresses that are useful in building a better flow signature. Thus the PDL file for an Ethernet packet includes information on how the parsing subsystem is to extract the source and destination addresses, including where the locations and sizes of those addresses are. In a frame-relay base layer, for example, there are no specific end point addresses that help to identify the flow better, so for those type of packets, the PDL file does not include information that will cause the parser subsystem to extract the end-point addresses.

Some protocols also include information on connections. TCP is an example of such a protocol. Such protocol use connection identifiers that exist in every packet. The PDL file for such a protocol includes information about what those connection identifiers are, where they are, and what their length is. In the example of TCP, for example running over IP, these are port numbers. The PDL file also includes information about whether or not there are states that apply to connections and disconnections and what the possible children are states. So, at each of these levels, the packet monitor 300 learns more about the packet. The packet monitor 300 can identify that a particular packet is part of a particular flow using the connection identifier. Once the flow is identified, the system can determine the current state and what states to apply that deal with connections or disconnections that exist in the next layer up to these particular packets.

For the particular PDL used in the preferred embodiment, a PDL file may include none or more FIELD statement each defining a specific string of bits or bytes (i.e., a field) in the packet. A PDL file may further include none or more GROUP statements each used to tie together several defined fields. A set of such tied together fields is called a group. A PDL file may further include none or more PROTOCOL statements each defining the order of the fields and groups within the header of the protocol. A PDL file may further include none or more FLOW statements each defining a flow by describing where the address, protocol type, and port numbers are in a packet. The FLOW statement includes a description of how children flows of this protocol are determined using state operations. States associated may have state operations that may be used for managing and maintaining new states learned as more packets of a flow are analyzed.

Figure 19:
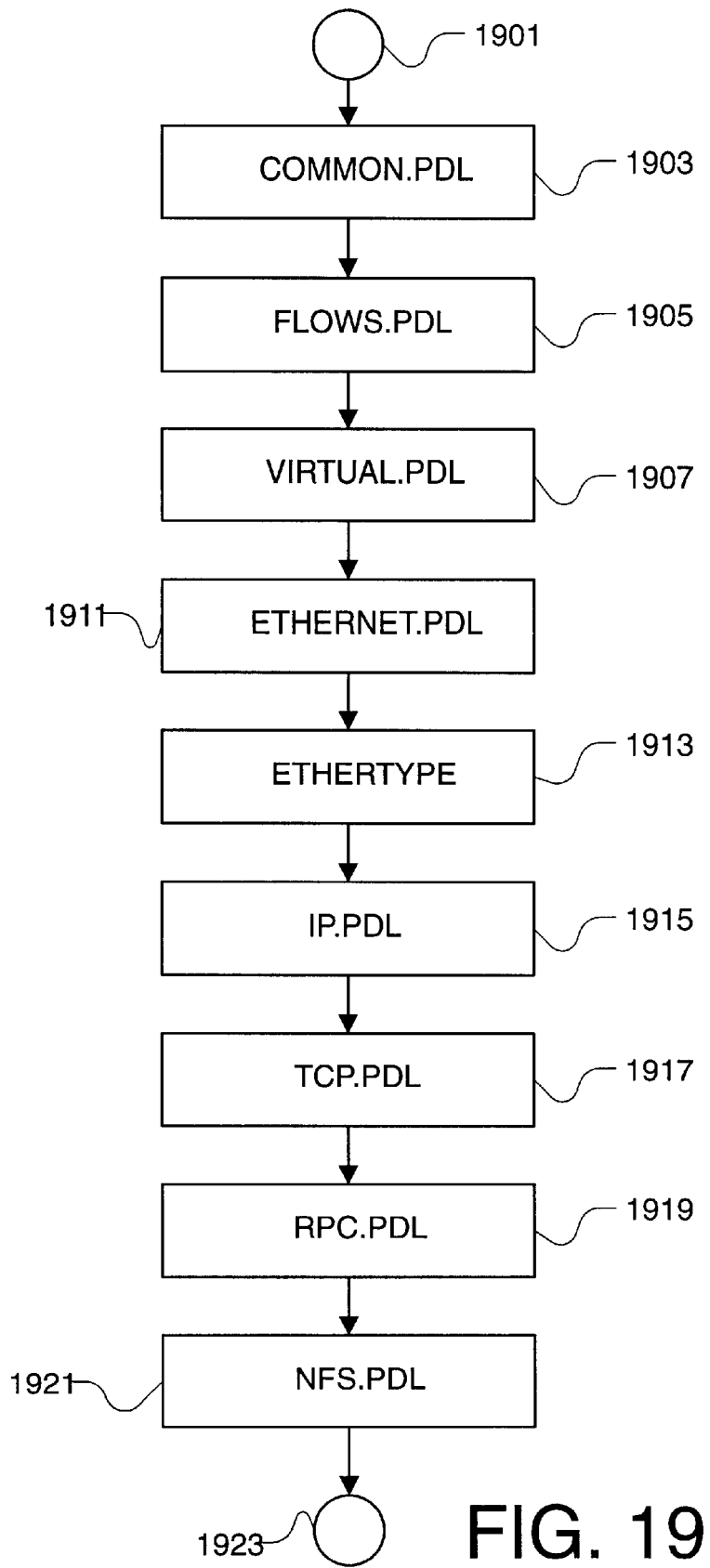
FIG. 19 shows various PDL file modules to be compiled together by the compiling process illustrated in FIG. 20 as an example, in accordance with a compiling aspect of the invention.

FIG. 19 shows a set of PDL files for a layering structure for an Ethernet packet that runs TCP on top of IP. The contents of these PDL files are attached as an APPENDIX hereto. Common.pdl (1903) is a file containing the common protocol definitions, i.e., some field definitions for commonly used fields in various network protocols. Flows.pdl (1905) is a file containing general flow definitions. Virtual.pdl (1907) is a PDL file containing the definition for the VirtualBase layer used. Ethernet.pdl (1911) is the PDL file containing the definition for the Ethernet packet. The decision on Ethertype vs. IEEE type Ethernet file is described herein. If this is Ethertype, the selection is made from the file Ethertype.pdl (1913). In an alternate embodiment, the Ethertype selection definition may be in the same Ethernet file 1911. In a typical implementation, PDL files for other Ethernet types would be included. IP.pdl (1915) is a PDL file containing the packet definitions for the Internet Protocol. TCP.pdl (1917) is the PDL file containing the packet definitions for the Transmission Control Protocol, which in this case is a transport service for the IP protocol. In addition to extracting the protocol information the TCP protocol definition file assists in the process of identification of connections for the processing of states. In a typical set of files, there also would be a file UDP.pdl for the User Datagram Protocol (UDP) definitions. RPC.pdl (1919) is a PDL file file containing the packet definitions for Remote Procedure Calls.

NFS.pdl (1921) is a PDL file containing the packet definitions for the Network File System. Other PDL files would typically be included for all the protocols that might be encountered by monitor 300.

Input to the compilation process 310 is the set of PDL files (e.g., the files of FIG. 19) for all protocols of interest. Input to process 310 may also include layering information shown in FIG. 3 as datagram layer selections 338. The layer selections information describes the layering of the protocols—what protocol(s) may be on top of any particular protocols. For example, IP may run over Ethernet, and also over many other types of packets. TCP may run on top of IP. UDP also may run on top of IP. When no layering information is explicitly included, it is inherent; the PDL files include the children protocols, and this provides the layering information.

Figure 20:
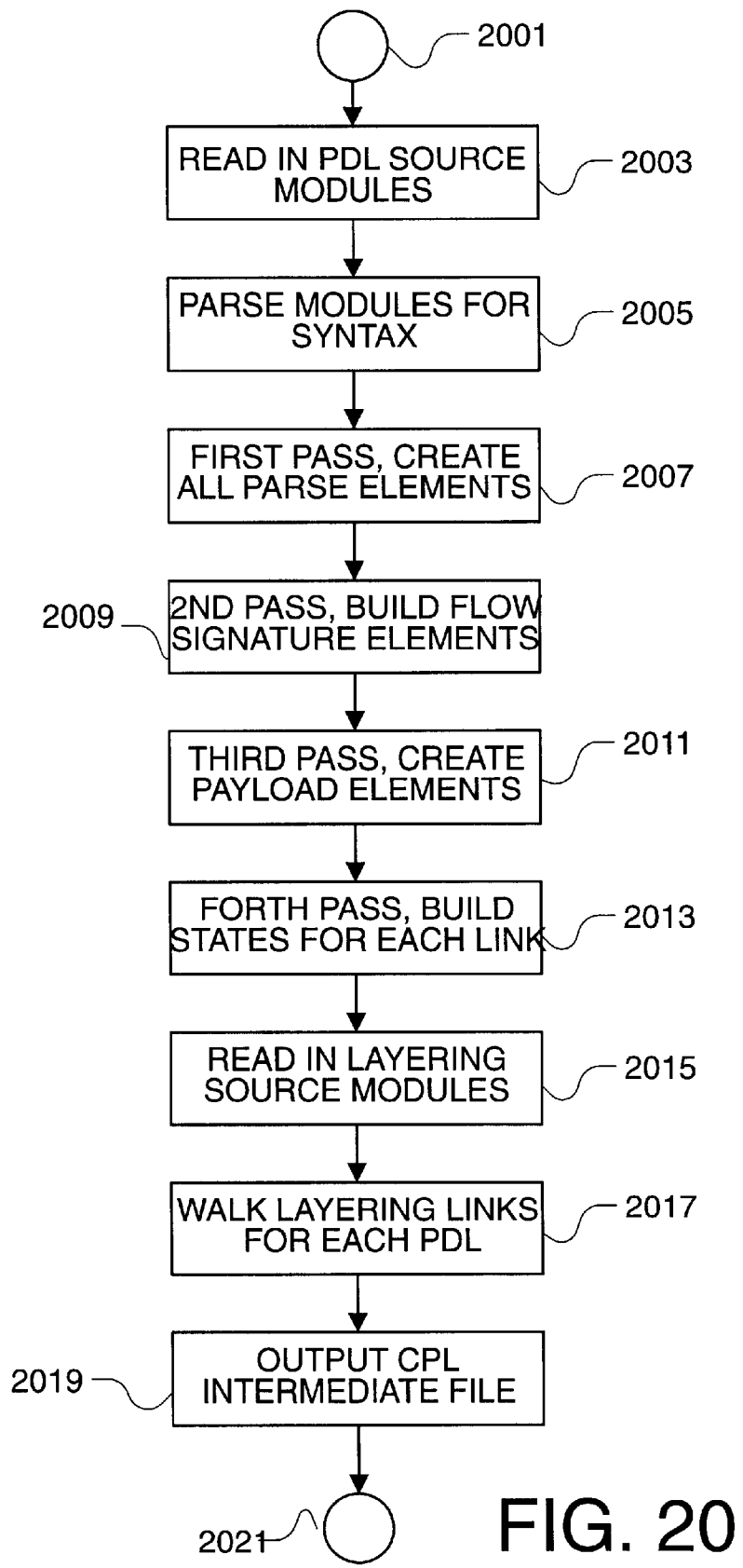
FIG. 20 is a flowchart of the process of compiling high-level language files according to an aspect of the invention.

The compiling process 310 is illustrated in FIG. 20. The compiler loads the PDL source files into a scratch pad memory (step 2003) and reviews the files for the correct syntax (parse step 2005). Once completed, the compiler creates an intermediate file containing all the parse elements (step 2007). The intermediate file in a format called "Compiled Protocol Language" (CPL). CPL instructions have a fixed layer format, and include all of the patterns, extractions, and states required for each layer and for the entire tree for a layer. The CPL file includes the number of protocols and the protocol definitions. A protocol definition for each protocol can include one or more of the protocol name, the protocol ID, a header section, a group identification section, sections for any particular layers, announcement sections, a payload section, a children section, and a states section. The CPL file is then run by the optimizer to create the final databases that will be used by monitor 300. It would be clear to those in the art that alternate implementations of the compilation process 310 may include a different form of intermediate output, or no intermediate output at all, directly generating the final database(s).

After the parse elements have been created, the compiler builds the flow signature elements (step 2009). This creates the extraction operations in CPL that are required at each level for each PDL module for the building of the flow signature (and hash key) and for links between layers (2009).

With the flow signature operations complete, the PDL compiler creates (step 2011) the operations required to extract the payload elements from each PDL module. These payload elements are used by states in other PDL modules at higher layers in the processing.

The last pass is to create the state operations required by each PDL module. The state operations are complied from the PDL files and created in CPL form for later use (2013).

The CPL file is now run through an optimizer that generates the final databases used by monitor 300.

PROTOCOL DEFINITION LANGUAGE (PDL) REFERENCE GUIDE (VERSION A0.02)

Included herein is this reference guide (the "guide") for the page description language (PDL) which, in one aspect of the invention, permits the automatic generation of the databases used by the parser and analyzer sub-systems, and also allows for including new and modified protocols and applications to the capability of the monitor.

COPYRIGHT NOTICE

A portion of this of this document included with the patent contains material which is subject to copyright protection. The copyright owner (Apptitude, Inc., of San Jose, Calif., formerly Technically Elite, Inc.) has no objection to the facsimile reproduction by anyone of the patent document or the patent disclosure or this document, as it appears in the Patent and Trademark Office patent file or records, but otherwise reserves all copyright rights whatsoever. Copyright© 1997–1999 by Apptitude, Inc. (formerly Technically Elite, Inc.). All Rights Reserved.

1. INTRODUCTION

The inventive protocol Definition Language (PDL) is a special purpose language used to describe network protocols and all the fields within the protocol headers. Within this guide, protocol descriptions (PDL files) are referred to as PDL or rules when there in no risk of confusion with other types of descriptions.

PDL uses both form and organization similar to the data structure definition part of the C programming language and the PERL scripting language. Since PDL was derived from a language used to decode network packet contact, the authors have mixed the language format with the requirements of packet decoding. This results in an expressive language that is very familiar and comfortable for describing packet content and the details required representing a flow.

1.1 Summary

The PDL is a non-procedural Forth Generation language (4GL). This means is describes what needs to be done without describing how to do it. The details of how are hidden in the compiler and the Compiled Protocol Layout (CPL) optimization utility.

In addition, it is used to describe network flows by defining which fields are the address fields, which are the protocol type fields, etc.

Once a PDL file is written, it is compiled using the Netscope compiler (nsc), which produces the MeterFlow database (MeterFlow.db) and the Netscope database (Netscope.db). The MeterFlow database contains the flow definitions and the Netscope database contains the protocol header definitions.

These databases are used by programs like: mfkeys, which produces flow keys (also called flow signatures); mfcpl, which produces flow definitions in CPL format; mfpkts which produces sample packets of all known protocols; and netscope, which decodes Sniffer™ and tcpdump files.

1.2 Guide Conventions

The following conventions will be used throughout this guide:

Small courier typeface indicates C code examples or function names. Functions are written with parentheses after them [function ()], variables are written just as their names [variables], and structure names are written prefixed with "struct" [struct packet].

Italics indicate a filename (for instance, mworks/base/h/base.h). Filenames will usually be written relative to the root directory of the distribution.

Constants are expressed in decimal, unless written "0x . . . ", the C language notation for hexadecimal numbers.

Note that any contents on any line in a PDL file following two hyphen (--) are ignored by the compiler. That is, they are comments.

2. PROGRAM STRUCTURE

A MeterFlow PDL decodes and flow set is a non-empty sequence of statements.

There are four basic types of statements or definitions available in MeterFlow PDL:

FIELD,
GROUP,
PROTOCOL and
FLOW.

2.1 Field Definitions

The FIELD definition is used to define a specific string of bits or bytes in the packet. The FIELD definition has the following format:

Name FIELD
SYNTAX Type [{Enums }]
DISPLAY-HINT "FormatString"
LENGTH "Expression"
FLAGS FieldFlags
ENCAP FieldName [, FieldName2]
LOOKUP LookupType [Filename]
ENCODING EncodingType
DEFAULT "value"
DESCRIPTION "Description"

Where only the FIELD and SYNTAX lines are required. All the other lines are attribute lines, which define special characteristics about the FIELD. Attribute lines are optional and may appear in any order. Each of the attribute lines are described in detail below:

2.1.1 SYNTAX Type [{Enums}]

This attribute defines the type and, if the type is an INT, BYTESTRING, BITSTRING, or SNMPSEQUENCE type, the enumerated values for the FIELD. The currently defined types are:

| | |
|---|---|
| INT(numBits) | Integer that is numBits bits long. |
| UNSIGNED INT(numBits) | Unsigned integer that is numBits bits long. |
| BYTESTRING(numBytes) | String that is numBytes bytes long. |
| BYTESTRING(R1 . . . R2) | String that ranges in size from R1 to R2 bytes. |
| BITSTRING(numBits) | String that is numBits bits long. |
| LSTRING(lenBytes) | String with lenBytes header. |
| NSTRING | Null terminated string. |
| DNSSTRING | DNS encoded string. |
| SNMPOID | SNMP Object Identifier. |
| SNMPSEQUENCE | SNMP Sequence. |
| SNMPTIMETICKS | SNMP TimeTicks. |
| COMBO field1 field2 | Combination pseudo field. |

2.1.2 DISPLAY-HINT "FormatString"

This attribute is for specifying how the value of the FIELD is displayed. The currently supported formats are:

| | |
|---|---|
| Numx | Print as a num byte hexidecimal number. |
| Numd | Print as a num byte decimal number. |
| Numo | Print as a num byte octal number. |
| Numb | Print as a num byte binary number. |
| Numa | Print num bytes in ASCII format. |
| Text | Print as ASCII text. |
| HexDump | Print in hexdump format. |

2.1.3 LENGTH "Expression"

This attribute defines an expression for determining the FIELD's length. Expressions are arithmetic and can refer to the value of other FIELD's in the packet by adding a $ to the referenced field's name. For example, "($tcpHeaderLen*4)−20" is a valid expression if tcpHeaderLen is another field defined for the current packet.

2.1.4 FLAGS FieldFlags

The attribute defines some special flags for a FIELD. The currently supported FieldFlags are:

| | |
|---|---|
| SAMELAYER | Display field on the same layer as the previous field. |
| NOLABEL | Don't display the field name with the value. |
| NOSHOW | Decode the field but don't display it. |
| SWAPPED | The integer value is swapped. |

2.1.5 ENCAP FieldName [, FieldName2]

This attribute defines how one packet is encapsulated inside another. Which packet is determined by the value of the FieldName field. If no packet is found using FieldName then FieldName2 is tried.

2.1.6 LOOKUP LookupType [Filename]

This attribute defines how to lookup the name for a particular FIELD value. The currently supported LookupTypes are:

| | |
|---|---|
| SERVICE | Use getservbyport( ). |
| HOSTNAME | Use gethostbyaddr( ). |
| MACADDRESS | Use $METERFLOW/conf/mac2ip.cf. |
| FILE file | Use file to lookup value. |

2.1.7 ENCODING EncodingType

This attribute defines how a FIELD is encoded. Currently, the only supported EncodingType is BER (for Basic Encoding Rules defined by ASN.1).

2.1.8 DEFAULT "value"

This attribute defines the default value to be used for this field when generating sample packets of this protocol.

2.1.9 DESCRIPTION "Description"

This attribute defines the description of the FIELD. It is used for informational purposes only.

2.2 Group Definitions

The GROUP definition is used to tie several related FIELDs together. The GROUP definition has the following format:

Name GROUP
LENGTH "Expression"
OPTIONAL "Condition"
SUMMARIZE "Condition":"FormatString" ["Condition": "FormatString" . . . ]
DESCRIPTION "Description"
::={Name=FieldOrGroup [, Name=FieldorGroup . . . ]}

Where only the GROUP and ::=lines are required. All the other lines are attribute lines, which define special characteristics for the GROUP. Attribute lines are optional and may appear in any order. Each attribute line is described in detail below:

2.2.1 LENGTH "Expression"

This attribute defines an expression for determining the GROUP's length. Expressions are arithmetic and can refer to the value of other FIELD's in the packet by adding a $ to the referenced field's name. For example, "($tcpHeaderLen*4)–20" is a valid expression if tcpHeaderLen is another field defined for the current packet.

2.2.2 OPTIONAL "Condition"

This attribute defines a condition for determining whether a GROUP is present or not. Valid conditions are defined in the Conditions section below.

2.2.3 SUMMARIZE "Condition":"FormatString" ["Condition":"FormatString" . . . ]

This attribute defines how a GROUP will be displayed in Detail mode. A different format (FormatString) can be specified for each condition (Condition). Valid conditions are defined in the Conditions section below. Any FIELD's value can be referenced within the FormatString by proceeding the FIELD's name with a $. In addition to FIELD names there are several other special $ keywords:

| | |
|---|---|
| $LAYER | Displays the current protocol layer. |
| $GROUP | Displays the entire GROUP as a table. |
| $LABEL | Displays the GROUP label. |
| $field | Displays the field value (use enumerated name if available). |
| $:field | Displays the field value (in raw format). |

2.2.4 DESCRIPITION "Description"

This attribute defines the description of the GROUP. It is used for informational purposes only.

2.2.5 ::={Name=FieldOrGroup [, Name=FieldOrGroup . . . ]}

This defines the order of the fields and subgroups within the GROUP.

2.3 PROTOCOL Definitions

The PROTOCOL definition is used to define the order of the FIELDs and GROUPs within the protocol header. The PROTOCOL definition has the following format:

Name PROTOCOL
SUMMARIZE "Condition":"FormatString"] "Condition":"FormatString" . . . ]
DESCRIPTION "Description"
REFERENCE "Reference"
::={Name=FieldOrGroup [, Name=FieldOrGroup . . . ]}

Where only the PROTOCOL and ::=lines are required. All the other lines are attribute lines, which define special characteristics for the PROTOCOL. Attribute lines are optional and may appear in any order. Each attribute line is described in detail below:

2.3.1 SUMMARIZE "Condition":"FormatString" ["Condition":"FormatString". . . ]

This attribute defines how a PROTOCOL will be displayed in Summary mode. A different format (FormatString) can be specified for each condition (Condition). Valid conditions are defined in the Conditions section below. Any FIELD's value can be referenced within the FormatString by proceeding the FIELD's name with a $. In addition to FIELD names there are several other special $ keywords:

| | |
|---|---|
| $LAYER | Displays the current protocol layer. |
| $VARBIND | Displays the entire SNMP VarBind list. |
| $field | Displays the field value (use enumerated name if available). |
| $:field | Displays the field value (in raw format). |
| $#field | Counts all occurrences of field. |
| $*field | Lists all occurrences of field. |

2.3.2 DESCRIPTION "Description"

This attribute defines the description of the PROTOCOL. It is used for informational purposes only.

2.3.3 REFERENCE "Reference"

This attribute defines the reference material used to determine the protocol format. It is used for informational purposes only.

2.3.4 ::={Name=FieldOrGroup [, Name=FieldOrGroup . . . ]}

This defines the order of the FIELDs and GROUPs within the PROTOCOL.

2.4 FLOW Definitions

The FLOW definition is used to define a network flow by describing where the address, protocol type, and port numbers are in a packet. The FLOW definition has the following format:

Name FLOW
HEADER {Option [, Option . . . ]}
DLC-LAYER {Option [, Option . . . ]}
NET-LAYER {Option [, Option . . . ]}
CONNECTION {Option [, Option . . . ]}
PAYLOAD {Option [, Option . . . ]}
CHILDREN {Option [, Option . . . ]}
STATE-BASED
STATES "Definitions"

Where only the FLOW line is required. All the other lines are attribute lines, which define special characteristics for the FLOW. Attribute lines are optional and may appear in any order. However, at least one attribute line must be present. Each attribute line is described in detail below:

2.4.1 HEADER {Option [, Option . . . ]}

This attribute is used to describe the length of the protocol header. The currently supported Options are:

| | |
|---|---|
| LENGTH = number | Header is a fixed length of size number. |
| LENGTH = field | Header is variable length determined by value of field. |
| IN-WORDS | The units of the header length are in 32-bit words rather than bytes. |

2.4.2 DLC-LAYER {Option [, Option . . . ]}

If the protocol is a data link layer protocol, this attribute describes it. The currently supported Options are:

| | |
|---|---|
| DESTINATION = field | Indicates which field is the DLC destination address. |
| SOURCE = field | Indicates which field is the DLC source address. |
| PROTOCOL | Indicates this is a data link layer protocol. |
| TUNNELING | Indicates this is a tunneling protocol. |

2.4.3 NET-LAYER {Option [, Option . . . ]}

If the protocol is a network layer protocol, then this attribute describes it. The currently supported Options are:

| | |
|---|---|
| DESTINATION = field | Indicates which field is the network destination address. |
| SOURCE = field | Indicates which field is the network source address. |
| TUNNELING | Indicates this is a tunneling protocol. |
| FRAGMENTATION = type | Indicates this protocol supports fragmentation. There are currently two fragmentation types: IPV4 and IPV6. |

2.4.4 CONNECTION {Option [, Option . . . ]}

If the protocol is a connection-oriented protocol, then this attribute describes how connections are established and torn down. The currently supported Options are:

| | |
|---|---|
| IDENTIFIER = field | Indicates the connection identifier field. |
| CONNECT-START = "flag" | Indicates when a connection is being initiated. |
| CONNECT-COMPLETE = "flag" | Indicates when a connection has been established. |
| DISCONNECT-START = "flag" | Indicates when a connection is being torn down. |
| DISCONNECT-COMPLETE = "flag" | Indicates when a connection has been torn down. |
| INHERITED | Indicates this is a connection-oriented protocol but the parent protocol is where the connection is established. |

2.4.5 PAYLOAD {Option [, Option . . . ]}

This attribute describes how much of the payload from a packet of this type should be stored for later use during analysis. The currently supported Options are:

| | |
|---|---|
| INCLUDE-HEADER | Indicates that the protocol header should be included. |
| LENGTH = number | Indicates how many bytes of the payload should be stored. |
| DATA = field | Indicates which field contains the payload. |

2.4.6 CHILDREN {Option [, Option . . . ]}

This attribute describes how children protocols are determined. The currently supported Options are:

| | |
|---|---|
| DESTINATION = field | Indicates which field is the destination port. |
| SOURCE = field | Indicates which field is the source port. |
| LLCCHECK = flow | Indicates that if the DESTINATION field is less than 0 x 05DC then use flow instead of the current flow definition. |

2.4.7 STATE-BASED

This attribute indicates that the flow is a state-based flow.

2.4.8 STATES "Definitions"

This attribute describes how children flows of this protocol are determined using states. See the State Definitions section below for how these states are defined.

2.5 CONDITIONS

Conditions are used with the OPTIONAL and SUMMARIZE attributes and may consist of the following:

| | |
|---|---|
| Value1 == Value2 | Value1 equals Value2. Works with string values. |
| Value1 != Value2 | Value1 does not equal Value2. Works with string values. |
| Value1 <= Value2 | Value1 is less than or equal to Value2. |
| Value1 >= Value2 | Value1 is greater than or equal to Value2. |
| Value1 < Value2 | Value1 is less than Value2. |
| Value1 > Value2 | Value1 is greater than Value2. |
| Field m/regex/ | Field matches the regular expression regex. |

Where Value1 and Value2 can be either FIELD references (field names preceded by a $) or constant values. Note that compound conditional statements (using AND and OR) are not currently supported.

2.6 STATE DEFINITIONS

Many applications running over data networks utilize complex methods of classifying traffic through the use of multiple states. State definitions are used for managing and maintaining learned states from traffic derived from the network.

The basic format of a state definition is:

StateName: Operand Parameters [Operand Parameters . . . ]

The various states of a particular flow are described using the following operands:

2.6.1 CHECKCONNECT, Operand

Checks for connection. Once connected executes operand.

2.6.2 GOTO State

Goes to state, using the current packet.

2.6.3 NEXT State

Goes to state, using the next packet.

2.6.4 DEFAULT Operand

Executes operand when all other operands fail.

2.6.5 CHILD Protocol

Jump to child protocol and perform state-based processing (if any) in the child.

2.6.6 WAIT Numpackets, Operand1, Operand2

Waits the specified number of packets. Executes operand1 when the specified number of packets have been received. Executes operand2 when a packet is received but it is less than the number of specified packets.

2.6.7 MATCH 'String' Weight Offset LF-offset Range LF-range, Operand

Searches for a string in the packet, executes operand if found.

2.6.8 CONSTANT Number Offset Range, Operand

Checks for a constant in a packet, executes operand if found.

2.6.9 EXTRACTIP Offset Destination, Operand

Extracts an IP address from the packet and then executes operand.

2.6.10 EXTRACTPORT Offset Destination, Operand

Extracts a port number from the packet and then executes operand.

2.6.11 CREATEREDIRECTEDFLOW, Operand

Creates a redirected flow and then executes operand.

3. EXAMPLE PDL RULES

The following section contains several examples of PDL Rule files.

3.1 Ethernet

The following is an example of the PDL for Ethernet:

```
MacAddress    FIELD
              SYNTAX         BYTESTRING (6)
              DISPLAY-HINT   "1x:"
              LOOKUP         MACADDRESS
              DESCRIPTION
                             "MAC layer physical address"
etherType     FIELD
              SYNTAX         INT(16)
              DISPLAY-HINT   "1x:"
              LOOKUP         FILE "EtherType.cf"
              DESCRIPTION
                             "Ethernet type field"
etherData     FIELD
              SYNTAX         BYTESTRING(46..1500)
              ENCAP          etherType
              DISPLAY-HINT   "HexDump"
              DESCRIPTION
                             "Ethernet data"
ethernet      PROTOCOL
              DESCRIPTION
                             "Protocol format for an Ethernet frame"
              REFERENCE      "RFC 894"
::= { MacDest=macAddress, MacSrc=macAddress, EtherType=etherType,
  Data=etherData }
ethernet      FLOW
              HEADER { LENGTH=14 }
              DLC-LAYER {
                SOURCE=MacSrc,
                DESTINATION=MacDest,
                TUNNELING,
                PROTOCOL
              }
              CHILDREN { DESTINATION=EtherType,
              LLC-CHECK=llc }
```

3.2 IP Version 4

Here is an example of the PDL for the IP protocol:

```
ipAddress     FIELD
              SYNTAX         BYTESTRING(4)
              DISPLAY-HINT   "1d."
              LOOKUP         HOSTNAME
              DESCRIPTION
    "IP address"
ipversion     FIELD
              SYNTAX         INT(4)
              DEFAULT        "4"
ipHeaderLength   FIELD
              SYNTAX INT(4)
ipTypeOfService  FIELD
              SYNTAX         BITSTRING(8) { minCost(1),
                             maxReliability(2),
                             maxThruput(3),
                             minDelay(4) }
ipLength      FIELD
              SYNTAX UNSIGNED INT(16)
ipFlags       FIELD
              SYNTAX         BITSTRING(3) { moreFrags(0),
                             dontFrag(1) }
IpFragmentOffset  FIELD
              SYNTAX         INT(13)
ipProtocol    FIELD
              SYNTAX INT(8)
              LOOKUP FILE "IpProtocol.cf"
```

-continued

```
ipData        FIELD
              SYNTAX         BYTESTRING(0..1500)
              ENCAP          ipProtocol
              DISPLAY-HINT   "HexDump"
ip            PROTOCOL
              SUMMARIZE
              "$FragmentOffset != 0"
                "IpFragment ID=$Identification Offset=$Fragmentoffset"
              *"Default" :
                "IP Protocol=$Protocol"
              DESCRIPTION
                "Protocol format for the Internet Protocol"
              REFERENCE   "RFC 791"
::= { Version=ipVersion, HeaderLength=ipHeaderLength,
  TypeOfService=ipTypeOfService, Length=ipLength,
  Identification=UInt16, IpFlags=ipFlags,
  FragmentOffset=ipFragmentOffset, TimeToLive=Int8,
  Protocol=ipProtocol, Checksum=ByteStr2,
  IpSrc=ipAddress, IpDest=ipAddress, Options=ipOptions,
  Fragment=ipFragment, Data=ipData }
ip            FLOW
              HEADER { LENGTH=HeaderLength, IN-WORDS }
              NET-LAYER {
                SOURCE=IpSrc,
                DESTINATION=IpDest,
                FRAGMENTATION=IPV4,
                TUNNELING
              }
              CHILDREN { DESTINATION=Protocol }
ipFragData    FIELD
              SYNTAX         BYTESTRING(1..1500)
              LENGTH         "ipLength - ipHeaderLength * 4"
              DISPLAY-HINT   "HexDump"
ipFragment    GROUP
              OPTIONAL       "$FragmentOffset != 0"
::= { Data=ipFragData }
ipOptionCode  FIELD
              SYNTAX INT(8) { ipRR(0x07), ipTimestamp(0x44),
                             ipLSRR(0x83),
                             ipSSRR(0x89) }
              DESCRIPTION
                "IP option code"
ipOptionLength   FIELD
              SYNTAX UNSIGNED INT(8)
              DESCRIPTION
                "Length of IP option"
ipOptionData  FIELD
              SYNTAX         BYTESTRING(0..1500)
              ENCAP          ipOptionCode
              DISPLAY-HINT   "HexDump"
ipOptions     GROUP
              LENGTH         "(ipHeaderLength * 4) - 20"
::= { Code=ipOptionCode, Length=ipOptionLength, Pointer=UInt8,
  Data=ipOptionData }
```

3.3 TCP

Here is an example of the PDL for the TCP protocol:

```
tcpPort       FIELD
              SYNTAX UNSIGNED INT(16)
              LOOKUP FILE "TcpPort.cf"
tcpHeaderLen  FIELD
              SYNTAX INT(4)
tcpFlags      FIELD
              SYNTAX BITSTRING(12) { fin(0), syn(1), rst(2), psh(3),
                             ack(4), urg(5) }
tcpData       FIELD
              SYNTAX BYTESTRING(0..1564)
              LENGTH " ($ipLength- ($jpHeaderLength*4)) -
              ($tcpHeaderLen*4) "
              ENCAP          tcpport
              DISPLAY-HINT   "HexDump"
tcp           PROTOCOL
```

```
            SUMMARIZE
                "Default"
                    "TCP ACK=$Ack WIN=$WindowSize"
            DESCRIPTION
                "Protocol format for the Transmission Control Protocol"
            REFERENCE        "RFC 793"
::= { SrcPort=tcpPort, DestPort=tcpPort, SequenceNum=UInt32,
      Ack=UInt32, HeaderLength=tcpHeaderLen, TcpFlags=tcpFlags,
      WindowSize=UInt16, Checksum=ByteStr2,
      UrgentPointer=UInt16, Options=tcpOptions, Data=tcpData }
tcp     FLOW
        HEADER { LENGTH=HeaderLength, IN-WORDS }
        CONNECTION {
            IDENTIFIER=SequenceNum,
            CONNECT-START="TcpFlags:1",
            CONNECT-COMPLETE="TcpFlags:4",
            DISCONNECT-START="TcpFlags:0",
            DISCONNECT-COMPLETE="TcpFlags:4"
        }
        PAYLOAD { INCLUDE-HEADER }
        CHILDREN { DESTINATION=DestPort, SOURCE=SrcPort }
tcpOptionKind FIELD
            SYNTAX UNSIGNED INT(8) { tcpOptEnd(0),
            tcpNop(1),
tcpMSS(2), tcpWscale(3), tcpTimestamp(4) }
            DESCRIPTION
                "Type of TCP option"
tcpOptionDataFIELD
            SYNTAX       BYTESTRING(0..1500)
            ENCAP        tcpOptionKind
            FLAGS        SAMELAYER
            DISPLAY-HINT "HexDump"
tcpOptions  GROUP
            LENGTH       "($tcpHeaderLen * 4) - 20"
::= { Option=tcpOptionKind, OptionLength=UInt8,
      OptionData=tcpOptionData }
tcpMSS PROTOCOL
::= { MaxSegmentSize=UInt16 }
```

3.4 HTTP (With State)

Here is an example of the PDL for the HTTP protocol:

```
httpData FIELD
    SYNTAX   BYTESTRING(1..1500)
    LENGTH   "($ipLength - ($ipHeaderLength * 4)) -
              ($tcpHeaderLen * 4) "
DISPLAY-HINT     "Text"
FLAGS            NOLABEL
http       PROTOCOL
           SUMMARIZE
               "$httpData m/^GET|^HTTP|^HEAD|^POST/" :
                   "HTTP $httpData"
               "$httpData m/^[Dd]ate|^[Ss]erver|^[Ll]ast-
               [Mm]odified/" :
                   "HTTP $httpData"
               "$httpData m/^[Cc]ontent-/" :
                   "HTTP $httpData"
               $httpData m/^<HTML>/" :
                   "HTTP [HTML document]"
               $httpData m/^GIF/" :
                   "HTTP [GIF image]"
               "Default" :
                   "HTTP [Data]"
           DESCRIPTION
               "Protocol format for HTTP."
::= { Data=httpData }
http    FLOW
HEADER { LENGTH=0 }
CONNECTION { INHERITED }
PAYLOAD { INCLUDE-HEADER, DATA=Data, LENGTH=256 }
STATES
            "S0: CHECKCONNECT, GOTO S1
                 DEFAULT NEXT S0
S1: WAIT 2, GOTO S2, NEXT S1
    DEFAULT NEXT S0
S2: MATCH
    '\n\r\n'              900 0 0 255 0, NEXT S3
    '\n\n'                900 0 0 255 0, NEXT S3
    'POST /tds?'          50 0 0 127 1,
                          CHILD sybaseWebsql
    '.hts HTTP/1.0'       50 4 0 127 1,
                          CHILD sybaseJdbc
    'jdbc:sybase:Tds'     50 4 0 127 1,
                          CHILD sybaseTds
    'PCN-The Poin'        500 4 1 255 0,
                          CHILD pointcast
    't: BW-C-'            100 4 1 255 0,
                          CHILD backweb
    DEFAULT NEXT S3
s3: MATCH
    '\n\r\n'              50 0 0  0 0, NEXT S3
    '\n\n'                50 0 0  0 0, NEXT S3
    'Content-Type:'       800 0 0 255 0,
                          CHILD mime
    'PCN-The Poin'        500 4 1 255 0,
                          CHILD pointcast
    't: BW-C-'            100 4 1 255 0,
                          CHILD backweb
    DEFAULT NEXT S0"
sybaseWebsql    FLOW
                STATE-BASED
sybaseJdbc      FLOW
                STATE-BASED
sybaseTds       FLOW
                STATE-BASED
pointcast       FLOW
                STATE-BASED
backweb         FLOW
                STATE-BASED
mime            FLOW
                STATE-BASED
                STATES
                " S0:  MATCH
'application'         900 0 0   1 0,
                      CHILD mimeApplication
'audio'               900 0 0   1 0,
                      CHILD mimeAudio
'image'               50 0 0   1 0,
                      CHILD mimeImage
'text'                50 0 0   1 0,
                      CHILD mimeText
'video'               50 0 0   1 0,
                      CHILD mimeVideo
'x-world'             500 4 1 255 0,
                      CHILD mimeXworld
DEFAULT GOTO S0"
mimApplication  FLOW
                STATE-BASED
mimeAudio       FLOW
                STATE-BASED
                STATES
                "S0: MATCH
    'basic'               100 0 0 1 0,
                          CHILD pdBasicAudio
    'midi'                100 0 0 1 0,
                          CHILD pdMidi
    'mpeg'                100 0 0 1 0,
                          CHILD pdMpeg2Audio
    'vnd.rn-realaudio'    100 0 0 1 0,
                          CHILD pdRealAudio
    'wav'                 100 0 0 1 0,
                          CHILD pdWav
    'x-aiff'              100 0 0 1 0,
                          CHILD pdAiff
    'x-midi'              100 0 0 1 0,
                          CHILD pdMidi
    'x-mpeg'              100 0 0 1 0,
                          CHILD pdMpeg2Audio
    'x-mpgurl'            100 0 0 1 0,
                          CHILD pdMpeg3Audio
```

| | | |
|---|---|---|
| | 'x-pn-realaudio' | 100 0 0 1 0, CHILD pdRealAudio |
| | 'x-wav' | 100 0 0 1 0, CHILD pdWav |
| | DEFAULT GOTO S0" | |
| mimeImage | FLOW STATE-BASED | |
| mimeText | FLOW STATE-BASED | |
| mimeVideo | FLOW STATE-BASED | |
| mimeXworld | FLOW STATE-BASED | |
| pdBasicAudio | FLOW STATE-BASED | |
| pdMidi | FLOW STATE-BASED | |
| pdMpeg2Audio | FLOW STATE-BASED | |
| pdMpeg3Audio | FLOW STATE-BASED | |
| pdRealAudio | FLOW STATE-BASED | |
| pdWav | FLOW STATE-BASED | |
| pdAiff | FLOW STATE-BASED | |

Embodiments of the present invention automatically generate flow signatures with the necessary recognition patterns and state transition climb procedure. Such comes from analyzing packets according to parsing rules, and also generating state transitions to search for. Applications and protocols, at any level, are recognized through state analysis of sequences of packets.

Note that one in the art will understand that computer networks are used to connect many different types of devices, including network appliances such as telephones, "Internet" radios, pagers, and so forth. The term computer as used herein encompasses all such devices and a computer network as used herein includes networks of such computers.

Although the present invention has been described in terms of the presently preferred embodiments, it is to be understood that the disclosure is not to be interpreted as limiting. Various alterations and modifications will no doubt become apparent to those or ordinary skill in the art after having read the above disclosure. Accordingly, it is intended that the claims be interpreted as covering all alterations and modifications as fall within the true spirit and scope of the present invention.

APPENDIX: SOME PDL FILES

The following pages include some PDL files as examples. Included herein are the PDL contents of the following files. A reference to PDL is also included herein. Note that any contents on any line following two hyphen (--) are ignored by the compiler. That is, they are comments.

common.pdl;
flows.pdl;
virtual.pdl;
ethernet.pdl;
IEEE8032.pdl and IEEE8033.pdl (ethertype files);
IP.pdl;
TCP.pdl and UDP.pdl;
RPC.pdl;
NFS.pdl; and
HTTP.pdl.

```
--------------------------------------------------------------------------
--
--    Common.pdl - Common protocol definitions
--
--    Description:
--        This file contains some field definitions for commonly used fields
--        in various network protocols.
--
--    Copyright:
--        Copyright (c) 1996–1999 Apptitude, Inc.
--            (formerly Technically Elite, Inc.)
--        All rights reserved.
--
--    RCS:
--        $Id: Common.pdl,v 1.7 1999/04/13 15:47:56 skip Exp $
--------------------------------------------------------------------------
        Int4      FIELD
                    SYNTAX INT(4)
        Int8      FIELD
                    SYNTAX INT(8)
        Int16     FIELD
                    SYNTAX INT(16)
        Int24     FIELD
                    SYNTAX INT(24)
        Int32     FIELD
                    SYNTAX INT(32)
        Int64     FIELD
                    SYNTAX INT(64)
        UInt8     FIELD
                    SYNTAX UNSIGNED INT(8)
        UInt16    FIELD
                    SYNTAX UNSIGNED INT(16)
        UInt24    FIELD
                    SYNTAX UNSIGNED INT(24)
        UInt32    FIELD
```

-continued

```
              SYNTAX UNSIGNED INT(32)
UInt64   FIELD
              SYNTAX UNSIGNED INT(64)
SInt16   FIELD
              SYNTAX INT(16)
              FLAGS SWAPPED
SUInt16     FIELD
              SYNTAX UNSIGNED INT(16)
              FLAGS SWAPPED
SInt32   FIELD
              SYNTAX INT(32)
              FLAGS SWAPPED
ByteStr1      FIELD
              SYNTAX BYTESTRING(1)
ByteStr2      FIELD
              SYNTAX BYTESTRING(2)
ByteStr4      FIELD
              SYNTAX BYTESTRING(4)
Pad1          FIELD
              SYNTAX BYTESTRING(1)
              FLAGS NOSHOW
Pad2          FIELD
              SYNTAX BYTESTRING(2)
              FLAGS NOSHOW
Pad3          FIELD
              SYNTAX BYTESTRING(3)
              FLAGS NOSHOW
Pad4          FIELD
              SYNTAX BYTESTRING(4)
              FLAGS NOSHOW
Pad5          FIELD
              SYNTAX BYTESTRING(5)
              FLAGS NOSHOW
macAddress    FIELD
    SYNTAX        BYTESTRING(6)
    DISPLAY-HINT  "1x:"
    LOOKUP        MACADDRESS
    DESCRIPTION
        "MAC layer physical address"
ipAddress     FIELD
    SYNTAX        BYTESTRING(4)
    DISPLAY-HINT  "1d."
    LOOKUP        HOSTNAME
    DESCRIPTION
        "IP address"
ipv6Address   FIELD
    SYNTAX        BYTESTRING(16)
    DISPLAY-HINT  "1d."
    DESCRIPTION
        "IPV6 address"
-------------------------------------------------------------------------
--
--   Flows.pdl - General FLOW definitions
--
--   Description:
--     This file contains general flow definitions.
--
--   Copyright:
--     Copyright (c) 1998–1999 Apptitude, Inc.
--       (fomerly Technically Elite, Inc.)
--     All rights reserved.
--
--   RCS:
--     $Id: Flows.pdl,v 1.12 1999/04/13 15:47:57 skip Exp $
--
-------------------------------------------------------------------------
chaosnet    FLOW
spanningTree FLOW
sna         FLOW
oracleTNS FLOW
            PAYLOAD { INCLUDE-HEADER, LENGTH=256 }
ciscoOUI FLOW
-------------------------------------------------------------------------
--   IP Protocols
-------------------------------------------------------------------------
igmp        FLOW
GGP         FLOW
ST          FLOW
UCL         FLOW
```

-continued

```
egp        FLOW
igp        FLOW
BBN-RCC-MON FLOW
NVP2       FLOW
PUP        FLOW
ARGUS      FLOW
EMCON      FLOW
XNET       FLOW
MUX        FLOW
DCN-MEAS   FLOW
HMP        FLOW
PRM        FLOW
TRUNK1     FLOW
TRUNK2     FLOW
LEAF1      FLOW
LEAF2      FLOW
RDP        FLOW
IRTP       FLOW
ISO-TP4        FLOW
NETBLT     FLOW
MFE-NSP       FLOW
MERIT-INP     FLOW
SEP        FLOW
PC3        FLOW
IDPR       FLOW
XTP        FLOW
DDP        FLOW
IDPR-CMTP     FLOW
TPPlus     FLOW
IL         FLOW
SIP        FLOW
SDRP       FLOW
SIP-SR     FLOW
SIP-FRAG    FLOW
IDRP       FLOW
RSVP       FLOW
MHRP       FLOW
BNA        FLOW
SIPP-ESP      FLOW
SIPP-AH        FLOW
INLSP      FLOW
SWIPE      FLOW
NHRP       FLOW
CFTP       FLOW
SAT-EXPAK     FLOW
KRYPTOLAN  FLOW
RVD        FLOW
IPPC       FLOW
SAT-MON       FLOW
VISA       FLOW
IPCV       FLOW
CPNX       FLOW
CPHB       FLOW
WSN        FLOW
PVP        FLOW
BR-SAT-MON FLOW
SUN-ND     FLOW
WB-MON     FLOW
WB-EXPAK   FLOW
ISO-IP     FLOW
VMTP       FLOW
SECURE-VMTP FLOW
TTP        FLOW
NSFNET-IGP     FLOW
DGP        FLOW
TCF        FLOW
IGRP       FLOW
OSPFIGP         FLOW
Sprite-RPC      FLOW
LARP       FLOW
MTP        FLOW
AX25       FLOW
IPIP       FLOW
MICP       FLOW
SCC-SP     FLOW
ETHERIP       FLOW
encap      FLOW
GMTP       FLOW
```

-continued

```
--  UDP Protocols
compressnet  FLOW
rje          FLOW
echo         FLOW
discard      FLOW
systat       FLOW
daytime      FLOW
qotd         FLOW
msp          FLOW
chargen      FLOW
biff         FLOW
who          FLOW
syslog       FLOW
loadav       FLOW
notify       FLOW
acmaint_dbd  FLOW
acmaint_transd   FLOW
puparp       FLOW
applix       FLOW
ock          FLOW
------------------------------------------------------------------------
--  TCP Protocols
------------------------------------------------------------------------
tcpmux       FLOW
telnet       FLOW
             CONNECTION { INHERITED }
privMail     FLOW
nsw-fe       FLOW
msg-icp      FLOW
msg-auth     FLOW
dsp          FLOW
privPrint    FLOW
time         FLOW
rap          FLOW
rip          FLOW
graphics     FLOW
nameserver   FLOW
nicname      FLOW
mpm-flags    FLOW
mpm          FLOW
mpm-snd      FLOW
ni-ftp       FLOW
auditd       FLOW
finger       FLOW
re-mail-ck   FLOW
la-maint     FLOW
xns-time     FLOW
xns-ch       FLOW
isi-gl       FLOW
xns-auth     FLOW
privTerm     FLOW
xns-mail     FLOW
privFile     FLOW
ni-mail      FLOW
acas         FLOW
covia        FLOW
tacacs-ds    FLOW
sqlnet       FLOW
gopher       FLOW
netrjs-1     FLOW
netrjs-2     FLOW
netrjs-3     FLOW
netrjs-4     FLOW
privDial     FLOW
deos         FLOW
privRJE      FLOW
vettcp       FLOW
hosts2-ns    FLOW
xfer         FLOW
ctf          FLOW
mit-ml-dev   FLOW
mfcobol      FLOW
kerberos     FLOW
su-mit-tg    FLOW
dnsix        FLOW
mit-dov      FLOW
npp          FLOW
dcp          FLOW
objcall      FLOW
```

-continued

```
supdup       FLOW
dixie        FLOW
swift-rvf        FLOW
tacnews      FLOW
metagram     FLOW
newacct      FLOW
hostname     FLOW
iso-tsap     FLOW
gppitnp      FLOW
csnet-ns     FLOW
threeCom-tsmux   FLOW
rtelnet      FLOW
snagas       FLOW
mcidas       FLOW
auth         FLOW
audionews    FLOW
sftp         FLOW
ansanotify   FLOW
uucp-path    FLOW
sqlserv      FLOW
cfdptkt      FLOW
erpc         FLOW
smakynet     FLOW
ntp          FLOW
ansatrader   FLOW
locus-map    FLOW
unitary      FLOW
locus-con    FLOW
gss-xlicen   FLOW
pwdgen       FLOW
cisco-fna    FLOW
cisco-tna    FLOW
cisco-sys    FLOW
statsrv      FLOW
ingres-net   FLOW
loc-srv      FLOW
profile      FLOW
emfis-data   FLOW
emfis-cntl   FLOW
bl-idm       FLOW
imap2        FLOW
news         FLOW
uaac         FLOW
iso-tp0          FLOW
iso-ip       FLOW
cronus       FLOW
aed-512          FLOW
sql-net          FLOW
hems         FLOW
bftp         FLOW
sgmp         FLOW
netsc-prod   FLOW
netsc-dev    FLOW
sqlsrv       FLOW
knet-cmp     FLOW
pcmail-srv   FLOW
nss-routing  FLOW
sgmp-traps   FLOW
cmip-man     FLOW
cmip-agent   FLOW
xns-courier  FLOW
s-net        FLOW
namp         FLOW
rsvd         FLOW
send         FLOW
print-srv    FLOW
multiplex    FLOW
cl-1         FLOW
xyplex-mux   FLOW
mailq        FLOW
vmnet        FLOW
genrad-mux   FLOW
xdmcp        FLOW
nextstep         FLOW
bgp          FLOW
ris          FLOW
unify        FLOW
audit        FLOW
ocbinder         FLOW
```

-continued

```
ocserver       FLOW
remote-kis     FLOW
kis       FLOW
aci       FLOW
mumps     FLOW
qft       FLOW
gacp      FLOW
prospero       FLOW
osu-nms        FLOW
srmp      FLOW
irc       FLOW
dn6-nlm-aud    FLOW
dn6-smm-red    FLOW
dls       FLOW
dls-mon        FLOW
smux      FLOW
src       FLOW
at-rtmp        FLOW
at-nbp    FLOW
at-3      FLOW
at-echo        FLOW
at-5      FLOW
at-zis    FLOW
at-7      FLOW
at-8      FLOW
tam       FLOW
z39-50    FLOW
anet      FLOW
vmpwscs        FLOW
softpc    FLOW
atls      FLOW
dbase     FLOW
mpp       FLOW
uarps     FLOW
imap3     FLOW
fln-spx        FLOW
rsh-spx        FLOW
cdc       FLOW
sur-meas       FLOW
link      FLOW
dsp3270        FLOW
pdap      FLOW
pawserv        FLOW
zserv     FLOW
fatserv        FLOW
csi-sgwp       FLOW
clearcase      FLOW
ulistserv      FLOW
legent-1       FLOW
legent-2       FLOW
hassle    FLOW
nip       FLOW
tnETOS    FLOW
dsETOS    FLOW
is99c     FLOW
is99s     FLOW
hp-collector   FLOW
hp-managed-node     FLOW
hp-alarm-mgr   FLOW
arns      FLOW
ibm-app        FLOW
asa       FLOW
aurp      FLOW
unidata-ldm    FLOW
ldap      FLOW
uis       FLOW
synotics-relay      FLOW
synotics-broker     FLOW
dis       FLOW
embl-ndt       FLOW
netcp     FLOW
netware-ip     FLOW
mptn      FLOW
kryptolan      FLOW
work-sol       FLOW
ups       FLOW
genie     FLOW
decap     FLOW
nced      FLOW
```

-continued

```
ncld            FLOW
imsp            FLOW
timbuktu        FLOW
prm-sm          FLOW
prm-nm          FLOW
decladebug      FLOW
rmt             FLOW
synoptics-trap          FLOW
smsp            FLOW
infoseek        FLOW
bnet            FLOW
silverplatter   FLOW
onmux           FLOW
hyper-g         FLOW
ariel1          FLOW
smpte           FLOW
ariel2          FLOW
ariel3          FLOW
opc-job-start   FLOW
opc-job-track   FLOW
icad-el         FLOW
smartsdp        FLOW
svrloc          FLOW
ocs_cmu         FLOW
ocs_amu         FLOW
utmpsd          FLOW
utmpcd          FLOW
iasd            FLOW
nnsp            FLOW
mobileip-agent          FLOW
mobilip-mn      FLOW
dna-cml         FLOW
comscm          FLOW
dsfgw           FLOW
dasp            FLOW
sgcp            FLOW
decvms-sysmgt   FLOW
cvc_hostd       FLOW
https           FLOW
                CONNECTION { INHERITED }
snpp            FLOW
microsoft-ds    FLOW
ddm-rdb         FLOW
ddm-dfm         FLOW
ddm-byte        FLOW
as-servermap    FLOW
tserver         FLOW
exec            FLOW
                CONNECTION { INHERITED }
login           FLOW
                CONNECTION { INHERITED }
cmd             FLOW
                CONNECTION { INHERITED }
printer         FLOW
                CONNECTION { INHERITED }
talk            FLOW
                CONNECTION { INHERITED }
ntalk           FLOW
                CONNECTION { INHERITED }
utime           FLOW
efs             FLOW
timed           FLOW
tempo           FLOW
courier         FLOW
conference      FLOW
netnews         FLOW
netwall         FLOW
apertus-ldp     FLOW
uucp            FLOW
uucp-rlogin     FLOW
klogin          FLOW
kshell          FLOW
new-rwho        FLOW
dsf             FLOW
remotefs        FLOW
rmonitor        FLOW
monitor         FLOW
chshell         FLOW
p9fs            FLOW
```

-continued

```
whoami       FLOW
meter        FLOW
ipcserver          FLOW
urm          FLOW
nqs          FLOW
sift-uft           FLOW
npmp-trap    FLOW
npmp-local   FLOW
npmp-gui     FLOW
ginad        FLOW
doom         FLOW
mdqs         FLOW
elcsd        FLOW
entrustmanager     FLOW
netviewdm1   FLOW
netviewdm2   FLOW
netviewdm3   FLOW
netgw        FLOW
netrcs       FLOW
flexlm       FLOW
fujitsu-dev  FLOW
ris-cm       FLOW
kerberos-adm FLOW
rfile        FLOW
pump         FLOW
qrh          FLOW
rrh          FLOW
tell         FLOW
nlogin       FLOW
con          FLOW
ns           FLOW
rxe          FLOW
quotad       FLOW
cycleserv          FLOW
omserv       FLOW
webster            FLOW
phonebook    FLOW
vid          FLOW
cadlock            FLOW
rtip         FLOW
cycleserv2   FLOW
submit       FLOW
rpasswd            FLOW
entomb       FLOW
wpages       FLOW
wpgs         FLOW
concert            FLOW
mdbs_daemon  FLOW
device       FLOW
xtreelic           FLOW
maitrd       FLOW
busboy       FLOW
garcon       FLOW
puprouter    FLOW
socks        FLOW
```

--------------------------------------------------------------
--
--   Virtual.pdl - Virtual Layer definition
--
--   Description:
--     This file contains the definition for the VirtualBase layer used
--     by the embodiment.
--   Copyright:
--     Copyright (c) 1998–1999 Apptitude,
--       (formerly Technically Elite, Inc.)
--     All rights reserved.
--
--   RCS:
--     $Id: Virtual.pdl,v 1.13 1999/04/13 15:48:03 skip Exp $
--------------------------------------------------------------
--   This includes two things: the flow signature (called FLOWKEY) that the
--   system that is going to use.
--
--   note that not all elements are in the HASH. Reason is that these non-HASHED
--   elements may be varied without the HASH changing, which allows the system
--   to look up multiple buckets with a single HASH. That is, the MeyMatchFlag,
--   StateStatus Flag and MulipacketID may be varied.
--
FLOWKEY {

```
    KeyMatchFlags,  -- to tell the system which of the in-HASH elements have to
-- match for the this particular flow record.
                        -- Flows for which complete signatures may not yet have
                        -- been generated may then be stored in the system
--
StateStatusFlags,
        GroupId1            IN-HASH,  -- user defined
        GroupId2            IN-HASH,  -- user defined
        DLCProtocol         IN-HASH, ,  -- data link protocol - lowest level we
                                        -- evaluate. It is the type for the
-- Ethernet V 2
        NetworkProtocol     IN-HASH,   -- IP, etc.
        TunnelProtocol      IN-HASH,   -- IP over IPx, etc.
        TunnelTransport     IN-HASH,
        TransportProtocol   IN-HASH,
        ApplicationProtocol IN-HASH,
        DLCAddresses(8)     IN-HASH,  -- lowest level address
        NetworkAddresses(16) IN-HASH,
        TunnelAddresses(16) IN-HASH,
        ConnectionIds       IN-HASH,
        MultiPacketId                  -- used for fragmentaion purposes
}
--  now define all of the children. In this example, only one virtual
--  child - Ethernet.
virtualChildren    FIELD
            SYNTAX INT(*) { ethernet(1) }
--  now define the base for the children. In this case, it is the same as
--  for the overall system. There may be multiples.
VirtualBase    PROTOCOL
::= { VirtualChildren=virtualChildren }
--
--  The following is the header that every packet has to have and
--  that is placed into the system by the packet acquisition system.
--
VirtualBase    FLOW
            HEADER { LENGTH=8 }
            CHILDREN { DESTINATION=VirtualChildren } -- this will be
--  Ethernet for this example.
--
--  the VirtualBAse will be 01 for these packets.
------------------------------------------------------------------------
--
--  Ethernet.pdl - Ethernet frame definition
--
--  Description:
--     This file contains the definition for the Ethernet frame. In this
--     PDL file, the decision on EtherType vs. IEEE is made. If this is
--     EtherType, the selection is made from this file. It would be possible
--     to move the EtherType selection to another file, if that would assist
--     in the modularity.
--
--  Copyright:
--     Copyright (c) 1994-1998 Apptitude, Inc.
--        (formerly Technically Elite, Inc.)
--     All rights reserved.
--
--  RCS:
--     $Id: Ethernet.pdl,v 1.13 1999/01/26 15:15:57 skip Exp $
------------------------------------------------------------------------
--
--  Enumerated type of a 16 bit integer that contains all of the
--  possible values of interest in the etherType field of an
--  Ethernet V2 packet.
--
etherType    FIELD
            SYNTAX        INT(16) { xns(0x0600), ip(0x0800),
                          chaosnet(0x0804), arp(0x0806),
                          vines(0xbad),
                          vinesLoop(0x0bae), vinesLoop(0x80c4),
                          vinesEcho(0xbaf), vinesEcho(0x80c5),
                          netbios(0x3c00, netbios(0x3c01),
                          netbios(0x3c02), netbios(0x3c03),
                          netbios(0x3c04), netbios(0x3c05),
                          netbios(0x3c06), netbios(0x3c07)
                          netbios(0x3c08), netbios(0x3c09)
                          netbios(0x3c0a), netbios(0x3c0b),
                          netbios(0x3c0c), netbios(0x3c0d)
                          dec(0x6000), mop(0x6001), mop2(0x6002)
                          drp(0x6003), lat(0x6004), decDiag(0x6005),
```

-continued

```
                                    lavc(0x6007), rarp(0x8035), appleTalk(0x809b),
                                    sna(0x80d5), aarp(0x80f3), ipx(0x8137)
                                    snmp(0x814c), ipv6(0x86dd), loopback(0x9000) }
                DISPLAY-HINT    "1x:"
                LOOKUP          FILE "EtherType.cf"
                DESCRIPTION
                        "Ethernet type field"

--  The unformatted data field in and Ethernet V2 type frame
--
etherData   FIELD
                SYNTAX          BYTESTRING(46..1500)
                ENCAP           etherType
                DISPLAY-HINT    "HexDump"
                DESCRIPTION
                        "Ethernet data"

--  The layout and structure of an Ethernet V2 type frame with
--  the address and protocol fields in the correct offset position
ethernet    PROTOCOL
                DESCRIPTION
                        "Protocol format for an Ethernet frame"
                REFERENCE       "RFC 894"
    ::= { MacDest=macAddress, MacSrc=macAddress, EtherType=etherType,
    Data=etherData )
--
--  The elements from this Ethernet frame used to build a flow key
--  to classify and track the traffic. Notice that the total length
--  of the header for this tyoe of packet is fixed and at 14 bytes or
--  octets in length. The special field, LLC-CHECK, is specific to
--  Ethernet frames for the decoding of the base Ethernet type value.
--  If it is NOT LLC, the protocol field in the flow is set to the
--  EtherType value decoded from the packet.
--
ethernet    FLOW
                HEADER { LENGTH=14 }
                DLC-LAYER {
                    SOURCE=MacSrc,
                    DESTINATION=MacDest,
                    TUNNELING,
                    PROTOCOL
                }
                CHILDREN { DESTINATION=EtherType, LLC-CHECK=11c }
------------------------------------------------------------------------
--
--  IEEE8022.pdl - IEEE 802.2 frame definitions
--
--  Description:
--      This file contains the definition for the IEEE 802.2 Link Layer
--      protocols including the SNAP (Sub-network Access Protocol).
--
--  Copyright:
--      Copyright (c) 1994–1998 Apptitude, Inc.
--        (formerly Technically Elite, Inc.)
--      All rights reserved.
--
--  RCS:
--      $Id: IEEE8022.pdi,v i.18 1999/01/26 15:15:58 skip Exp $
------------------------------------------------------------------------
--
--  IEEE 802.2 LLC
--
11cSap   FIELD
            SYNTAX          INT(16) { ipx(0xFFFF), ipx(0xE0E0), isoNet(0xFEFE),
                                netbios(0xF0F0), vsnap(0XAAAA), ip(0x0606),
                                vines(0xBCBC), xns(0x8080), spanningTree(0x4242),
                                sna(0x0c0c), sna(0x0808), sna(0x0404) }
            DISPLAY-HINT    "ix:"
            DESCRIPTION
                    "Service Access Point"
11cControl  FIELD
            -- This is a special field. When the decoder encounters this field, it
            -- invokes the hard-coded LLC decoder to decode the rest of the packet.
            -- This is necessary because LLC decoding requires the ability to
            -- handle forward references which the current PDL format does not
            -- support at this time.
            SYNTAX          UNSIGNED INT(8)
            DESCRIPTION
                    "Control field"
```

-continued

```
llcPduType      FIELD
        SYNTAX  BITSTRING(2) { llcInformation(0), llcSupervisory(1),
                llcInformation(2), llcUnnumbererd(3) }
llcData         FIELD
        SYNTAX          BYTESTRING(38..1492)
        ENCAP           llcPduType
        FLAGS           SAMELAYER
        DISPLAY-HINT    "HexDump"
llc     PROTOCOL
        SUMMARIZE
                "$llcPduType == llcUnnumbered" :
                        "LLC ($SAP) $Modifier"
                "$llcPduType == llcSupervisory" :
                        "LLC ($SAP) $Function N(R)=$NR"
                "$llcPduType == 0|2" :
                        "LLC ($SAP) N(R)=$NR N(S)=$NS"
                "Default"
                        "LLC ($SAP) llcPduType"
        DESCRIPTION
                "IEEE 802.2 LLC frame format"
::= { SAP=llcSap, Control=llcControl, Data=llcData }
llc     FLOW
        HEADER { LENGTH=3 }
        DLC-LAYER { PROTOCOL }
        CHILDREN { DESTINATION=SAP }
llcUnnumberedData FIELD
        SYNTAX          BYTESTRING(0..1500)
        ENCAP           llcSap
        DISPLAY-HINT    "HexDump"
llcUnnumbered PROTOCOL
        SUMMARIZE
                "Default" :
                        "LLC ($SAP) $Modifier"
::= { Data=llcUnnumberedData }
llcSupervisoryData      FIELD
        SYNTAX          BYTESTRING(0..1500)
        DISPLAY-HINT    "HexDump"
llcSupervisory          PROTOCOL
        SUMMARIZE
                "Default" :
                        "LLC ($SAP) $Function N(R)=$NR"
::= { Data=llcSupervisoryData }
llcInformationData      FIELD
        SYNTAX          BYTESTRING(0..1500)
        ENCAP           llcSap
        DISPLAY-HINT    "HexDump"
llcInformation          PROTOCOL
        SUMMARIZE
                "Default" :
                        "LLC ($SAP) N(R)=$NR N(S)=$NS"
::= { Data=llcInformationData }
--
--      SNAP
--
snapOrgCode     FIELD
        SYNTAX          BYTESTRING(3) { snap("00:00:00"), ciscoOUI("00:00:0C"),
                        appleOUI("08:00:07") }
        DESCRIPTION
                "Protocol ID or Organizational Code"
vsnapData       FIELD
        SYNTAX          BYTESTRING(46..1500)
        ENCAP           snapOrgCode
        FLAGS           SAMELAYER
        DISPLAY-HINT    "HexDump"
        DESCRIPTION
                "SNAP LLC data"
vsnap   PROTOCOL
        DESCRIPTION
                "SNAP LLC Frame"
::= { OrgCode=snapOrgCode, Data=vsnapData }
vsnap   FLOW
        HEADER { LENGTH=3 }
        DLC-LAYER { PROTOCOL }
        CHILDREN { DESTINATION=OrgCode }
snapType        FIELD
        SYNTAX  INT(16) { xns(0x0600), ip(0x0800), arp(0x0806)
                        vines (0xbad),
                        mop(0x6001), mop2(0x6002), drp(0x6003),
                        lat(0x6004), decDiag(0x6005), lavc(0x6007)
```

```
                       rarp(0x8035), appleTalk(0x809B), sna(0x80d5),
                       aarp(0x80F3), ipx(0x8137), snmp(0x814c), ipv6(0x86dd) }
              DISPLAY-HINT    "1x:"
              LOOKUP          FILE "EtherType.cf"
              DESCRIPTION
                 "SNAP type field"
snapData         FIELD
       SYNTAX          BYTESTRING(46..1500)
       ENCAP           snapType
       DISPLAY-HINT    "HexDump"
       DESCRIPTION
              "SNAP data"
snap   PROTOCOL
       SUMMARIZE
              "$OrgCode == 00:00:00"
                 "SNAP Type=$SnapType"
              "Default"
                 "VSNAP Org=$OrgCode Type=$SnapType"
       DESCRIPTION
              "SNAP Frame"
::={ SnapType=snapType, Data=snapData }
snap       FLOW
       HEADER { LENGTH=2 }
       DLC-LAYER { PROTOCOL }
       CHILDREN { DESTINATION=SnapType }
-------------------------------------------------------------------------
--
--   IEEE8023.pdl - IEEE 802.3 frame definitions
--   Description:
--     This file contains the definition for the IEEE 802.3 (Ethernet)
--     protocols.
--
--   Copyright:
--     Copyright (c) 1994–1998 Apptitude, Inc.
--       (formerly Technically Elite, Inc.)
--     All rights reserved.
--
--   RCS:
--     $Id: IEEE8023.pdl,v 1.7 1999/01/26 15:15:58 skip Exp $
--
-------------------------------------------------------------------------
--
--   IEEE 802.3
--
ieee8023Length            FIELD
       SYNTAX UNSIGNED INT(16)
ieee8023Data     FIELD
       SYNTAX          BYTESTRING(38..1492)
       ENCAP           =11c
       LENGTH          "$ieee8023Length"
       DISPLAY-HINT    "HexDump"
ieee8023        PROTOCOL
       DESCRIPTION
              "IEEE 802.3 (Ethernet) frame"
       REFERENCE       "RFC 1042"
::= { MacDest=macAddress, Mac:Src=macAddress, Length=ieee8023Length,
       Data=ieee8023Data }
-------------------------------------------------------------------------
--
--   IP.pdl - Internet Protocol (IP) definitions
--
--   Description:
--      This file contains the packet definitions for the Internet
--      Protocol. These elements are all of the fields, templates and
--   processes required to recognize, decode and classify IP datagrams
--   found within packets.
--
--   Copyright:
--      Copyright (c) 1994–1998 Apptitude, Inc.
--        (formerly Technically Elite, Inc.)
--      All rights reserved.
--
--   RCS:
--      $Id: IP.pdl,v 1.14 1999/01/26 15:15:58 skip Exp $
--
-------------------------------------------------------------------------
--
--   The following are the fields that make up an IP datagram.
--   Some of these fields are used to recognize datagram elements, build
```

-continued

```
--  flow signatures and determine the next layer in the decode process.
--
ipVersion       FIELD
                SYNTAX INT(4)
                DEFAULT     "4"
ipHeaderLength  FIELD
                SYNTAX INT(4)
ipTypeOfService FIELD
                SYNTAXBITSTRING(8) { minCost(1), maxReliability(2),
                        maxThruput(3), minDelay(4) }
ipLength        FIELD
                SYNTAX UNSIGNED INT(16)
--
--  This field will tell us if we need to do special processing to support
--  the payload of the datagram existing in multiple packets.
--
ipFlags            FIELD
                SYNTAX BITSTRING(3) { moreFrags(0), dontFrag(1) }
ipFragmentOffset FIELD
                SYNTAX INT(13)
--
--  This field is used to determine the children or next layer of the
--  datagram.
--
ipProtocol      FIELD
                SYNTAX INT(8)
                LOOKUP FILE "IpProtocol.cf"
ipData          FIELD
                SYNTAX          BYTESTRING(0..1500)
                ENCAP           ipProtocol
                DISPLAY-HINT    "HexDump"
--
--  Detailed packet layout for the IP datagram. This includes all fields
--  and format. All offsets are relative to the beginning of the header.
ip   PROTOCOL
        SUMMARIZE
            "$FragmentOffset != 0":
                "IPFragment ID=$Identification Offset=$FragmentOffset"
            "Default" :
                "IP Protocol=$Protocol"
        DESCRIPTION
            "Protocol format for the Internet Protocol"
        REFERENCE       "RFC 791"
::= {   Version=ipVersion, HeaderLength=ipHeaderLength,
        TypeOfService=ipTypeOfService, Length=ipLength,
        Identification=UInt16, IpFlags=ipFlags,
        FragmentOffset=ipFragmentOffset, TimeToLive=Int8,
        Protocol=ipProtocol, Checksum=ByteStr2,
        IpSrc=ipAddress, IpDest=ipAddress, Options=ipOptions,
        Fragment=ipFragment, Data=ipData }
--
--  This is the description of the signature elements required to build a flow
--  that includes the IP network layer protocol. Notice that the flow builds on
--  the lower layers. Only the fields required to complete IP are included.
--  This flow requires the support of the fragmentation engine as well as the
--  potential of having a tunnel. The child field is found from the IP
--  protocol field
--
ip      FLOW
        HEADER { LENGTH=HeaderLength, IN-WORDS }
        NET-LAYER {
          SOURCE=IpSrc,
          DESTINATION=IpDest,
          FRAGMENTATION=IPV4,
          TUNNELING
        }
        CHILDREN { DESTINATION=Protocol }
ipFragData      FIELD
                SYNTAX          BYTESTRING(1..1500)
                LENGTH          "$ipLength - $ipHeaderLength * 4"
                DISPLAY-HINT    "HexDump"
ipFragment      Group
                OPTIONAL        "$FragmentOffset != 0"
::= { Data=ipFragData }
ipOptionCode    FIELD
                SYNTAXINT(8) { ipRR(0x07), ipTimestamp(0x44),
                        ipLSRR(0x83), ipSSRR(0x89) }
                DESCRIPTION
                    "IP option code"
```

-continued

```
ipOptionLength   FIELD
                 SYNTAX UNSIGNED INT(8)
                 DESCRIPTION
                     "Length of IP option"
ipOptionData     FIELD
                 SYNTAX        BYTESTRING(0..1500)
                 ENCAP         ipOptionCode
                 DISPLAY-HINT  "HexDump"
ipOptions        GROUP
                 LENGTH        "($ipHeaderLength * 4) - 20"
::= {    Code=ipOptionCode, Length=ipOptionLength, Pointer=UInt8,
         Data=ipOptionData }
--------------------------------------------------------------------------
--
--   TCP.pdl - Transmission Control Protocol (TCP) definitions
--   Description:
--      This file contains the packet definitions for the Transmission
--      Control Protocol. This protocol is a transport service for
--   the IP protocol. In addition to extracting the protocol information
--   the TCP protocol assists in the process of identification of connections
--   for the processing of states.
--
--   Copyright:
--      Copyright (c) 1994-1998 Apptitude, Inc.
--         (formerly Technically Elite, Inc.)
--      All rights reserved.
--   RCS:
--      $Id: TCP.pdl,v 1.9 1999/01/26 15:16:02 skip Exp $
--
--------------------------------------------------------------------------
--
--   This is the 16 bit field where the child protocol is located for
--   the next layer beyond TCP.
--
tcpPort FIELD
     SYNTAX UNSIGNED INT(16)
     LOOKUP FILE "TcpPort.cf"
tcpHeaderLen FIELD
     SYNTAX INT(4)
tcpFlags FIELD
     SYNTAXBITSTRING(12) { fin(0), syn(1), rst(2), psh(3), ack(4), urg(5) }
tcpData FIELD
         SYNTAX        BYTESTRING(0..1564)
         LENGTH        "($ipLength - ($ipHeaderLength * 4)) - ($tcpHeaderLen * 4)"
         ENCAP         tcpPort
         DISPLAY-HINT  "HexDump"
--
--   The layout of the TCP datagram found in a packet. Offset based on the
--   beginning of the header for TCP.
tcp PROTOCOL
         SUMMARIZE
             "Default" :
                 "TCP ACK=$Ack WIN=$WindowSize"
         DESCRIPTION
             "Protocol format for the Transmission Control Protocol"
         REFERENCE   "RFC 793"
::= {    Srcport=tcpPort, DestPort=tcpPort, SequenceNum=UInt32,
         Ack=UInt32, HeaderLength=tcpHeaderLen, TcpFlags=tcpFlags,
         WindowSize=UInt16, Checksum=ByteStr2,
         UrgentPointer=UInt16, Options=tcpOptions, Data=tcpData }
--
--   The flow elements required to build a key for a TCP datagram.
--   Noticed that this FLOW description has a CONNECTION section. This is
--   used to describe what connection state is reached for each setting
--   of the TcpFlags field.
--
tcp       FLOW
         HEADER { LENGTH=HeaderLength, IN-WORDS }
         CONNECTION {
             IDENTIFIER=SequenceNum,
             CONNECT-START="TcpFlags:1",
             CONNECT-COMPLETE="TcpFlags:4",
             DISCONNECT-START="TcpFlags:0",
             DISCONNECT-COMPLETE="TcpFlags:4"
         }
         PAYLOAD { INCLUDE-HEADER }
         CHILDREN { DESTINATION=DestPort, SOURCE=SrcPort }
tcpOptionKind   FIELD
                SYNTAX UNSIGNED INT(8) { tcpOptEnd(0), tcpNop(1), tcpMSS(2),
```

```
                                tcpWscale(3), tcpTimestamp(4) }
                DESCRIPTION
                    "Type of TCP option"
tcpOptionData   FIELD
                SYNTAX          BYTESTRING(0..1500)
                ENCAP           tcpOptionKind
                FLAGS           SAMELAYER
                DISPLAY-HINT    "HexDump"
tcpOptions      GROUP
                LENGTH          "($tcpHeaderLen * 4) - 20"
--              SUMMARIZE
--                  "Default" :
--                      "Option=$Option, Len=$OptionLength, $OptionData"
::= { Option=tcpOptionKind, optionLength=UInt8, OptionData=tcpOptionData }
tcpMSS          PROTCCOL
::= { MaxSegmentSize=UInt16 }
-------------------------------------------------------------------------
--
--   UDP.pdl - User Datagram Protocol (UDP) definitions
--
--   Description:
--     This file contains the packet definitions for the User Datagram
--     Protocol.
--
--   Copyright:
--     Copyright (c) 1994-1998 Apptitude, Inc.
--       (formerly Technically Elite, Inc.)
--     All rights reserved.
--
--   RCS:
--     $Id: UDP.pdl,v 1.9 1999/01/26 15:16:02 skip Exp $
--
-------------------------------------------------------------------------
udpPort     FIELD
        SYNTAX UNSIGNED INT(16)
        LOOKUPFILE "Udpport.cf"
udpLength FIELD
        SYNTAX          UNSIGNED INT(16)
udpData FIELD
        SYNTAX          BYTESTRING(0..1500)
        ENCAP           udpPort
        DISPLAY-HINT    "HexDump"
udp     PROTOCOL
        SUMARIZE
            "Default" :
                "UDP Dest=$DestPort Src=$SrcPort"
        DESCRIPTION
            "Protocol format for the User Datagram Protocol."
        REFERENCE       "RFC 768"
::= {   SrcPort=udpPort, DestPort=udpPort, Length=udpLength,
        Checksum=ByteStr2, Data=udpData }
udp     FLOW
        HEADER { LENGTH=8 }
        CHILDREN { DESTINATION=DestPort, SOURCE=Srcport }
-------------------------------------------------------------------------
--
--   RPC.pdl - Remote Procedure Calls (RPC) definitions
--
--   Description:
--     This file contains the packet definitions for Remote Procedure
--     Calls.
--
--   Copyright:
--     Copyright (c) 1994-1999 Apptitude,
--       (formerly Technically Elite, Inc.)
--     All rights reserved.
--   RCS:
--     $Id: RPC.pdl,v 1.7 1999/01/26 15:16:01 skip Exp $
-------------------------------------------------------------------------
rpcType     FIELD
        SYNTAX UNSIGNED INT(32) { rpcCall(0), rpcReply(1) }
rpcData     FIELD
        SYNTAX          BYTESTRING(0..100)
        ENCAP           rpcType
        FLAGS           SAMELAYER
        DISPLAY-HINT    "HexDump"
rpc     PROTOCOL
        SUMMARIZE
            "$Type == rpcCall"
```

```
            "RPC $Program"
         "$ReplyStatus == rpcAcceptedReply" :
            "RPC Reply Status=$Status"
         "$ReplyStatus == rpcDeniedReply"
            "RPC Reply Status=$:Status, AuthStatus=$AuthStatus"
         "Default"
            "RPC $Program"
      DESCRIPTION
         "Protocol format for RPC"
      REFERENCE
         "RFC 1057"
::= {  XID=UInt32, Type=rpcType, Data=rpcData }
rpc   FLOW
      HEADER { LENGTH=0 }
      PAYLOAD { DATA=XID, LENGTH=256 }
-------------
--  RPC Call
-------------
rpcProgram FIELD
      SYNTAX UNSIGNED INT(32) { portMapper(100000), nfs(100003),
         mount(100005), lockManager(100021), statusMonitor(100024) }
rpcProcedure GROUP
      SUMMARIZE
         "Default" :
            "Program=$Program, Version=$Version, Procedure=$Procedure"
::= {  Program=rpcProgram, Version=UInt32, Procedure=UInt32 }
rpcAuthFlavor FIELD
      SYNTAX UNSIGNED INT(32) { null(0), unix(1), short(2) }
rpcMachine   FIELD
      SYNTAX LSTRING(4)
rpcGroup     GROUP
      LENGTH "$NumGroups * 4"
::= {  Gid=Int32 }
rpcCredentials      GROUP
      LENGTH "$CredentialLength"
::= {  Stamp=UInt32, Machine=rpcMachine, Uid=Int32, Gid=Int32,
      NumGroups=UInt32, Groups=rpcGroup }
rpcVerifierData     FIELD
      SYNTAX         BYTESTRING(0..400)
      LENGTH         "$VerifierLength"
rpcEncap    FIELD
      SYNTAX COMBO Program Procedure
      LOOKUP FILE "RPC.cf"
rpcCallData   FIELD
      SYNTAX         BYTESTRING(0..100)
      ENCAP          rpcEncap
      DISPLAY-HINT   "HexDump"
rpcCall      PROTOCOL
      DESCRIPTION
         "Protocol format for RPC call"
::= {  RPCVersion=UInt32, Procedure=rpcProcedure,
      CredentialAuthFlavor=rpcAuthFlavor, CredentialLength=UInt32,
      Credentials=rpcCredentials,
      VerifierAuthFlavor=rpcAuthFlavor, VerifierLength=UInt32,
      Verifier=rpcVerifierData, Encap=rpcEncap, Data=rpcCallData }
-------------
--  RPC Reply
-------------
rpcReplyStatus      FIELD
      SYNTAX INT(32) { rpcAcceptedReply(0), rpcDeniedReply(1) }
rpcReplyData   FIELD
      SYNTAX         BYTESTRING(0..40000)
      ENCAP          rpcReplyStatus
      FLAGS          SAMELAYER
      DISPLAY-HINT   "HexDump"
rpcReply      PROTOCOL
      DESCRIPTION
         "Protocol format for RPC reply"
::= {  ReplyStatus=rpcReplyStatus, Data=rpcReplyData }
rpcAcceptStatus     FIELD
      SYNTAX INT(32) { Success(0), ProgUnavail(1), ProgMismatch(2),
            ProcUnavail(3), GarbageArgs(4), SystemError(5) }
rpcAcceptEncap      FIELD
      SYNTAX BYTESTRING(0)
      FLAGS  NOSHOW
rpcAcceptData FIELD
      SYNTAX         BYTESTRING(0..40000)
      ENCAP          rpcAcceptEncap
      DISPLAY-HINT   "HexDump"
```

-continued

```
rpcAcceptedReply PROTOCOL
::= {    VerifierAuthFlavor=rpcAuthFlavor, VerifierLength=UInt32,
         Verifier=rpcVerifierData, Status=rpcAcceptStatus,
         Encap=rpcAcceptEncap, Data=rpcAcceptData }
rpcDeniedstatus     FIELD
         SYNTAX INT(32) { rpcVersionMismatch(0), rpcAuthError(1) }
rpcAuthStatus FIELD
         SYNTAX INT(32) { Okay(0), BadCredential(1), RejectedCredential(2),
              BadVerifier(3), ReDectedVerifier(4), TooWeak(5),
              InvalidResponse(6), Failed(7) }
rpcDeniedReply      PROTOCOL
::= {    Status=rpcDeniedStatus, AuthStatus=rpcAuthStatus }
------------------
--   RPC Transactions
------------------
rpcBindLookup PROTOCOL
         SUMMARIZE
              "Default" :
                   "RPC GetPort Prog=$Prog, Ver=$Ver, Proto=$Protocol"
::= {    Prog=rpcProgram, Ver=UInt32, Protocol=UInt32 }
rpcBindLookupReply PROTOCOL
         SUMMARIZE
              "Default"
                   "RPC GetPortReply Port=$Port"
::= {    Port=UInt32 }
-------------------------------------------------------------------------
--
--   NFS.pdl - Network File System (NFS) definitions
--
--   Description:
--      This file contains the packet definitions for the Network File
--      System.
--   Copyright:
--      Copyright (c) 1994–1998 Apptitude, Inc.
--        (formerly Techhically Elite, Inc.)
--      All rights reserved.
--   RCS:
--      $Id: NFS.pdl,v 1.3 1999/01/26 15:15:59 skip Exp $
-------------------------------------------------------------------------
nfsString      FIELD
         SYNTAX LSTRING(4)
nfsHandle      FIELD
         SYNTAX          BYTESTRING(32)
         DISPLAY-HINT    "16x\n          "
nfsData        FIELD
         SYNTAX          BYTESTRING(0..100)
         DISPLAY-HINT    "HexDump"
nfsAccess      PROTOCOL
         SUMMARIZE
              "Default" :
                   "NFS Access $Filename"
::= { Handle=nfsHandle, Filename=nfsString }
nfsStatus      FIELD
         SYNTAX INT(32) { OK(0), NoSuchFile(2) }
nfsAccessReply      PROTOCOL
         SUMMARIZE
              "Default" :
                   "NFS AccessReply $Status"
::= { Status=nfsStatus }
nfsMode             FIELD
         SYNTAX UNSIGNED INT(32)
         DISPLAY-HINT "4o"
nfsCreate      PROTOCOL
         SUMMARIZE
              "Default" :
                   "NFS Create $Filename"
::= { Handle=nfsHandle, Filename=nfsString, Filler=Int8, Mode=nfsMode,
      Uid=Int32, Gid=Int32, Size=Int32, AccessTime=Int64, ModTime=Int64 }
nfsFileType    FIELD
         SYNTAX INT(32) { Regular(1), Directory(2) }
nfsCreateReply      PROTOCOL
         SUMMARIZE
              "Default" :
                   "NFS CreateReply $Status"
::= { Status=nfsStatus, Handle=nfsHandle, FileType=nfsFileType,
      Mode=nfsMode, Links=UInt32, Uid=Int32, Gid=Int32, Size=Int32,
      BlockSize=Int32, NumBlocks=Int64, FileSysId=UInt32, FileId=UInt32,
      AccessTime=Int64, ModTime=Int64, InodeChangeTime=Int64 }
nfsRead        PROTOCOL
```

-continued

```
      SUMMARIZE
          "Default" :
              "NFS Read Offset=$Offset Length=$Length"
::= { Length=Int32, Handle=nfsHandle, Offset=UInt64, Count=Int32 }
nfsReadReply   PROTOCOL
      SUMMARIZE
          "Default" :
              "NFS ReadReply $Status"
::= { Status=nfsStatus, FileType=nfsFileType,
      Mode=nfsMode, Links=UInt32, Uid=Int32, Gid=Int32, Size=Int32,
      BlockSize=Int32, NumBlocks=Int64, FileSysId=UInt32, FileId=UInt32,
      AccessTime=Int64, ModTime=Int64, InodeChangeTime=Int64 }
nfsWrite PROTOCOL
      SUMMARIZE
          "Default" :
              "NFS Write Offset=$Offset"
::= { Handle=nfsHandle, Offset=Int32, Data=nfsData }
nfsWriteReply PROTOCOL
      SUMMARIZE
          "Default" :
              "NFS WriteReply $Status"
::= { Status=nfsStatus, FileType=nfsFileType,
      Mode=nfsMode, Links=UInt32, Uid=Int32, Gid=Int32, Size=Int32,
      BlockSize=Int32, NumBlocks=Int64, FileSysId=UInt32, FileId=UInt32,
      AccessTime=Int64, ModTime=Int64, InodeChangeTime=Int64 }
nfsReadDir   PROTOCOL
      SUMMARIZE
          "Default" :
              "NFS ReadDir"
::= { Handle=nfsHandle, Cookie=Int32, Count=Int32 }
nfsReadDirReply      PROTOCOL
      SUMMARIZE
          "Default" :
              "NFS ReadDirReply $Status"
::= { Status=nfsStatus, Data=nfsData }
nfsGetFileAttr     PROTOCOL
      SUMMARIZE
          "Default" :
              "NFS GetAttr"
::= { Handle=nfsHandle }
nfsGetFileAttrReply PROTOCOL
      SUMMARIZE
          "Default" :
              "NFS GetAttrReply $Status $FileType"
::= { Status=nfsStatus, FileType=nfsFileType,
      Mode=nfsMode, Links=UInt32, Uid=Int32, Gid=Int32, Size=Int32,
      BlockSize=Int32, NumBlocks=Int64, FileSysId=UInt32, FileId=UInt32,
      AccessTime=Int64, ModTime=Int64, InodeChangeTime=Int64 }
nfsReadLink   PROTOCOL
      SUMMARIZE
          "Default" :
              "NFS ReadLink"
::= { Handle=nfsHandle }
nfsReadLinkReply  PROTOCOL
      SUMMARIZE
          "Default" :
              "NFS ReadLinkReply Path=$Path"
::= { Status=nfsStatus, Path=nfsString }
nfsMount       PROTOCOL
      SUMMARIZE
          "Default" :
              "NFS Mount $Path"
::= { Path=nfsstring
nfsMountReply PROTOCOL
      SUMMARIZE
          "Default" :
              "NFS MountReply $MountStatus"
::= { MountStatus=nfsStatus, Handle=nfsHandle }
nfsStatFs    PROTOCOL
      SUMMARIZE
          "Default" :
              "NFS StatFs"
::= { Handle=nfsHandle }
nfsStatFsReply      PROTOCOL
      SUMMARIZE
          "Default" :
              "NFS StatFsReply $Status"
::= { Status=nfsStatus, TransferSize=UInt32, BlockSize=UInt32,
      TotalBlocks=UInt32, FreeBlocks=UInt32, AvailBlocks=UInt32 }
```

-continued

```
nfsRemoveDir   PROTOCOL
       SUMMARIZE
           "Default" :
               "NFS RmDir $Name"
::= { Handle=nfsHandle, Name=nfsString }
nfsRemoveDirReply   PROTOCOL
       SUMMARIZE
           "Default" :
               "NFS RmDirReply $Status"
::= { Status=nfsStatus }
nfsMakeDir   PROTOCOL
       SUMMARIZE
           "Default" :
               "NFS MkDir $Name"
::= { Handle=nfsHandle, Name=nfsString }
nfsMakeDirReply   PROTOCOL
       SUMMARIZE
           "Default" :
               "NFS MkDirReply $Status"
::= { Status=nfsStatus }
nfsRemove       PROTOCOL
       SUMMARIZE
           "Default" :
               "NFS Remove $Name"
::= { Handle=nfsHandle, Name=nfsString }
nfsRemoveReply   PROTOCOL
       SUMMARIZE
           "Default" :
               "NFS RemoveReply $Status"
::= { Status=nfsStatus
------------------------------------------------------------------------
--
--   HTTP.pdl - Hypertext Transfer Protocol (HTTP) definitions
--
--   Description:
--       This file contains the packet definitions for the Hypertext Transfer
--       Protocol.
--
--   Copyright:
--       Copyright (c) 1994–1999 Apptitude, Inc.
--       (formerly Technically Elite, Inc.)
--       All rights reserved.
--   RCS:
--       $Id: HTTP.pdl,v 1.13 1999/04/13 15:47:57 skip Exp $
--
------------------------------------------------------------------------
httpData   FIELD
           SYNTAX         BYTESTRING(1..1500)
           LENGTH         "($ipLength - ($ipHeaderLength * 4)) - ($tcpHeaderLen
* 4)"
           DISPLAY-HINT   "Text"
           FLAGS          NOLABEL
http       PROTOCOL
           SUMMARIZE
               "$httpData m/^GET|^HTTP|^HEAD|^POST/" :
                   "HTTP $httpData"
               "$httpData m/^[Dd]ate|^[Ss]erver|^[L1]ast-[Mm]odified/" :
                   "HTTP $httpData"
               "$httpData m/^[Cc]ontent-/" :
                   "HTTP $httpData"
               "$httpData m/^<HTML>/" :
                   "HTTP [HTML document]"
               "$httpData m/^GIF/" :
                   "HTTP [GIF image]"
               "Default" :
                   "HTTP [Data]"
           DESCRIPTION
               "Protocol format for HTTP."
::= { Data=httpData }
http       FLOW
           CONNECTION { INHERITED }
           PAYLOAD { INCLUDE-HEADER, DATA=Data, LENGTH=256 }
           STATES
               "S0:   CHECKCONNECT, GOTO S1
                      DEFAULT NEXT S0
                S1:   WAIT 2, GOTO S2, NEXT S1
                      DEFAULT NEXT S0
                S2:   NATCH
                          '\n\r\n'            900 0 0 255 0, NEXT S3
```

-continued

|  |  |  |  |
|---|---|---|---|
|  |  | '\n\n' | 900 0 0 255 0, NEXT S3 |
|  |  | 'POST /tds?' | 50 0 0 127 1, CHILD sybaseWebsq1 |
|  |  | '.hts HTTP/1.0' | 50 4 0 127 1, CHILD sybaseJdbc |
|  |  | 'jdbc:sybase:Tds' | 50 4 0 127 1, CHILD sybaseTds |
|  |  | 'PCN-The Poin' | 500 4 1 255 0, CHILD pointcast |
|  |  | 't: BW-C-' | 100 4 1 255 0, CHILD backweb |
|  |  | DEFAULT NEXT S3 |  |
|  | S3: | MATCH |  |
|  |  | '\n\r\n' | 50 0 0   0 0, NEXT S3 |
|  |  | '\n\n' | 50 0 0   0 0, NEXT S3 |
|  |  | 'Content-Type:' | 800 0 0 255 0, CHILD mime |
|  |  | 'PCN-The Poin' | 500 4 1 255 0, CHILD pointcast |
|  |  | 't: BW-C-' | 100 4 1 255 0, CHILD backweb |
|  |  | DEFAULT NEXT S0" |  |
| sybaseWebsql | FLOW |  |  |
|  | STATE-BASED |  |  |
| sybaseJdbc | FLOW |  |  |
|  | STATE-BASED |  |  |
| sybaseTds | FLOW |  |  |
|  | STATE-BASED |  |  |
| pointcast | FLOW |  |  |
|  | STATE-BASED |  |  |
| backweb | FLOW |  |  |
|  | STATE-BASED |  |  |
| mime | FLOW |  |  |
|  | STATE-BASED |  |  |
|  | STATES |  |  |
|  | "S0: | MATCH |  |
|  |  | 'application' 900 0 0   1 0, CHILD mimeApplication |  |
|  |  | 'audio'       900 0 0   1 0, CHILD mimeAudio |  |
|  |  | 'image'        50 0 0   1 0, CHILD mimeImage |  |
|  |  | 'text'         50 0 0   1 0, CHILD mimeText |  |
|  |  | 'video'        50 0 0   1 0, CHILD mimeVideo |  |
|  |  | 'x-world'     500 4 1 255 0, CHILD mimeXworld |  |
|  |  | DEFAULT GOTO S0" |  |
| mimeApplication | FLOW |  |  |
|  | STATE-BASED |  |  |
| mimeAudio | FLOW |  |  |
|  | STATE-BASED |  |  |
|  | STATES |  |  |
|  | "S0: | MATCH |  |
|  |  | 'basic' | 100 0 0 1 0, CHILD pdBasicAudio |
|  |  | 'midi' | 100 0 0 1 0, CHILD pdMidi |
|  |  | 'mpeg' | 100 0 0 1 0, CHILD pdMpeg2Audio |
|  |  | 'vnd.m-realaudio' | 100 0 0 1 0, CHILD pdRealAudio |
|  |  | 'wav' | 100 0 0 1 0, CHILD pdWav |
|  |  | 'x-aiff' | 100 0 0 1 0, CHILD pdAiff |
|  |  | 'x-midi' | 100 0 0 1 0, CHILD pdMidi |
|  |  | 'x-mpeg' | 100 0 0 1 0, CHILD pdMpeg2Audio |
|  |  | 'x-mpgurl' | 100 0 0 1 0, CHILD pdMpeg3Audio |
|  |  | 'x-pn-realaudio' | 100 0 0 1 0, CHILD pdRealAudio |
|  |  | 'x-wav' | 100 0 0 1 0, CHILD pdWav |
|  |  | DEFAULT GOTO S0" |  |
| mimeImage | FLOW |  |  |
|  | STATE-BASED |  |  |
| mimeText | FLOW |  |  |
|  | STATE-BASED |  |  |
| mimeVideo | FLOW |  |  |
|  | STATE-BASED |  |  |
| mimeXworld | FLOW |  |  |
|  | STATE-BASED |  |  |
| pdBasicAudio | FLOW |  |  |
|  | STATE-BASED |  |  |
| pdMidi | FLOW |  |  |
|  | STATE-BASED |  |  |
| pdMpeg2Audio | FLOW |  |  |
|  | STATE-BASED |  |  |
| pdMpeg3Audio | FLOW |  |  |
|  | STATE-BASED |  |  |
| pdRealAudio | FLOW |  |  |
|  | STATE-BASED |  |  |
| pdWav | FLOW |  |  |
|  | STATE-BASED |  |  |
| pdAiff | FLOW |  |  |
|  | STATE-BASED |  |  |

What is claimed is:

1. A method of performing protocol specific operations on a packet passing through a connection point on a computer network, the method comprising:

(a) receiving the packet:

(b) receiving a set of protocol descriptions for a plurality of protocols that conform to a layered model, a protocol description for a particular protocol at a particular layer level including:

(i) if there is at least one child protocol of the protocol at the particular layer level, the-one or more child protocols of the particular protocol at the particular layer level, the packet including for any particular child protocol of the particular protocol at the particular layer level information at one or more locations in the packet related to the particular child protocol, (ii) the one or more locations in the packet where information is stored related to any child protocol of the particular protocol, and (iii) if there is at least one protocol specific operation to be performed on the packet for the particular protocol at the particular layer level, the one or more protocol specific operations to be performed on the packet for the particular protocol at the particular layer level; and (c) performing the protocol specific operations on the packet specified by the set of protocol descriptions based on the base protocol of the packet and the children of the protocols used in the packet, the method further comprising:

storing a database in a memory, the database generated from the set of protocol descriptions and including a data structure containing information on the possible protocols and organized for locating the child protocol related information for any protocol, the data structure contents indexed by a set of one or more indices, the database entry indexed by a particular set of index values including an indication of validity, wherein the child protocol related information includes a child recognition pattern, wherein step (c) of performing the protocol specific operations includes, at any particular protocol layer level starting from the base level, searching the packet at the particular protocol for the child field, the searching including indexing the data structure until a valid entry is found, and whereby the data structure is configured for rapid searches using the index set.

2. A method according to claim 1, wherein the protocol descriptions are provided in a protocol description language, the method further comprising:

compiling the PDL descriptions to produce the database.

3. A method according to claim 1, wherein the data structure comprises a set of arrays, each array identified by a first index, at least one array for each protocol, each array further indexed by a second index being the location in the packet where the child protocol related information is stored, such that finding a valid entry in the data structure provides the location in the packet for finding the child recognition pattern for an identified protocol.

4. A method according to claim 3, wherein each array is further indexed by a third index being the size of the region in the packet where the child protocol related information is stored, such that finding a valid entry in the data structure provides the location and the size of the region in the packet for finding the child recognition pattern.

5. A method according to claim 4, wherein the data structure is compressed according to a compression scheme that takes advantage of the sparseness of valid entries in the data structure.

6. A method according to claim 5, wherein the compression scheme combines two or more arrays that have no conflicting common entries.

7. A method according to claim 1, wherein the data structure includes a set of tables, each table identified by a first index, at least one table for each protocol, each table further indexed by a second index being the child recognition pattern, the data structure further including a table that for each protocol provides the location in the packet where the child protocol related information is stored, such that finding a valid entry in the data structure provides the location in the packet for finding the child recognition pattern for an identified protocol.

8. A method according to claim 7, wherein the data structure is compressed according to a compression scheme that takes advantage of the sparseness of valid entries in the set of tables.

9. A method according to claim 8, wherein the compression scheme combines two or more tables that have no conflicting common entries.

10. A method of performing protocol specific operations on a packet passing through a connection point on a computer network, the method comprising:

(a) receiving the packet;

(b) receiving a set of protocol descriptions for a plurality of protocols that conform to a layered model, a protocol description for a particular protocol at a particular layer level including:

(i) if there is at least one child protocol of the protocol at the particular layer level, the-one or more child protocols of the particular protocol at the particular layer level, the packet including for any particular child protocol of the particular protocol at the particular layer level information at one or more locations In the packet related to the particular child protocol, (ii) the one or more locations in the packet where information is stored related to any child protocol of the particular protocol, and (iii) if there is at least one protocol specific operation to be performed on the packet for the particular protocol at the particular layer level, the one or more protocol specific operations to be performed on the packet for the particular protocol at the particular layer level: and (c) performing the protocol specific operations on the packet specified by the set of protocol descriptions based on the base protocol of the packet and the children of the protocols used in the packet, wherein the protocol specific operations include one or more parsing and extraction operations on the packet to extract selected portions of the packet to form a function of the selected portions for identifying the packet as belonging to a conversational flow.

11. A method according to claim 10, wherein step (c) of performing protocol specific operations is performed recursively for any children of the children.

12. A method according to claim 10, wherein which protocol specific operations are performed is step (c) depends on the contents of the packet such that the method adapts to different protocols according to the contents of the packet.

13. A method according to claim 10, wherein the protocol descriptions are provided in a protocol description language.

14. A method according to claim 13, further comprising:

compiling the PDL descriptions to produce a database and store the database in a memory, the database generated from the set of protocol descriptions and including a data structure containing information on the possible protocols and organized for locating the child protocol related information for any protocol, the data structure contents indexed by a set of one or more indices, the database entry indexed by a particular set of index values including an indication of validity, wherein the child protocol related information includes a child recognition pattern, and wherein the step of performing the protocol specific operations includes, at any particular protocol layer level starting from the base level, searching the packet at the particular protocol for the child field, the searching including indexing the data structure until a valid entry is found, whereby the data structure is configured for rapid searches using the index set.

15. A method according to claim 10, further comprising:

looking up a flow-entry database comprising at least one flow-entry for each previously encountered conversational flow, the looking up using at least some of the selected packet portions and determining if the packet matches an flow-entry in the flow-entry database if the packet is of an existing flow, classifying the packet as belonging to the found existing flow; and if the packet is of a new flow, storing a new flow-entry for the new flow in the flow-entry database, including identifying information for future packets to be identified with the new flow-entry;

wherein for at least one protocol, the parsing and extraction operations depend on the contents of one or more packet headers.

16. A method according to claim 10, wherein the protocol specific operations further include one or more state processing operations that are a function of the state of the flow of the packet.

17. A method of performing protocol specific operations on a packet passing through a connection point on a computer network, the method comprising:

(a) receiving the packet;

(b) receiving a set of protocol descriptions for a plurality of protocols that conform to a layered model, a protocol description for a particular protocol at a particular layer level including:

(i) if there is at least one child protocol of the protocol at the particular layer level, the one or more child protocols of the particular protocol at the particular layer level, the packet including for any particular child protocol of the particular protocol at the particular layer level information at one or more locations in the packet related to the particular child protocol, (ii) the one or more locations in the packet where information is stored related to any child protocol of the particular protocol, and (iii) if there is at least one protocol specific operation to be performed on the packet for the particular protocol at the particular layer level, the one or more protocol specific operations to be performed on the packet for the particular protocol at the particular layer level; and (c) performing the protocol specific operations on the packet specified by the set of protocol descriptions based on the base protocol of the packet and the children of the protocols used in the packet, wherein the packet belongs to a conversational flow of packets having a set of one or more states, and wherein the protocol specific operations include one or more state processing operations that are a function of the state of the conversational flow of the packet, the state of the conversational flow of the packet being indicative of the sequence of any previously encountered packets of the same conversational flow as the packet.

* * * * *

UNITED STATES PATENT AND TRADEMARK OFFICE
CERTIFICATE OF CORRECTION

PATENT NO.    : 6,665,725 B1
DATED         : December 16, 2003
INVENTOR(S)   : Dietz et al.

It is certified that error appears in the above-identified patent and that said Letters Patent is hereby corrected as shown below:

Column 6,
Line 47, change "NBTBIOS" to -- NETBIOS --.
Line 55, change "Diferent" to -- Different --.

Column 16,
Line 27, change "FIG. 6 FIG 6" to
 -- FIG. 6.
   FIG6 --.

Column 18,
Line 17, change "updatelookup" to -- update-lookup --.

Column 25,
Line 38, change "server-say" to -- server—say --.

Column 53,
Line 4, change ""Default"" to -- "Default" : --.
Line 45, shift "DISPLAY-HINT" to the right so its beginning lines up with the beginning of "SYNTAX" in line 42 and with the beginning of "LENGTH" in line 43.
Line 46, shift "FLAGS" to the right so its beginning lines up with the beginning of "SYNTAX" in line 42 and with the beginning of "LENGTH" in line 43.

Column 61,
Aprox. line 32, change "rip" to -- r1p --.

Column 71,
Line 9, from the bottom, change "netbios (0x3c00," to -- netbios (0x3c00) --.

Column 73,
Aprox. Line 25, change "tyop" to -- type --.

Column 79,
Line 4 from the bottom, change "SYNTAXINT(8)" to -- SYNTAX INT (8) --.

UNITED STATES PATENT AND TRADEMARK OFFICE
CERTIFICATE OF CORRECTION

PATENT NO. : 6,665,725 B1
DATED : December 16, 2003
INVENTOR(S) : Dietz et al.

It is certified that error appears in the above-identified patent and that said Letters Patent is hereby corrected as shown below:

Column 81,
Approx. line 41, change "SYNTAXBITSRING(12)" to -- SYNTAX BITSTRING (12) --.

Column 83,
Approx. line 36, change "LOOKUPFILE" to -- LOOKUP FILE --.

Column 93,
Approx. line 45, change "vnd.m-relaudio" to -- 'vnd.rn-realaudio' --.

Column 96,
Line 38, change "In" to -- in --.

Signed and Sealed this

Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

| | |
|---|---|
| PATENT NO. | : 6,665,725 B1 |
| APPLICATION NO. | : 09/609179 |
| DATED | : December 16, 2003 |
| INVENTOR(S) | : Russell S. Dietz, Andrew A. Koppenhaver and James F. Torgerson |

Page 1 of 1

It is certified that error appears in the above-identified patent and that said Letters Patent is hereby corrected as shown below:

IN THE CLAIMS:

Column 1, lines 15 and 16, claim 14, change "searching the packet at the particular protocol" to --searching the packet at the particular protocol level--.

Signed and Sealed this
Eighth Day of October, 2013

Teresa Stanek Rea
*Deputy Director of the United States Patent and Trademark Office*